United States Patent
Rappaport et al.

(10) Patent No.: US 7,295,119 B2
(45) Date of Patent: Nov. 13, 2007

(54) SYSTEM AND METHOD FOR INDICATING THE PRESENCE OR PHYSICAL LOCATION OF PERSONS OR DEVICES IN A SITE SPECIFIC REPRESENTATION OF A PHYSICAL ENVIRONMENT

(75) Inventors: Theodore S. Rappaport, Austin, TX (US); Roger R. Skidmore, Austin, TX (US)

(73) Assignee: Wireless Valley Communications, Inc., Austin, TX (US)

( * ) Notice: Subject to any disclaimer, the term of this patent is extended or adjusted under 35 U.S.C. 154(b) by 861 days.

(21) Appl. No.: 10/714,929

(22) Filed: Nov. 18, 2003

(65) Prior Publication Data

US 2004/0236547 A1    Nov. 25, 2004

Related U.S. Application Data

(63) Continuation-in-part of application No. 10/386,943, filed on Mar. 13, 2003.

(60) Provisional application No. 60/441,315, filed on Jan. 22, 2003.

(51) Int. Cl.
*G08B 13/14* (2006.01)

(52) U.S. Cl. ............... 340/572.4; 340/5.8; 340/539.13; 340/691.6; 340/825.49; 455/456.6; 455/509; 705/28; 709/223; 709/226; 726/2

(58) Field of Classification Search ............... 340/5.8, 340/5.92, 825.49, 539.13, 573.1, 573.4, 572.4, 340/691.6; 455/456.1, 456.2, 456.5, 456.6, 455/457, 450, 509; 709/223–226; 705/28; 726/2–4

See application file for complete search history.

(56) References Cited

U.S. PATENT DOCUMENTS

| | | | |
|---|---|---|---|
| 4,675,147 A | 6/1987 | Schaefer et al. |
| 4,736,453 A | 4/1988 | Schloemer |
| 4,885,694 A | 12/1989 | Pray et al. |
| 5,111,392 A | 5/1992 | Malin |
| 5,119,307 A | 6/1992 | Blaha et al. |
| 5,239,487 A | 8/1993 | Horejsi et al. |
| 5,293,640 A | 3/1994 | Gunmar et al. |
| 5,307,261 A | 4/1994 | Maki et al. |
| 5,337,149 A | 8/1994 | Kozah et al. |
| 5,339,184 A | 8/1994 | Tang |
| 5,375,123 A | 12/1994 | Andersson et al. |

(Continued)

OTHER PUBLICATIONS

From Bird's Eye Real-time Mapping Software dated Jun. 30, 2002.

(Continued)

*Primary Examiner*—Thomas Mullen

(57) ABSTRACT

A system and method for providing security to a wireless communication system having wireless communication components positioned at different locations within a physical environment are provided. The wireless communication components include an access point and a network device. A site-specific computerized representation of the physical environment displays the location of the wireless communication components including the access point and network device. The access point and network device identify the presence or a physical location of a possible intruder or intruder devices. An indicator is presented in the site-specific representation on the display when an erroneous authentication request or other undesired transmission is received by the network device or the access point.

21 Claims, 39 Drawing Sheets

U.S. PATENT DOCUMENTS

| | | | |
|---|---|---|---|
| 5,394,522 A | 2/1995 | Sanchez-Frank et al. |
| 5,450,615 A | 9/1995 | Fortune et al. |
| 5,458,123 A | 10/1995 | Unger |
| 5,465,390 A | 11/1995 | Cohen |
| 5,467,441 A | 11/1995 | Stone et al. |
| 5,482,050 A | 1/1996 | Smokoff et al. |
| 5,485,568 A | 1/1996 | Venable et al. |
| 5,491,644 A | 2/1996 | Pickering et al. |
| 5,491,837 A | 2/1996 | Haartsen |
| 5,493,679 A | 2/1996 | Virgil et al. |
| 5,515,269 A | 5/1996 | Willis et al. |
| 5,528,518 A | 6/1996 | Bradshaw et al. |
| 5,539,665 A | 7/1996 | Lamming et al. |
| 5,553,312 A | 9/1996 | Gattey et al. |
| 5,553,620 A | 9/1996 | Snider et al. |
| 5,555,354 A | 9/1996 | Strasnick et al. |
| 5,561,841 A | 10/1996 | Markus |
| 5,564,070 A | 10/1996 | Want et al. |
| 5,586,254 A | 12/1996 | Kondo |
| 5,594,946 A | 1/1997 | Menich et al. |
| 5,598,532 A | 1/1997 | Liron |
| 5,625,827 A | 4/1997 | Krause et al. |
| 5,636,344 A | 6/1997 | Lewis |
| 5,689,355 A | 11/1997 | Okubo et al. |
| 5,710,758 A | 1/1998 | Soliman et al. |
| 5,755,072 A | 5/1998 | Lingafelter |
| 5,761,093 A | 6/1998 | Urbish et al. |
| 5,774,669 A | 6/1998 | George et al. |
| 5,794,128 A | 8/1998 | Brockel et al. |
| 5,799,154 A | 8/1998 | Kuriyan |
| 5,802,146 A | 9/1998 | Dulman |
| 5,809,282 A | 9/1998 | Cooper et al. |
| 5,815,395 A | 9/1998 | Hart et al. |
| 5,821,937 A | 10/1998 | Tonelli et al. |
| 5,825,759 A | 10/1998 | Liu |
| 5,828,960 A | 10/1998 | Tang et al. |
| 5,831,610 A | 11/1998 | Tonelli et al. |
| 5,832,389 A | 11/1998 | Dent |
| 5,845,124 A | 12/1998 | Bernan |
| 5,861,887 A | 1/1999 | Butler et al. |
| 5,867,112 A | 2/1999 | Kost |
| 5,877,777 A | 3/1999 | Colwell |
| 5,878,328 A | 3/1999 | Chawla et al. |
| 5,907,850 A | 5/1999 | Krause et al. |
| 5,917,808 A | 6/1999 | Kosbab |
| 5,923,850 A | 7/1999 | Barroux |
| 5,926,762 A | 7/1999 | Arpee et al. |
| 5,940,196 A | 8/1999 | Piehler et al. |
| 5,945,976 A | 8/1999 | Iwamura et al. |
| 5,948,055 A | 9/1999 | Pulsipher et al. |
| 5,949,335 A | 9/1999 | Maynard |
| 5,949,988 A | 9/1999 | Feisullin et al. |
| 5,953,669 A | 9/1999 | Stratis et al. |
| 5,963,867 A | 10/1999 | Reynolds et al. |
| 5,970,406 A | 10/1999 | Komara |
| 5,977,851 A | 11/1999 | Stancil et al. |
| 5,987,328 A | 11/1999 | Ephremides et al. |
| 5,994,984 A | 11/1999 | Stancil et al. |
| 6,006,021 A | 12/1999 | Tognazzini |
| 6,018,625 A | 1/2000 | Hayball et al. |
| 6,021,316 A | 2/2000 | Heiska et al. |
| 6,032,105 A | 2/2000 | Lee et al. |
| 6,038,547 A | 3/2000 | Casto |
| 6,044,273 A | 3/2000 | Tekinay |
| 6,058,102 A | 5/2000 | Drysdale et al. |
| 6,058,262 A | 5/2000 | Kawas et al. |
| 6,059,842 A | 5/2000 | Dumarot et al. |
| 6,061,722 A | 5/2000 | Lipa et al. |
| 6,075,541 A | 6/2000 | Maclinovsky |
| 6,085,335 A | 7/2000 | Djoko et al. |
| 6,088,522 A | 7/2000 | Lee et al. |
| 6,104,699 A | 8/2000 | Holender et al. |
| 6,108,309 A | 8/2000 | Cohoe et al. |
| 6,111,857 A | 8/2000 | Soliman et al. |
| 6,122,083 A | 9/2000 | Ohta et al. |
| 6,148,010 A | 11/2000 | Sutton et al. |
| 6,199,032 B1 | 3/2001 | Anderson |
| 6,204,813 B1 | 3/2001 | Wadell et al. |
| 6,208,833 B1 | 3/2001 | Preschutti et al. |
| 6,229,540 B1 | 5/2001 | Tonelli et al. |
| 6,243,772 B1 | 6/2001 | Ghori et al. |
| 6,253,086 B1 | 6/2001 | Parantainen et al. |
| 6,256,506 B1 | 7/2001 | Alexander et al. |
| 6,259,924 B1 | 7/2001 | Alexander et al. |
| 6,285,377 B1 | 9/2001 | Greenbaum et al. |
| 6,289,203 B1 | 9/2001 | Smith et al. |
| 6,311,144 B1 | 10/2001 | Abu El Ata |
| 6,317,599 B1 | 11/2001 | Rappaport et al. |
| 6,326,987 B2 | 12/2001 | Alexander |
| 6,330,005 B1 | 12/2001 | Tonelli et al. |
| 6,337,688 B1 | 1/2002 | Berstis |
| 6,338,031 B1 | 1/2002 | Lee et al. |
| 6,356,758 B1 | 3/2002 | Almeida et al. |
| 6,393,432 B1 | 5/2002 | Flansburg et al. |
| 6,408,312 B1 | 6/2002 | Forthman et al. |
| 6,424,264 B1 * | 7/2002 | Giraldin et al. ........ 340/539.13 |
| 6,442,507 B1 | 8/2002 | Skidmore et al. |
| 6,466,938 B1 | 10/2002 | Goldberg |
| 6,470,195 B1 | 10/2002 | Meyer |
| 6,487,417 B1 | 11/2002 | Rossoni et al. |
| 6,493,679 B1 | 12/2002 | Rappaport et al. |
| 6,496,290 B1 | 12/2002 | Lee |
| 6,499,006 B1 | 12/2002 | Rappaport et al. |
| 6,505,045 B1 | 1/2003 | Hills et al. |
| 6,754,488 B1 * | 6/2004 | Won et al. ................ 455/456.1 |
| 6,804,578 B1 * | 10/2004 | Ghaffari ..................... 700/229 |
| 7,023,356 B2 * | 4/2006 | Burkhardt et al. ..... 340/825.49 |
| 7,124,101 B1 * | 10/2006 | Mikurak ..................... 705/35 |
| 2002/0030600 A1 | 3/2002 | Starner |
| 2002/0082859 A1 * | 6/2002 | Lancos et al. ................. 705/1 |
| 2003/0232598 A1 * | 12/2003 | Aljadeff et al. .......... 455/456.1 |
| 2004/0072577 A1 | 4/2004 | Myllymaki et al. |

OTHER PUBLICATIONS

IEEE Transactions on Antennas and propagation, vol. 46, No. 8, Aug. 1998. "Effect of Terrrain on Path Loss in Urban Environments for Wireless Applications" Leonard Piazzi and Henry L. Bertoni.

P. Babl, V. Padmanabhan, and A. Balachandran, "A Software System for Locating Mobile Users: Design, Evaluation, and Lessons," Microsoft Technical Report, Apr. 2000.

G. Durgin, T.S. Rappaport, H. Xu, Measurements and Models for Radio Path Loss and Penetration Loss in and Around Homes and Trees at 5.85 GHz, IEEE Transactions on Communications, vol. 46, No. 11, Nov. 1998.

C.M. Peter Ho et al., "Antenna Effects on Indoor Obstructed Wireless Channels and a Deterministic Image-Based Wide-Band Propagation Model for In-Building Personal Communications Systems," International Journal of Wireless Information Networks, vol. 1, No. 1, 1994.

S. Kim et al., "Radio Propagation Measurements and Predictions Using Three-dimensional Ray Tracing in Urban Environments at 908 MHZ and 1.9 GHz," IEEE Transactions on Vehicular Technology, vol. 48, No. 3, May 1999.

T.S., Rappaport et al., "Use of Topographic Maps with Building Information to Determine Antenna Placements and GPS Satellite Coverage for Radio Detection and Tracking in Urban Environments," MPRG Technical Report MPRG-TR-95-19 Virginia Tech, Sep. 1995.

R.K. Morrow, Jr. and T.S. Rappaport, "Getting In," Wireless Review Magazine, Mar. 2000.

Wireless Valley Communications, Inc., "SitePlanner 3.16 for Windows 95/98/NT User's Manual," Software User's Manual. pp. 5-148 to 5-156, 1999.

M. Panjwani et al., "Interactive Computation of Coverage Regions for Wireless Communication in Multifloored Indoor Environments," IEEE Journal on Selected Areas in Communications, vol. 14, No. 3, Apr. 1996.

L. Piazzi and H.L. Bertoni. "Achievable Acurracy of Site-Specific Path-Loss Predictions in Residential Environments" IEEE Transactions on Vehicular Technology, vol. 48, No. 3, May 1999.

T.S. Rappaport et al., "Wireless Communications: Past Events and a Future Perspective", IEEE Communications Magazine, May 2002.

T.S. Rappaport et al., "Radio Propagation Prediction Techniques and Computer-Aided Channeling Modeling for Embedded Wireless Microsystems," ARPA Annual Report, MPRG Technical Report MPRG-TR-94-12, Virginia Tech, Jul. 1994.

T.S. Rappaport et al., "Use of Topographic Maps with Building Information to Determine Antenna Placements for Radio Detection and Tracking in Urban Environments," MPRG Technical Report MPRG-TR-95-14, Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappapoprt, "wireless Communications: Principles and Practice" Second Edition, Prentice Hall, 2002.

T.S. Rappaport et al., "Use of Topographic Maps with Building Information to Determine AntennaPlacements and GPS Satellite Coverage for Radio Detection and Tracking in Urban Environments," MPRG Technical Report MPRG-TR-95-14, Virginia Tech, Sep. 1995.

T.S. Rappaport et al., "Indoor Path Loss Measurement for Homes and Apartments at 2.4 and 5.85 GHz," private report produced for Motorola, Dec. 16, 1997.

T.S. Rappaport, "Isolating Interference," Wireless Review Magazine, May 2000.

Slides from T.S. Rappaport and R. Skidmore, "Introduction to In-Building Wireless Systems," Infocast In-Building Wireless Solutions Conference and Exposition, Feb. 4, 2003.

S. Sandhu, M.P. Koushik, and T.S. Rappaport "Predicted Path Loss for Roslyn VA. First set of predictions for ORD Project on Site Specific Propagation Prediction." MPRG Technical Report MPRG-TR-94-20, Virginia Tech, Dec. 1994.

S. Sandhu, M.P. Koushik, and T.S. Rappaport, "Predicted Path Loss for Roslyn VA.First set of predictions for ORD Project on Site Specific Propagation Prediction," MPRG Technical Report MPRG-TR-94-03 Virginia Tech. Mar. 1995.

S. Seidel et al.. "Site-Specific Propagation Prediction for Wireless In-Building Personal Communication Design," IEEE Transactions on Vehicular Technology, vol. 43, No. 4, Nov. 1994.

S. Shakkottai and T.S. Rappaport, "Research Challenges in Wireless Networks: A Technical Overview," Proceedings of the Fifth International Symposium on Wireless Personal Multimedia Communications, Honolulu, HI, Oct. 2002.

H. Sherali et al., "On the Optimal Location of Transmitters for Micro-cellular Radio Communication System Design," IEEE Journal on Selected Areas in Communications, vol. vol. 14, No. 3, pp. 662-673, May 1996.

R. Skidmo're et al., "A Comprehensive In-Building and Microcellular Wireless Communication System Design Tool" The Bradley Department of Electrical Engineering, MPRG-TR-97-13, Jun. 1997. Master's Thesis—unpublished by Virginia Tech for 2 years after submission.

R. Skidmore, et al., Russell Senate Office Building Propagation Study, Project Report for Joseph R. Loring & Associates; "Project Update," AoC Contract # Acbr96088, prepared for Office of the Architect of the Capital, Jan. 19, 1997.

R. Skidmore, et al., Russell Senate Office Building Propagation Study, Project Report for Joseph R. Loring & Associates; "Assessment and Study of the Proposed Enhancements of the Wireless Communications Environment of the Russell Senate Office Building (RSOB) and Associated Utility Tunnels," AoC Contract # Acbr96088, prepared for Office of the Architect of the Capitol, Feb. 20, 1997.

R. Torres et al., "CINDOOR: An Engineering Tool for Planning and Design of Wireless Systems in Enclosed Spaces," IEEE Antennas and Propagation Magazine, vol. 41, No. 4 Aug. 1999.

R. Skidmore et al., "Interactive Coverage Region and System Design Simulation for Wireless Communication Systems in Multi-Floored Indoor Environments: SMT Plus *tm*." IEEE ICUPC Proceedings, 1996.

T.S. Rappaport et al., "Radio Propagation Prediction Techniques and Computer-Aided CHannel Modeling for Embedded Wireless Microsystems," MPRG Tech. Report MPRG-TR-95-08, Virginia Tech, Jul. 1994.

Company Web Page "Actix" www.actix.com product name: E-NOS (now E-AMS), date unknown.

Company Web Page Agilent' www.agilent.com product name: OPAS32, date unknown.

Company Web Page "Agilent" www.agilent.com product name: Wizard, date unknown.

Company Web Page "Comarco" www.edx.com product name: SignalPro, date unknown.

Company Web Page "ComOpt" www.comopt.com. product name: CellOpt AFP, date unknown.

Company Web Page "Lucent" www.bell-labs.com product name: WiSE, date unknown.

Company Web Page "Ericsson" www.ericsson.com product name: TEMS Lite, date unknown.

Company Web Page "Ericsson" www.ericsson.com product name: TEMS, date unknown.

Company Web Page "Marconi" www.marconi.com product name: PlaNET, date unknown.

Company Web Page "Marconi" www.marconi.com product name: decibelPlanner, date unknown.

Company Web Page "Schema"www.schema.com product name: Optimizer, date unknown.

Company Web Page "ScoreBoard" www.scoreboard.com product name: ScoreBoard, date unknown.

Article from the 56th IEEE Vehicular Technology Conference titled: In-Building Wideband Multipath Characteristics at 2.5 & 60 GHz Vancouver Canada Aug. 2002. vol. 1 pp. 97-101, C. Anderson; T. Rappaport; K. Bae; A. Verstak; N. Ramakrishnan; W. Tranter; C. Shaffer and L. Watson.

Article submitted to IEEE transactions on Wireless Communications, Aug. 2002 titled: "Globally Optimal Transmitter Placement for Indoor Wireless Communication Systems" J. He; A. Verstak; L.T. Watson; C.A. Stinson; N. Ramakrishnan; C.A. Shaffer; T.S. Rappaport; C.R. Anderson; K. Bae; J. Jiang; and W.H. Tranter.

Article submitted to IEEE Transactions on Wireless Communications, Aug. 2002, titled: "In-Building Wideband Multipath Measurements at 2.5 GHz and 60 GHz" C. Anderson; T. and T. Rappaport.

Software by Andrew, titled "RF Planner" dated Jun. 17, 1997.

A user guide titled: "Andrew Microwave System Planner" , date unknown.

A user guide titled: Andrew Antenna System Planner, date unknown.

Article "Building Database Manipulator" Copyright, Jan. 1998; MPRG and Virginia Tech.

PCS 97 Track 7; Engineering & Systems Management; T. Rappaport, date unknown.

Propagator; vol. 8, No. 3; Fall. 1997.

SMT Plus 1.0 User's Manual; R. Skidmore & T. Rappaport; Copyright. Aug. 1996; Virginia Tech.

Intel Technology Journal, vol. 7, issue 3, Aug. 2003.

S. Shakkottai et al. "Cross-Layer Design for Wireless Networks," IEEE Comm. Magazine, vol. 41, No. 10, Oct. 2003.

IT Wireless web article, Nov. 2003.

P. Teurnois et al; "Pick Your Wireless Solution" web article, McCombs School of Business, Univ. of TX at Austin, date unknown.

Article from Visionael website, date unknown.

Article from the Chantry Networks Information website, date unknown.

Articles from the Aruba Networks Information website, date unknown.

Article from the Meru Networks Information website, date unknown.
Article from the Legra Networks Information website, date unknown.
Article from the Trapeze Networks website, date unknown.
Articles from the Airflow Networks Information website tiled Airflow Technology; "Solving the WLAN Dilemma" by Brian Jenkins, Jul. 2003: Securing Enterprise WLANS by Dr. Harry Bims, Aug. 2003: Enabling Voice over WLANS by Dr. Harry Bims, Sep. 2003: High Availability for Mission-Critical WLANS by Brian Jenkins, Sep. 2003, Airflow Applications Guide.
Articles form the Airespace Networks Information website, date unknown.
Article from Computerworld information webiste, date unknown.
R.R. Skidmore et al, "Towards Integrated PSEs for Wireless Communications: Experiences with the S4W and SitePlanner Projects," MPRG-TR-95-08, Virginia Tech, Jul. 1995.
J. He, T.S. Rappaport et al., "Global Optimization of Transmitter Placement in Wireless Communication Systems," WNCG-TR-10-07, U. Texas, Oct. 2003.
J. Chen. T.S. Rappaport, "Cool Cloud Wireless LAN Design Guidelines and User Traffic Modeling for In-Store Use . . . (Part 1)." WNCG-TR-2003-11-01, U. Texas, Nov. 2003.
Chen NA, T.S. Rappaport, "Cool Cloud Wireless LAN Design Guidelines and User Traffic Modeling for In-Store Use . . . (Part 2)," WNCG-TR-2003-11-02, Nov. 2003.
Wireless Valley Communications, Inc., Siteplanner 3-16 for Windows 95/98/NT User's Manual, pp. 5-178 to 5-156, 1999.
T.S. Rappaport, et al., "Wireless Communications: Past Events and a Future Perspective", IEEE Communications Magazine, May 2002.
T.S. Rappaport, "Wireless Communications: Principles and Practice" Second Edition, Prentice Hall, 2002.
T.S. Rappaport and R. Skidmore, Slides From "Introduction to In-Building Wireless Systems", Infocast In-Building Wireless Solutions Conference and Exposition, Feb. 4, 2003.
S. Shakkottal and T.S. Rappaport, "Research Challenges in Wireless Networks: A Technical Overview", Proceeding of Fifth International Symposium on Wireless Personal Multimedia Communications, Honolulu, HI, Oct. 2002.
R. Skidmore; et al., "A Comprehensive In-Building and Microcellular Wireless Communication System Design Tool", The Bradley Department of Electrical Engineering, MPRG-TR-97-13, Jun. 1997, Master's Thesis—Unpublished by Virginia Tech for 2 Years After Submission.
R. Skidmore, et al., Russel Senate Office Building Propagation Study, Project Report for Joseph R. Loring & Associates: "Project Update", ANC Contract #ACBR96088, Prepared for Office of the Architect of the Capital, Jan. 19, 1997.
R. Skidmore, et al., Russell Senate Office Building Propagation Study, Project Report for Joseph R. Loring & Associates: "Assessment and Study of the Proposed Enhancements of the Wireless Communications Environment of the Russell Senate Office Building (RSOB) and Associated Utility Tunnels", AOC Conract #ACBR96088, Prepared for Office of the Architect of the Capital, Feb. 20, 1997.
R. Skidmore, et al., Interactive Coverage Regeion and System Design Simulation for Wireless Communication Systems in Multi-Floored Indoor Environments: SMT Plus im, IEEE ICUPC Proceedings, 1996.
Skidmore, et al., "Towards Integrated PSEs for Wireless Communications: Experiences With the S4W and Siteplanner Projects", Mobile Computing and Communications Review, vol. 1, No. 2, date unknown.
T.S. Rappaport, et al., "Radio Propagation Prediction Techniques and Computer-Aided Channel Modeling for Embedded Wireless Microsystems", MPRG Tech. Report MPRG-TR-95-08, Virginia Tech, Jul. 1995.
Company Web Page "Ericsson" www.ericsson.com, Product Name:TEMS, date unknown.
T. Rappaport, PCS 97 Track 7, Engineering & Systems Management, date unknown.
Propagator: vol. 8, No. 3, Fall 1997.
R. Skidmore & T. Rappaport; SMT Plus 1.0 User's Manual; Copyright, Aug. 1996, Virginia Tech.
P. Tournois, et al., "Pick Your Wireless Solution" Web Article, McCombs School of Business, University of Texas at Austin, date unknown.
Article From Visonael Website, Aug. 2002.
Article From the Meru Networks Information Webiste, date unknown.
Article From the Trapeze Networks Information Website, date unknown.
Brian Jenkins, "Airflow Technology-Solving the WLAN Dilemma", Airflow Networks Information Website, Jul. 2003.
Dr. Harry Bims, "Securing Enterprise WLANS", Aug. 2003.
Dr. Harry Bims, "Enabling Voice-Over WLANS", Sep. 2003.
Brian Jenkins, "High Availability for Mission-Critical WLANS", Sep. 2003, Airflow Applications Guide.
Articles From the Airespace Networks Information Website, date unknown.
Article From Computerworld Information Website, date unknown.
T.S. Rappaport, et al. "Wireless Communications: Past Events and a Future Perspective", IEEE Communications Magazine, Jun. 2002.
S. Shakkottai, T.S. Rappaport, "Research Challenges in Wireless Networks: A Technical Overview", 5th International Symposium on Wireless Personal Multimedia Communications, Honolulu, HI, Oct. 2002.
R.K. Morrow, T.S. Rappaport, "Getting in", Wireless Review Magazine, Mar. 2000.
R.K. Morrow, Jr., "Site-Specific Indoor Planning", Applied Microwave and Wireless Magazine, Mar. 1999.

* cited by examiner

| Type | Manufacturer | Part # | Description | Loss (dB per 100 meters) | Connections | Physical Cost (per meter) |
|---|---|---|---|---|---|---|
| CONNECTOR | E-Tron | | Type N 10dB Tap | 0.50 | 2 | 300.00 |
| CONNECTOR | Narda | 3372A-2 | Type N Female 2-way power divider | 0.30 | 3 | 65.00 |
| ANTENNA_POINT | Allen Telecom | ATSA110 | ATG Unity Gain OMNI Indoor Active Li... | 0.00 | 1 | 25.00 |
| CONNECTOR | E-TRON, N Conne... | | 10dB Multifrequency Tap | 0.50 | 2 | 20.00 |
| CABLE | RFS Cablewave | HCA78-50JFP | 7/8" Air Dielectric, Plenum, Corrugated... | 0.63 | 2 | 15.19 |
| CABLE | RFS Cablewave | LCF78-50JFRN | 7/8" FLEXWELL Foam Fire Retardant... | 0.64 | 2 | 9.19 |
| CABLE | Deltawave | 810929.001 | Flexmax Air Dielectric cable | 7.10 | 2 | 3.71 |
| CABLE | Acme | 9983-A | FlexMax Air Dielectric | 13.00 | 2 | 2.69 |
| ANTENNA_POINT | Antel | LPD 7908 | 60 deg. Hor. | 0.00 | 1 | 1.00 |
| ANTENNA_POINT | Antel | LPD 7907 | 80 deg. Hor. | 0.00 | 1 | 1.00 |
| ANTENNA_POINT | Antel | LPD 7907/8 | 80 deg. Hor. | 0.00 | 1 | 1.00 |
| ANTENNA_POINT | Antel | LPD 7905 | 92 deg. Hor. | 0.00 | 1 | 1.00 |
| ANTENNA_POINT | Antel | LPD 7905/2 | 92 deg. Hor. | 0.00 | 1 | 1.00 |
| ANTENNA_POINT | Antel | LPD 7905/8 | 92 deg. Hor. | 0.00 | 1 | 1.00 |
| ANTENNA_POINT | Antel | BCR 80010:180 | Directional special shaped pattern | 0.00 | 1 | 1.00 |
| ANTENNA_POINT | Antel | BCD 8007 | OMNI 15 deg. Ver. | 0.00 | 1 | 1.00 |
| ANTENNA_POINT | Antel | BCR 80010.270 | special shaped pattern | 0.00 | 1 | 1.00 |
| ANTENNA_POINT | Swedcom Corporati... | ALP9009 N20T | 80 deg. 9 dB Gain with 20 deg. D/T | 0.00 | 1 | 0.00 |
| ANTENNA_POINT | Allen Telecom | ASPP2933 1850 | dB OMNI PCN 1850-1990 360 deg. 3 | 0.00 | 1 | 0.00 |

Figure 4

| Type | Manufacturer | Part # | Description | Loss (dB... | Connections | Physical Cost... |
|---|---|---|---|---|---|---|
| AMPLIFIER | Cellular Specialties | CSI-BDA110 | In-Building Amplifier Model 110 SMR Band | -40.00 | 2 | 0.00 |
| AMPLIFIER | Cellular Specialties | CSI-BDA110 | In-Building Amplifier Model 110 SMR Band | -30.00 | 2 | 0.00 |
| AMPLIFIER | Cellular Specialties | CSI-BDA110 | In-Building Amplifier Model 110 SMR Band | -20.00 | 2 | 0.00 |
| AMPLIFIER | Cellular Specialties | CSI-BDA120 | In-Building Amplifier Model 120 SMR Band 10 dB... | -10.00 | 2 | 0.00 |

Figure 5

SYSTEM AND METHOD FOR INDICATING THE PRESENCE OR PHYSICAL LOCATION OF PERSONS OR DEVICES IN A SITE SPECIFIC REPRESENTATION OF A PHYSICAL ENVIRONMENT

CROSS-REFERENCE TO RELATED APPLICATIONS

This application is a continuation-in-part (CIP) application of U.S. Ser. No. 10/386,943 filed Mar. 13, 2003 and claims priority to 60/441,315 filed Jan. 22, 2003. The application is related to U.S. Pat. No. 7,055,107 and U.S. Pat. No. 7,164,883, and the complete contents of these patents are herein incorporated by reference. The invention described is also related to U.S. Pat. No. 6,317,599, U.S. Pat. No. 6,442,507, U.S. Pat. No. 6,493,679, and U.S. Pat. No. 6,499,006 and the complete contents of these patents are herein incorporated by reference.

BACKGROUND OF THE INVENTION

1. Field of the Invention

The present invention generally relates to engineering and management systems for the design and on-going operation of wireless and wired communication networks or systems and, more particularly, to a method for determining and maintaining the proper configuration of wireless or wired network hardware in terms of power output, gain, attenuation, channel, frequency settings, throughput settings, antenna positioning or adjustments, adaptive control of transmission or reception parameters, adaptive control of coverage zones, handoff zones, user quality of service, overall performance of a class of users, in any environment (e.g., buildings, floors within a building, campuses, within cities, an outdoor setting, etc.) in order to achieve some optimal or preset or desired performance goals (e.g., signal-to-interference ratio (SIR), signal-to-noise ratio (SNR), quality of service for all users or particular classes of users, or individual users, received signal strength intensity (RSSI), throughput, bit error rate (BER), packet error rate (PER), capacity, billing efficiency, etc.) for the wireless or wired network users who are operating within or around the environment.

2. Background Description

As data communications use increases, radio frequency (RF) coverage within and around buildings and signal penetration into buildings from outside transmitting sources has quickly become an important design issue for network engineers who must design and deploy cellular telephone systems, paging systems, wireless or wired computer networks, or new wireless system is and technologies such as personal communication networks or wireless local area networks (WLANs). Similar needs are merging for wireless Internet Service Providers (WISPs) who need to provision and maintain wireless connections to their customers. Designers are frequently requested to determine if a radio transceiver location or base station cell site can provide reliable service throughout an entire city, an office, building, arena or campus. A common problem for wireless networks is inadequate coverage, or a "dead zone" in a specific location, such as a conference room. Such dead zones may actually be due to interference, rather than lack of desired signal. It is understood that an indoor wireless PBX (private branch exchange) system or wireless local area network (WLAN) can be rendered useless by interference from nearby, similar systems.

The costs of in-building and microcell devices which provide wireless coverage are diminishing, and the workload for RF engineers and technicians to install and manage these on-premises systems is increasing sharply. Rapid engineering design, deployment, and management methods for microcell and in-building wireless systems are vital for cost-efficient build-out and on-going operation. The evolving wireless infrastructure is moving toward packet-based transmissions, and outdoor cellular may soon complement in-building Wireless LAN technology. See "Wireless Communications: Past Events and a Future Perspective" by T. S. Rappaport, et al., IEEE Communications Magazine, June 2002 (invited); and "Research Challenges in Wireless Networks: A Technical Overview, by S. Shakkottai and T. S. Rappaport at Proceeding of the Fifth International Symposium on Wireless Personal Multimedia Communications, Honolulu, Hi., October 2002 (invited).

Analyzing and controlling radio signal coverage penetration, network quality of service, and interference is of critical importance for a number of reasons. As more and more wireless networks are deployed in greater capacity, there will be more interference and more management and control needed, which in turn will create a greater need to properly design, measure, and manage, on an on-going basis, the aggregate performance of these networks, using real time autonomous management systems as well as sporadic or periodic adjustments to the wireless infrastructure. Not only will there be a need for properly setting the channels and operating parameters of indoor networks in an optimal or sensible setting upon network turn-on, but real time control will also be needed to guarantee quality of service to different types of wireless users (different class of users), some who may pay a premium for guaranteed data delivery or a more robust form of wireless network access, and other users who may want a lower class of service and who do not wish to pay for premium bandwidth access or who only need intermittent access to the network. Provisioning the Radio Frequency (RF) resources will become more important as users increase and networks proliferate, and scheduling techniques and autonomous control of networks using simpler and more automated and embedded means will be critical for the success and proliferation of ubiquitous wireless networks.

When contemplating a wireless network, such as a Wireless LAN or cellular network to offer service to a group of mobile or portable users, a design engineer must determine if an existing outdoor large-scale wireless system, or macrocell, will provide sufficient coverage and/or capacity throughout a building, or group of buildings (i.e., a campus), or if new hardware is required within the campus. Alternatively, network engineers must determine whether local area coverage will be adequately supplemented by other existing macrocells, or whether and where, particularly, indoor wireless transceivers (such as wireless access points, smart cards, sensors, or picocells) must be added. The placement and configuration of these wireless devices is critical from both a cost and performance standpoint, and the on-going maintenance and management of the network and the management of the performance of users oil the network is vital to ensure network quality, quality of service (QoS) requirements, as well as reliability of the wireless network as more users come on the network or install nearby networks.

If an indoor wireless system currently exists, and a new network in a nearby building, home, or urban area is suddenly installed by an unintended interfering neighbor (or worse yet, by an intentional or hostile jammer), there is clearly a need to adapt the network to properly avoid the interference and to maintain network quality. Adaptive techniques such as power control, adaptive antennas, and frequency hopping are well known and have been used for over a decade in the cellular radio and military radio communities. Some literature on the subject includes "Smart Antennas" by Liberti and Rappaport," Prentice-Hall, c. 1999, and "Wireless Communications: Principles and Practice" (2/e) by T. S. Rappaport, c. 2002.

Not only must judicious planning be done to prevent new wireless indoor networks from interfering with signals from an outdoor macrocell or other nearby indoor networks at the onset of network deployment, but the designer must currently predict how much interference can be expected and where it will manifest itself within the building, or group of buildings ahead of time the best he or she can. Also, providing a wireless system that minimizes equipment infrastructure cost as well as installation cost is of significant economic importance.

It should be clear that a rapid and adaptive method for properly determining operating characteristics of a multiple-transmitter network (such as a Wireless LAN with many access points across a campus) is not only needed in the original installation and start-up of a network, but that in addition, after a system or network is installed, there is a continued need to manage the installed network over time and space, on both an adaptive., real-time or near real time basis through adaptive control, as well as on an intermittent or periodic basis, so that managers, technicians, network owners, and building owners, home owners, etc. are able to record, monitor, and continually ensure proper network operation. At the same time, these individuals need to be able to properly document the installation, adjust the network performance as required over time, and keep track of maintenance records of the system, as well as track the cost, maintenance repairs, and ongoing performance of the system and the components that make up the system in an orderly manner, so that on-going operational data may be gathered, understood, aggregated and used for further maintenance and build-out of wireless networks and systems by those same parties. Even better would be an autonomous system that could automatically conduct such operational bookkeeping so that an indoor wireless network could constantly adapt to the growing and changing interference or environmental changes around it, without the homeowner or building owner even needing to be aware of the operational details.

Research efforts by many leading programs have attempted to model and predict radio wave propagation. Work by AT&T Laboratories, Brooklyn Polytechnic, and Virginia Tech are described in papers and technical reports entitled: S. Kim, B. J. Guarino, Jr., T. M. Willis III, V. Erceg, S. J. Fortune, R. A. Valenzuela, L. W. Thomas, J. Ling, and J. D. Moore, "Radio Propagation Measurements and Predictions Using Three-dimensional Ray Tracing in Urban Environments at 908 MHZ and 1.9 GHz," IEEE Transactions on Vehicular Technology, vol. 48, no. 3, May 1999 (hereinafter "Radio Propagation"); L. Piazzi, H. L. Bertoni, "Achievable Accuracy of Site-Specific Path-Loss Predictions in Residential Environments," IEEE Transactions on Vehicular Technology, vol. 48, no. 3, May 1999 (hereinafter "Site-Specific"); G. Durgin, T. S. Rappaport, H. Xu "Measurements and Models for Radio Path Loss and Penetration Loss In and Around Hories and Trees at 5.85 GHz," IEEE Transactions on Communications, vol. 46, no. 11, November 1998; T. S. Rappaport, M. P. Koushik, J. C. Liberti, C Pendyala, and T. P. Subramanian, "Radio Propagation Prediction Techniques and Computer-Aided Channel Modeling for Embedded Wireless Microsystems," ARPA Annual Report, MPRG Technical Report MPRG-TR-94-12, Virginia Tech, July 1994; T. S.; Rappaport, M. P. Koushik, C. Carter, and M. Ahmed, "Radio Propagation Prediction Techniques and Computer-Aided Channel Modeling for Embedded Wireless Microsystems," MPRG Technical Report MPRG-TR-95-08, Virginia Tech, July 1994; T. S. Rappaport, M. P. Koushik, M. Ahmed, C. Carter, B. Newhall, and N. Zhang, "Use of Topographic Maps with Building Information to Determine Antenna Placements and GPS Satellite Coverage for Radio Detection and Tracking in Urban Environments," MPRG Technical Report MPRG-TR-95-14, Virginia Tech, September 1995; T. S. Rappaport, M. P. Koushik, M. Ahmed, C. Carter, B. Newhall, R. Skidmore, and N. Zhang, "Use of Topographic Maps with Building Information to Determine Antenna Placement for Radio Detection and Tracking in Urban Environments," MPRG Technical Report MPRG-TR-95-19, Virginia Tech, November 1995; S. Sandhu, M. P. Koushik, and T. S. Rappaport, "Predicted Path Loss for Roslyn, Va., Second set of predictions for ORD Project on Site Specific Propagation Prediction," MPRG Technical Report MPRG-TR-95-03, Virginia Tech, March 1995, T. S. Rappaport, et al., "Indoor Path Loss Measurements for Homes and Apartments at 2.4 and 5.85 GHz, by Wireless Valley Communications, Inc., Dec. 16, 1997; Russell Senate Office Building Study, Project Update, Roger R. Skidmore, et al., for Joseph R. Loring & Associates; "Assessment and Study of the Proposed Enhancements of the Wireless Communications Environment of the Russell Senate Office Building (RSOB) and Associated Utility Tunnels," AoC Contract #Acbr96088, prepared for Office of the Architect of the Capitol, Feb. 20, 1997; "Getting In," R. K. Morrow Jr. and T. S. Rappaport, Mar. 1, 2000, Wireless Review Magazine; and "Isolating Interference," by T. S. Rappaport, May 1, 2000, Wireless Review Magazine, "Site Specific Indoor Planning" by R. K. Morrow, Jr., March 1999, Applied Microwave and Wireless Magazine, "Predicting RF coverage in large environments using ray-beam tracing and partitioning tree represented geometry," by Rajkumar, et al, Wireless Networks, Volume 2, 1996.

The aforementioned papers and technical reports are illustrative of the state-of-the-art in site-specific radio wave propagation modeling. While most of the above papers describe a comparison of measured versus predicted RF signal coverage, or describe methods for representing and displaying predicted performance data, they do not report a comprehensive method for optimizing or adjusting the parameters of equipment settings such as power levels, channelization, or data rates, etc. within an environment to affect a desired behavior in an actual operating network or a planned network.

Furthermore, the above mentioned propagation papers do not teach a way to autonomously allow a network to be properly provisioned for the allocation of multiple classes of data users in a wireless network, nor do they teach any type of display of such performance or the comparisons of predicted versus measured performance that would be due to proper feedback of predicted performance results to the operational wireless infrastructure. While other prior art listed below considers network adaptive control and feedback based on simulation or preset specifications, no work has considered using a site-specific wireless environmental model, that allows a user to simultaneously view the physical environment, control network performance parameters, and see the performance of the network in an adaptive manner.

Additionally, no one has considered the importance of properly configuring, regulating, or controlling the wireless infrastructure in order to properly provision various classes of simultaneous wireless data users in an in-building network, where accurate site-specific propagation modeling is at the heart of driving and setting operating points of an in-building network, so that proper ongoing performance can be carried out in real-time or near real-time as the network changes over time and space. Clearly, this is crucial for on-going network performance as more users and more interfering networks proliferate.

The "Radio Propagation" and "Site-Specific" papers make reference to 3-D modeling, but do not offer novel methods for utilizing the 3-D modeling to carry out automatic equipment configurations or parameter adjustments, nor do they contemplate any type of autonomous control or feedback that uses the predictions to drive, in real time, the actual network performance. An effective method that allows a network communications technician or designers or building owners to automatically determine and visualize the proper configuration and settings of wireless or wired hardware equipment in a site-specific data management system, in a real time or simulated manner, in order to attain optimal or preset desired network performance criteria does not exist in the prior art.

Common to all wireless network and communication system designs as well as wired network designs is the desire to maximize the performance and reliability of the system while minimizing the deployment costs and maximizing on-going performance. Ways to minimize cost include the use of computer aided design tools that manage many aspects of the design process upon installation, and on a periodic basis after the network is operational. Such tools also help create methods that enable the engineer or technician to work quickly and to document their work for others in the organization (SitePlanner and LANPlanner are applications by Wireless Valley Communications, Inc. that provide these capabilities).

Consider a wireless network, for example. Analyzing radio signal coverage, quality of service, capacity, handoff or coverage zones, throughput, delay, signal strength or interference is of critical importance for a number of reasons. A design engineer must determine if an indoor environment that is a candidate for a wireless system contains too much noise or interference, or if the existing wireless system will provide sufficient signal power throughout the desired service area. Alternatively, wireless engineers must determine whether local area coverage will be adequately supplemented by existing large-scale outdoor wireless systems, or macrocells, or whether indoor wireless transceivers, WLAN access points, repeaters, or picocells, must be added. The ability to have adaptive control of the in-building access points so that they can be adjusted automatically in response to changes in the environment to provide improved performance in the face of interference or increased capacity or added users is a significant improvement. Even something as simple as adjusting the carrier frequency or channel of an access point to avoid a nearby jamming access point, adjusting the transmit power of an access point to increase or decrease the coverage area, adjusting the orientation or configuration of electrically steerable or smart antennas, or to throttle down the data rate because of microwave oven interference, could provide significant benefit to users of the network.

The placement and configuration of wireless and wired equipment, such as routers, hubs, switches, cell sites, cables, antennas, distribution networks, receivers, transceivers, transmitters, repeaters, or access points is critical from both a cost and performance standpoint. The design engineer, must predict how much interference can be expected from other wireless systems and where it will manifest itself within the environment. In many cases, the wireless network interferes with itself, forcing the designer to carefully analyze many different equipment configurations in order to achieve proper performance. Sometimes power cabling is only available at limited places in a building or campus, thus decisions must be made with respect to the proper location and quantity of access points, and their proper channel assignments. Prediction methods which are known and which are available in the literature provide well-accepted methods for computing, coverage or interference values for many cases.

Depending, upon the design goals or operating preferences, the performance of a wireless communication system may involve tradeoffs or a combination of one or more factors. For example, the total area covered in adequate received or radio signal strength (RSSI), the area covered with adequate data throughput levels, and the numbers of customers that can be serviced by the system at desired qualities of service or average or instantaneous bandwidth allocations are among the deciding factors used by design engineers in planning the placement of communication equipment comprising the wireless system, even though these parameters change with time and space, as well as with the number and types of users and their traffic demands.

Until the current invention, all adaptive control environment based on site-specific performance prediction modeling for digital data networks, while relying upon real-time wireless network feedback and visual display capabilities for a performance basis, did not exist.

There are many computer aided design (CAD) products on the market that can be used to aid in some manner for wireless design or optimization, but none consider the in-building data scenario with site-specific control and autonomous feedback for network provisioning and scheduling in and around buildings and campuses. WiSE from Lucent Technology, Inc., SignalPro from EDX (now part of Comarco), PLAnet by Mobile Systems International, Inc., (later known as Metapath Software international, now part of Marconi, P.L.C.), decibelPlanner from Marconi, and TEMS from Ericsson, Wizard by Safco Technologies, Inc. (now part of Agilent Technologies, Inc.), are examples of CAD products developed to aid in the design of wireless communication systems.

Agilent Technologies offers Wizard as a design tool for wireless communication systems. The Wizard system predicts the performance of macrocellular wireless communication systems based upon a computer model of a given environment using statistical, empirical, and deterministic predictive techniques.

Lucent Technologies, Inc., offers WiSE as a design tool for wireless communication systems. The WiSE system predicts the performance of wireless communication systems based on a computer model of a given environment using a deterministic radio coverage predictive technique known as ray tracing.

EDX offers SignalPro as a design tool for wireless communication systems. The SignalPro system predicts the performance of wireless communication systems based on a computer model of a given environment using a deterministic RF power predictive technique known as ray tracing.

WinProp offers a Windows-based propagation tool for indoor network planning made by AWE from Germany, and CINDOOR is a European university in-building design tool.

Marconi, P.L.C., offers both PLAnet and decibelPlanner as design tools for wireless communication systems. The PLAnet and decibelPlanner systems predict the performance of macrocellular and microcellular wireless communication systems based upon a computer model of a given environment using statistical, empirical, and deterministic predictive techniques. PLAnet also provides facilities for optimizing the channel settings of wireless transceivers within the environment, but does not provide for further adaptive transceiver configurations beyond channel settings.

Ericsson Radio Quality Information Systems offers TEMS as a design and verification tool for wireless communication indoor coverage. The TEMS system predicts the performance of indoor wireless communication systems based on a building map with input base transceiver locations and using empirical radio coverage models. Teleworx developed an Automatic Frequency Planning Tool (AFP) as announced in January 1999 Wireless Review Magazine, and other corporations such as CelPlan and Safco have implemented Automated Frequency Planning that iteratively determines good channel assignments for transmitters in cellular radio systems.

The above-mentioned design tools have aided wireless system designers by providing facilities for predicting the performance of wireless communication systems and displaying the results primarily in the form of flat, two-dimensional grids of color or flat, two-dimensional contour regions. None of the aforementioned design tools have an automated facility for determining the ideal configurations or establishing pre-set operating points for wireless LAN transceivers or other data-centric modems modeled in a site-specific environment in order to achieve some optimal or desired overall or individual network performance. Furthermore, none of the aforementioned design tools contemplate an automated facility for determining the ideal configurations for wireless data transceivers modeled in a 3-D environment in order to achieve some optimal network performance, while simultaneously displaying the physical location of network assets on a site-specific model of the physical environment.

In addition to the aforementioned design tools, there are several commercially available products that provide the facility for determining optimal transceiver channel settings. Optimizer™ from Schema Ltd., ScoreBoard™ from ScoreBoard Inc., OPAS32 from Agilent Technologies, and E-NOS from Actix are representative of the state-of-the-art in wireless network optimization from the standpoint of frequency planning primarily in the cellular and PCS environments.

Schema Ltd. provides the Optimizer™ software application to assist in the planning and allocation of channels among a specified set of transceivers on a given wireless network. Optimizer™ utilizes measurement information collected either from mobile receivers roaming throughout the coverage area of an existing network or measurement information obtained through monitoring traffic from each transceiver of an existing network. By analyzing the measurement information, Optimizer™ attempts to determine the optimal allocation of channels and/or frequencies across all transceivers participating in the analysis in order to improve the performance of the network. Optimizer™, however, does not consider the physical environment or the detailed specifications or site-specific placements or interconnections of equipment involved in the network, thereby failing to offer the added benefit of visualization of network configuration (valuable for design, deployment, and on-going maintenance, since indoor wireless antennas are often hidden), and further suffering from less accurate modeling since site-specific data is not used by the application. In addition, because Optimizer™ requires measurement data from an existing network, it is not applicable to networks being planned and not yet deployed.

ScoreBoard Inc. provides ScoreBoard™, a comprehensive software solution that assists in the planning and allocation of channels or frequencies among a specified set of transceivers on a given wireless network. ScoreBoard utilizes measurement information collected either from mobile receivers roaming throughout the coverage area of an existing network or measurement information obtained through monitoring traffic reported by transceivers in an existing network. By analyzing the measurement information, ScoreBoard attempts to determine the optimal allocation of channels and or frequencies across all transceivers participating in the analysis in order to improve the performance of the network. ScoreBoard™, however, does not consider the physical environment or the detailed specifications or site-specific placements or interconnections of equipment involved in the network, thereby failing to offer the added benefit of visualization of network configuration (valuable for design, deployment, and on-going maintenance since indoor network components such as antennas are often hidden), and further suffering from less accurate modeling since site-specific propagation or environmental data is not used by the application. In addition, because ScoreBoard™ requires measurement data from an existing network, it is not as applicable to networks being planned and not yet deployed.

Agilent Technologies provides OPAS32, analysis software that assists in the planning and allocation of channels among a specified set of transceivers on a given wireless network. OPAS32 utilizes measurement information collected room mobile receivers roaming throughout the coverage area of an existing network. By analyzing the measurement information, OPAS32 attempts to determine the optimal allocation of channels and/or frequencies across all transceivers participating in the analysis in order to improve the performance of the network. OPAS32, however, does not consider the physical environment or the detailed specifications or site-specific placements or interconnections of equipment involved in the network, thereby failing to offer the added benefit of visualization of network configuration (valuable for design and on-going maintenance), and further suffering from less accurate modeling since site-specific data is not used by the application. In addition, because OPAS32 requires measurement data from an existing network, it is not applicable to networks being planned and not yet deployed.

Actix provides the E-NOS™ analysis software that assists in the planning and allocation of channels among a specified set of transceivers in a given wireless network. E-NOS™ utilizes measurement information collected from mobile receivers roaming throughout the coverage area of an existing network. By analyzing the measurement information, E-NOS™ attempts to determine the optimal allocation of channels and/or frequencies across all transceivers participating in the analysis in order to improve the performance of the network. E-NOS™, however, does not consider the physical environment or the detailed specifications or site-specific placements or interconnections of equipment involved in the network, thereby failing to offer the added benefit of visualization of network configuration (valuable for design and on-going maintenance), and further suffering from less accurate modeling since site-specific data is not used by the application. In addition, because E-NOS™ requires measurement data from an existing network, it is not applicable to networks being, planned and not yet deployed.

Visional is a network management software company that provides auditing and documentation capabilities for wired data communication networks. Visional does not use site-specific environmental information or wireless prediction methods for predicting or measuring network performance, nor do they provide support for predicting, measuring, optimizing or controlling parameters that are fundamental to wireless networks. Furthermore, they do not provide means for controlling a wide range of wireless network users for desired performance throughout a network.

In addition, various systems and methods are known in the prior art with the regard to the identification of the location of mobile resources or clients currently roaming on a wireless network. Such systems and methods are generally referred to as position location techniques, and are well-known in the field for their ability to use the RF characteristics of the transmit signal to or from a mobile device as a determining factor for the position of the mobile device. Various papers such as P. Bahl, V. Padmanabhan, and A. Balachandran, "A Software System for Locating Mobile Users: Design, Evaluation, and Lessons," April 2000, present various techniques for doing position location. The present invention provides significant benefit to the field of position location by enabling the a priority determination of the RF propagation and channel environment within the facility without the need for exhaustive measurement campaigns. The predictive capability of the invention enables the RF channel characteristics—a vital factor in position location algorithms and techniques to be determined very quickly and accurately. The measurement capability of the invention allows signal measurements to be made from portable client users. The predictive and measurement results can be processed and then be mapped onto a site-specific model of the environment for ready use in carrying out position location displays, and studies or analysis of location-specific data.

SUMMARY OF THE INVENTION

Until the present invention, it has not been possible for a wireless network technician or manager to design a network ahead of time with a particular site-specific design application, and then use that same application for real-time or near real-time design, management and control of that same network. The current invention provides a significant value to the networking community, since original documentation and knowledge created during the design phase can now be reused time and again with no additional effort, in the same application for network control and smart network management. Thus, the invention provides a new kind of network application that enables complete management, measurement, design, and maintenance for any wireless network in an on-going, seamless, and adaptive manner.

As in-building wireless LANs and microcell wireless systems proliferate, all of the issues facing network installers, carriers, and network technicians may now be resolved quickly, easily, and inexpensively using the current invention. Just as CAD tools are used by engineers and IT professionals to design and deploy a wireless network by considering the performance of components while they also consider multiple, potentially unrelated, factors before the actual deployment of a network, we now disclose a novel method and system that uses powerful CAD capabilities with adaptive algorithms and real time communication links to provide a computational engine for network control and provisioning of wireless data networks, after the network is installed using the same application. The current invention displays network performance while providing adaptive control of network performance in a manner easily interpretable by network engineers or technicians. With the present invention, it becomes possible for a user to visualize and set network performance requirements, while the invention provides simulations that in turn provide feedback signals to the wireless hardware under control for proper network adjustments that are adjusted in real-time or in a delayed fashion to meet the newly described network conditions derived from simulation.

Two dimensional (2-D) and three dimensional (3-D) visualization of wireless system operating parameters, desired operating performance values and/or metrics, and actual measured operating metrics provided in a site-specific model of a network environment provides the user with rapid assimilation of large data sets and their relation to the physical environment, as well as with a control mechanism by which to alter network performance.

As wireless systems proliferate, the current invention promises to vastly improve the capabilities of network operations, by providing a low cost, seamless application that can be used during design and then again during on-going real-time management of any network. The invention may be bundled with any PC or handheld application, or even embedded within a wireless integrated circuit or chip set, to allow site-specific remote control and autonomous adjustment of access points and wireless hardware with the CAD controlling software, in order to provide desired predicted or pre-specified site-specific performance requirements in actual operating networks.

The invention may be implemented on a single user computer, such as personal computer, or it may alternatively be implemented in a distributed manner, such that control GUI portion of the invention may operate on one computer, and part of the invention for a particular piece of equipment or device may operate on either another computer or may be implemented in many ways within a device. For example, the control/GUI part of the invention may ship as executable files on a standard PC or handheld computer application, and part of the invention may be implemented on a chip (an integrated circuit or circuits) or as embedded software or as a series of computing instructions combined with memory, wherein the memory or chip contains or may receive an electronic upload of a site-specific map of the components and wireless infrastructure that is controllable by the invention. It is possible that more than one computer can provide control/GUI capabilities, so that the invention may be mass duplicated and configured to operate, in part, with every laptop or PC, and control any number of components in a generic network deployed by the customer of many laptops, for example. Using an embedded map of the network architecture layout along with a map of the physical environment and the infrastructure layout, interconnections, cost data, and maintenance data, the invention allows for measurements or control signals to be compared in real time or off-line with prediction models. Further, the invention utilizes adaptive algorithms to provide control signals and communications that are sent to or from components within the network.

Alternatively, embedded software or a chip implementation may be programmed for use in the remote wireless transceiver or other infrastructure hardware, where such embedded software or chip implementation then enables the computerized CAD application (presumably operating from a network console or other central location, although the CAD application itself could also be portable or distributed) to communicate with network hardware as necessary to cause the hardware to adjust its settings, configuration, position, and other controllable parameters to affect the desired network performance as dictated by the computerized CAD application.

One embodiment of the current invention uses the site-specific computer aided design environment pioneered by Wireless Valley in concert with a real time or near real time communication linkage to actual wireless devices and components (such as wireless access points, amplifiers, repeaters, etc.) so that the computer aided design environment may be used as a powerful visual display, but also as a computational engine that generates predictions and then allows for feedback and adjustment of parameters in the wireless network infrastructure through the comparison and systematic evaluation of measured performance reported by the wireless infrastructure, and the predicted performance provided by the computer aided design application. In this manner, the CAD software allows the adjustment of multiple transmission points to achieve a desired overall or specific performance metric specified by the user or as set within the CAD software. Such adaptive control using site-specific modeling is novel for wireless networks in and around buildings with varying user classes, but is vital to future networks as they become Internet-based (packet based) as well as circuit-switched based. This may be done in an off-line simulation (design) mode, but also may be performed in a real-time or near real-time control mode, where the measured signal or interference levels (or other measured parameters) are sensed and used to iterate the proper reconfiguration of actual network hardware connected to the invention. Thus, the present invention serves as an adaptive controller and Graphical User Interface (GUI) for an in-building or campus or wide area wireless network, to ensure proper network operations as users enter and leave the network, or as new tenants install new access points in an uncoordinated fashion.

The current invention is also valuable for controlling a Wireless LAN network, for example, that supports several simultaneous users, some who paid for premium access (say for Voice over IP where delays are not tolerated by customers) and others who paid for low-grade wireless access (say for e-mail or paging data access), or for controlling and adaptively adjusting parameters of network equipment to minimize interference or to coordinate networks within a building or campus for proper performance and data access provisioning.

It is therefore an object of the present invention to facilitate the automated determination of desirable configuration settings for one or more wireless transceivers and other network hardware in a communication system, based on the desired network performance requirements, the real time radio frequency environmental conditions and user activities in the network, and specifications and capabilities of the infrastructure hardware, which include: manufacturer, model number of the device, transmit or receive power settings, input and output gain settings, channel or frequency settings and/or channel lists, bandwidth of transmitted or received signal, modulation scheme, data or symbol rate, protocol stack, coding, user priority settings or allowances, antenna pointing or phasing parameters, location of component, orientation of component, cost of component, maintenance cost of component, gain, loss, or any other parameter configurable for a given piece of equipment. The desirability of configuration settings are determined by identified pre-dominance goals for the communications network, such as overall coverage, overall capacity, specific coverage for a user class, specific capacity for a user class, coverage for a subset of users, capacity for a subset of users, handoff rate, dropped call rate, blocked call rate, dropped packet rate, symbol error rate, symbol rate, acceptable coverage zones, throughput (average, peak, individual, group, class or subclass, bit error rate, packet error rate, frame error rate, signal level, quality of service, or any other measurable performance metric, where such performance metrics may be specified, simulated, set, and adapted to for a particular user, a group of users of a particular user class, a composite collection of users from one or more classes or subclasses, or a fraction or entire user pool within a network.

It is another object of the present invention to provide a mechanism by which one or more wireless transceivers and other network infrastructure components communicate with a controlling computer or computers, where a site-specific CAD application capable of predicting, displaying, measuring, and monitoring network performance, maintaining cost and maintenance records, and providing visual capabilities of such data is available for network control on said controlling computer or computers, in either a stand-alone or distributed manner.

It is another object of the present invention to provide a mechanism for displaying logging, storing, and reporting the desirable configuration settings and/or measured setting for said transceivers and other infrastructure hardware in a communication network.

It is another object of the present inventions to perform said automated determination of desirable configuration settings for transceivers and other network hardware in a communication network within a site-specific database that involves a part of one building or a plurality of building structures and the surrounding, terrain, flora, man-made items, climatic conditions, and additional static and dynamic obstacles.

It is another object of the present invention to perform automated determination of desirable configuration settings for one or more transceivers or hardware components in a communication network within a site-specific database that involves measurements of performance, and at least a part of one or more building structures and the surrounding terrain, flora, man-made items, climatic conditions, and additional static and dynamic obstacles utilizing site-specific radio wave propagation prediction techniques and environmental models of the site-specific physical environment.

It is another object of the present invention to update the configuration (e.g. equipment settings) of the actual network infrastructure (such as wireless access points, transceivers, sensors, multiple input-multiple output (MIMO) systems, switches, routers, repeaters, antennas, etc.) in the communications network involved in the analysis for optional or preferred or desired configuration, said configuration update occurring through communication of control and data signals between the site-specific CAD application and the actual network infrastructure, whereas the communication of control and data signals occurs using the Internet, SMNP, wireless, infrared, or some other data communication, communication protocol, or electronic medium, in either a real time or non-real time manner and in either a synchronous or asynchronous manner.

It is another object of the present invention to provide a single CAD design, measurement, maintenance, and optimization application that can be used in pre-bid, design, deployment, and on-going real-time network management and maintenance applications with 110 additional software requirements, and which can be provided to users en-mass through distribution on personal computers and/or as embedded in communication network devices.

It is another object of the present invention to provide a downloadable model of the site-specific environmental model, including some or all of hardware component data, maintenance data, cost data, measurement capabilities, performance prediction capabilities, optimization capabilities, and adaptive control capabilities which exist in the simulated CAD environment, into a PC or handheld or chip-level device, so that the on-going management and control of networks may be carried out in real time or non-real time using a portable or embedded mechanism that is shippable in virtually every wireless access point, wireless transceiver, network hardware device, or PC.

It is another object of the present invention to provide a remote monitoring means, whereby measured network performance characteristics can be passed to a CAD software application from one or more remote network infrastructure components, and where such remote monitoring provides measured performance metrics or cost or maintenance data which may be displayed, logged, stored, or compared with predicted simulations or budgetary forecasts by the CAD software application.

It is another object of the present invention to provide a means by which the CAD software application may obtain measurements of network performance characteristics independent of measurements made by network infrastructure hardware.

It is another object of the present invention to provide an iterative and adaptive mechanism by which the network infrastructure hardware may be adjusted as needed, periodically, or upon demand by a user or by preset or preferred conditions, in order to meet a prescribed performance objective or objectives for the entire network.

It is another object of the present invention to provide an iterative and adaptive mechanism by which the computer models of the network infrastructure hardware may be adjusted or revised in order to meet a prescribed performance objective or objectives for the entire modeled network.

It is another object of the present invention to provide and support position location determination of mobile or portable wireless users, through measurement of signals by network equipment or by prediction of position location using site-specific propagation prediction models, in a fashion that allows the display of estimated position locations of wireless users.

According to the present invention, a system is provided for allowing a communication network designer, technician, or wireless network user to dynamically model a wired or wireless system, electronically in any environment. The method includes the selection and placement of models of various wireless or optical or baseband communication system hardware components, such as antennas (point, omnidirectional, directional, adaptive, leaky feeder, distributed, etc.), base stations, base station controllers, amplifiers, cables, splitters, attenuators, repeaters, wireless access points, couplers, connectors, Connection boxes, splicers, switches, routers, hubs, sensors, transducers, translators (such as devices which convert between RF and optical frequencies, or which convert between RF and baseband frequencies, or which convert between baseband and optical frequencies, and devices which translate energy from one part of the electromagnetic spectrum to another), power cables, twisted pair cables, optical fiber cables, and the like, as well as MIMO systems, and allows the user to visualize, in three-dimensions, the effects of their placement and movement on overall system performance throughout the modeled environment. For the purposes of this invention, the term "transceiver" shall be used to mean any network component that is capable of generating, receiving, manipulating, responding to, passing along, routing, directing, replicating, analyzing, and/or terminating a communication signal of some type. Thus, the placement of components can be refined and fine-tuned prior to actual implementation of a system or network, wherein performance prediction modeling or measurement may be used for design and deployment; and to ensure that all required regions of the desired service area are blanketed with adequate connectivity, RF coverage, data throughput, or possess other required network system performance values, such as acceptable levels of quality of service (QoS), packet error rate, packet throughput, packet latency, bit error rate, signal-to-noise ratio (SNR), carrier-to-noise ratio (CNR), signal strength or RSSI, rims delay spread, distortion, and other commonly used communication network performance metrics, known now or in the future, which may be measured or predicted and which maybe useful for aiding an engineer in the propel installation, design, or ongoing maintenance of a wired or wireless communications network. In the case of an optical or baseband wired network, for example, the placement and performance of components can be visualized within the invention to ensure that proper portions of the environment are supplied with service, so that users within the environment may connect directly (with a hardwired connection) or via a wireless or infrared connection which can be provided throughout the wired network using translators, converters, wireless access points, and other communication components that facilitate frequency translation and wireless access from the wired network. The 2-D and 3-D visualization of system performance provides network designers and maintenance personnel with tremendous insight into the functioning of the modeled wireless or wired communication system, and represents a marked improvement over previous visualization techniques.

To accomplish the above, a 2-D or 3-D site-specific model of the physical environment is stored as a CAD model in an electronic database. This model may be extensive and elaborate with great detail, or it may be extremely simple to allow low cost and extreme ease of use by non-technical persons wanting to view the physical layout of the network. The physical, electrical, and aesthetic parameters attributed to the various parts of the environment such as walls, ceilings, doors, windows, floors, foliage, buildings, hills, and other obstacles that affect radio waves or which impede or dictate the routing of wiring paths and other wired components may also stored in the database. A representation of the environment is displayed on a computer screen for the designer to view. The designer may view the entire environment in simulated 3-D, zoom in on a particular area of interest, or dynamically alter the viewing location and perspective to create a "fly-through" effect.

Using a mouse or other input positioning device, the designer may select and view various communication hardware device models that represent actual communication system components from a series of pull-down menus. A variety of amplifiers, cables, connectors, and other hardware devices described above which make up any wired or wireless communication system or network may be selected, positioned, and interconnected in a similar fashion by the designer to form representations of complete wireless or wired communication systems. U.S. Pat. No. 6,493,679 entitled "Method and System for Managing a Real-Time Bill of Materials" awarded to Rappaport et al sets forth a preferred embodiment of the method for creating, manipulating, and managing the communication system infrastructure as modeled in the CAD software application.

In the present invention, the designer may use the invention to perform calculations to predict the performance of the communications network modeled within the environment. Performance is defined by any form of measurable criteria and includes, but is not limited to, adequate connectivity, RF coverage, data throughput, or required network system performance values, such as acceptable levels of quality of service (QoS), packet error rate, packet throughput, packet latency, bit error rate, signal-to-noise ratio (SNR), carrier-to-noise ratio (CNR), signal strength or RSSI, desired rms delay spread, distortion, and other commonly used communication network performance metrics, known now or in the future. The method presented additionally provides a means for visualizing the predicted performance values overlaid onto and/or embedded within the site-specific model of the environment. The present invention extends the prior art in this area by allowing a designer a quick, 3-D view of performance data overlaying the environment model. U.S. Pat. No. 6,317,599 entitled "Method and System for Automated Optimization of Antenna Positioning in 3-D" awarded to Rappaport et al. sets forth a preferred embodiment of the method for predicting the performance of a communications network within a site-specific model of the environment.

Through novel techniques provided by the present invention, the performance of a proposed or existing communications network within a particular environment can be improved through automated analysis. The user may specify particular desired operating characteristics or criteria, or these may be preset or preferred within the invention by the last user or by others who establish the set-up profile for users of the invention. The present invention predicts the performance of the communications network modeled in the site-specific environment, with all equipment first in a specific configuration. Then, the configuration of each piece of equipment is iterated, in either real time or non-real time, through a set of possible configuration settings, either defined by the user, defined by the specific equipment, or selected by the invention based on a sensed or a priori knowledge of the specified equipment, and the performance of the network is then recomputed by the invention.

For example, when not in real-time control mode, the present invention can simulate a network by reconfiguring a particular transceiver to have a different set of channels allocated to it, or it can replace a transceiver with one from a different manufacturer that has different operating characteristics, power levels, antenna patterns or orientations, or different channels, etc. Once all possible configurations have been analyzed, through iterative methods or genetic algorithms or some other method, the desired operating criteria are achieved, or the user decides to terminate the search, the equipment configurations that provide the most desirable network performance is displayed by the invention, and may also be stored for documentation purposes. The desired network configuration is preferably also stored in the bill of materials and a complete cost breakdown is provided for display and stored for future use. This data may also be communicated partially or in full to each network infrastructure component for storage and later retrieval in the network.

In addition, desired network configuration information may be transmitted and stored in some external database utilized for the generation of work orders, maintenance instructions, troubleshooting information, or accounting information. In this case, the invention is capable of automating the workflow of an organization by automatically or through user-intervention generating and issuing work orders for system engineers, IT managers, maintenance personnel, and technicians with regard to desired network configuration changes, and then notifying or updating the appropriate accounting records to reflect the cost of the new network configuration, including the replacement or discarding of old or damaged network hardware and the addition of new network hardware.

When the invention is used with actual hardware configured to the CAD application, iterative analysis using brute force or genetic algorithms can lead to proper hardware settings for each transceiver in the network, and the actual hardware is then controlled in order to achieve the desired network performance. This analysis is based upon predicted performance criteria within a computerized representation of an environment at the CAD application. Note that this invention may be used purely for automated "what-if" designs without actual control of the equipment, or may also be instituted with actual network hardware operating in the environment. Furthermore, iteratively adjusting the settings of the wireless hardware may be performed in real time, non-real time or delayed real time, or may be suppressed until the user is actually ready to implement the desired network hardware settings. Also, it is clear that further iterations might be advisable or necessary after the invention achieves its first round of network configuration settings that meet the performance criteria as further improvements may be desirable or necessary.

In addition, if the communications network represented within the computer model of the environment is already in place, and the equipment within the communications network is ready to be re-configured through some controlling means, the present invention provides the capability of configuring the equipment within a communications network to have the configuration settings identified as a result of the analysis/simulation. Once the invention has determined, through the automatic process described above or by other means, the configuration settings for a given piece of equipment that allows a more desirable level of network performance, the invention can communicate with the physical equipment in the infrastructure via slow or fast control channels or data channels over the air, or via the Internet or through SMNP or some other data communication medium or protocol, and send the equipment the new configuration settings it should set for itself. Through this means, the entire communications network may be re-configured either automatically or through user interaction to achieve a different level of desired performance, and has the advantage of "self healing" when additional users or increased interference occurs in the network. In the case that the network is unable to achieve the original specification for desired performance, a default or failsafe list of settings may reside in memory

BRIEF DESCRIPTION OF THE DRAWINGS

The foregoing and other objects, aspects and advantages will be better understood from the following detailed description of a preferred embodiment of the invention with reference to the drawings, in which:

FIG. 4 is an example pick list of equipment types;

FIG. 5 is and example pick list of equipment configurations;

FIG. 23b shows the WLAN of FIG. 22 with a query dialog similar to that shown in FIG. 23a;

DETAILED DESCRIPTION OF A PREFERRED EMBODIMENT OF THE INVENTION

Using the present method, it is now possible to improve the performance and ongoing management of a communication network to a much higher level of precision than previously possible, at substantially reduced cost and complexity. The present method is a significant advance over the prior art in the automated use of predicted or measured performance metrics to determine and drive a preset, desired, or optimal or preferred configuration of communication system infrastructure. The invention provides significant cost savings through the use of software that may used in many different phases of the life cycle of a network, while providing simultaneous capabilities in design, performance prediction, remote monitoring, and adaptive simulation and control of wireless infrastructure. The design of communication systems is often a very complex and arduous task, with a considerable amount of effort required to simply analyze the results of system performance.

Figure 1:
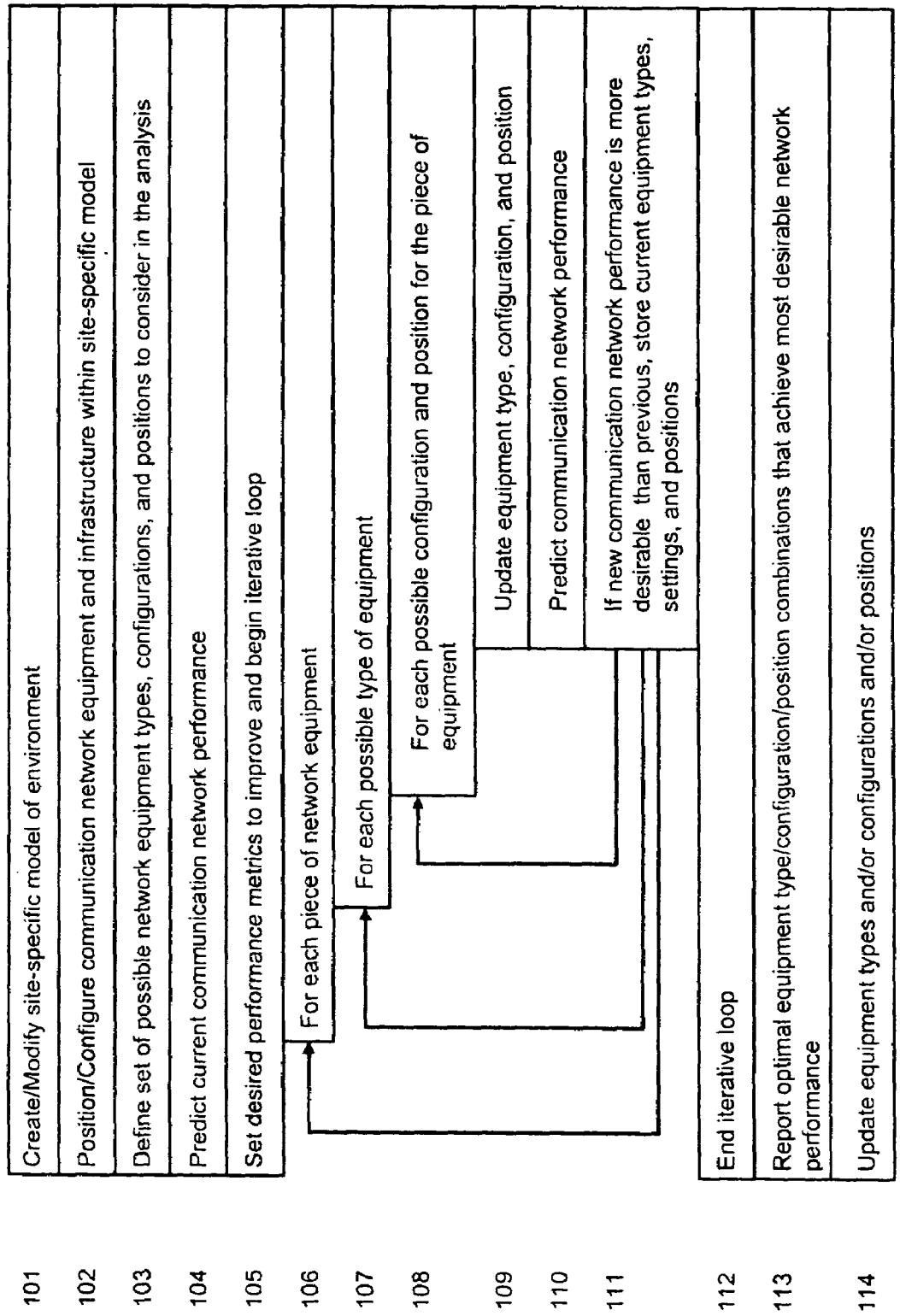
FIG. 1 shows a flow diagram showing process steps employed in the invention.

Referring now to FIG. 1, there is shown the general process of the present method. In order to begin analyzing a communication network, a site specific computer representation of the environment in which the communication network is or will be deployed is created 101. The present invention uses 2-D or 3-D computer aided design (CAD) renditions of a part of a building, a building, or a collection of buildings and/or surrounding terrain and foliage. However, any information regarding the environment is sufficient, including 2-D or 3-D) drawings, raster or vector images, scanned images, or digital pictures. The site-specific information is utilized by the present invention to enable visualization and relatively precise positioning of the communications infrastructure and to provide a model of the environment sufficient for performing visualizations that show the user measurements and/or predictions of network performance.

According to the invention, there is provided digital site-specific information regarding terrain elevation and land-use, building positions, tower positions, as well as geometries, height, and the internal layout of the walls, doors, ceilings, floors, furniture, and other objects within buildings, where the digital information may be in separate data formats or presentations, including two- or three-dimensional raster or vector imagery, and are combined into a single, three-dimensional digital model of the physical environment. Alternately, a series of 2-D images may be collected to represent the 3-D environment. The resulting three-dimensional digital model combines aspects of the physical environment contained within the separate pieces of information utilized, and is well suited for any form of display, analysis, or archival record of a wireless communication system, computer network system, or may also be used for civil utilities planning and maintenance purposes to identify the location of components, as well as their costs and specifications and attributes.

Figure 2:
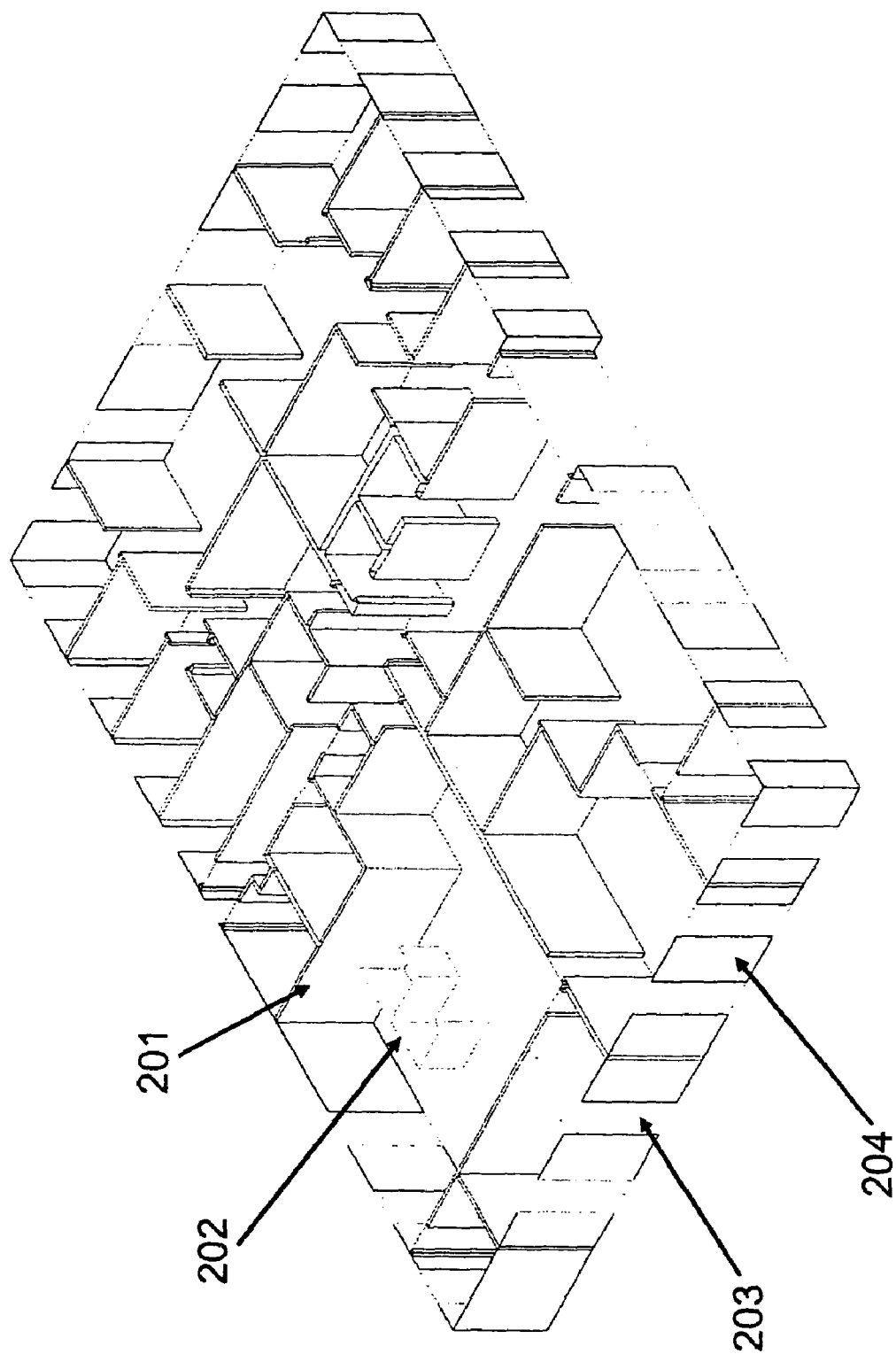
FIG. 2 is a three dimensional perspective of a building floor plan.

An example of a building environment as represented in the present invention is shown in FIG. 2. The various physical objects within the environment such as external walls 204, internal walls 201, cubicle walls 202, and windows 203 are represented within the model. Although a single floor of one building is shown for simplicity, any number of multi-floored buildings (or portions thereof and the surrounding terrain may be represented within the invention. Any form of obstruction or clutter that could impact or alter the performance or physical layout of a communications network can be represented within the present invention. The electrical, mechanical, aesthetic characteristics of all obstructions and objects within the modeled environment may also be input and utilized by the invention. Such data is beneficial for improving the accuracy of performance predictions in wireless networks. For example, for wireless communication system design, the relevant information for each obstruction includes but is not limited to: material composition, size, position, surface roughness, attenuation, reflectivity, absorption, and scattering coefficient. For example, outside walls 204 may be given a 10 dB attenuation loss, signals passing through interior walls 201 may be assigned 3 dB attenuation loss, and windows 203 may show a 2 dB RF penetration loss.

This invention also enables a user to specify other physical, electrical, electromagnetic, mechanical, and aesthetic characteristics of any surface or object within the three-dimensional model. These characteristics include but are not limited to: attenuation, surface roughness, width, material, reflection coefficient, absorption, color, motion, scattering coefficients, weight, amortization data, thickness, partition type, owner and cost. In addition, information that is readily readable or writeable in many widely accepted formats, can also be stored within the database structure, such as general location data, street address, suite or apartment number, owner, lessee or lessor, tenant or ownership information, model numbers, service records, maintenance records, cost or depreciation records, accounting records such as purchasing, maintenance., or life cycle maintenance costs, as well as general comments or notes which may also be associated with any individual surface or building or object or piece of infrastructure equipment within the resulting three-dimensional model of the actual physical environment.

Note that all of these types of data specified in the preceding paragraphs typically reside in a computer CAD application which has the ability to iteratively or autonomously compute alternative communication network configurations of all network equipment, based on preset or user-specified design or operating points. However, these data records may also be digitized and passed between and/or stored at individual pieces of hardware equipment in the network for storage or processing at each particular piece of equipment.

Estimated partition electrical properties loss values can be extracted from extensive propagation measurements already published, which are deduced from field experience, or the partition losses of a particular object can be measured directly and optimized or preferred instantly using the present invention combined with those methods described in the U.S. Pat. No. 6,442,507 which is hereinincorporated by reference.

Referring once more to FIG. 1, once the appropriate site-specific model of the environment has been specified 101, any desired number of hardware components, communications infrastructure, or equipment can be positioned, configured, and interconnected in the site-specific model 102. The communications network is site-specifically modeled within the invention by manual or automatic means, whereby the actual physical components used to create the actual physical network are modeled, placed and interconnected graphically, visually, and spatially within the site-specific database model in order to represent their actual thee physical placements within the actual physical environment. This provides a site-specific model of a network of interconnected components within the database model.

Associated with at least some of the communication network components (sometimes referred to as infrastructure equipment or hardware) within the database model are infrastructure information, which may be in the form of data records, memory data, files, or text entries which contain the infrastructure information that is uniquely associated with every individual component in space within the modeled environment. That is, three different pieces of the same tape of equipment within a network that is modeled within a city using this invention would have three distinct sets of infrastructure information records. The infrastructure information records are stored as either a linked list of textual or numeric information to the graphically represented components, or as data structures that are in some manner tagged or linked to the specific components within the database format.

Alternatively, the infrastructure information records may be stored outside of the presently described database format, although this is more cumbersome and requires additional overhead to provide the desired linkage to the actual, unique, site-specific component within the database model. As discussed below, these infrastructure information records provide key interaction between the modeled components that are site-specifically modeled in the asset management system and the actual physical infrastructure equipment that is installed or predicated for use in the actual physical environment. The infrastructure information is shared between: (A) the CAD application which maintains and runs the site-specific model of the network, and which is also capable of running predictions, collecting measurements from remote locations, optimizing and comparing performance, iterating the hardware or modeled hardware to reach desired specified criteria for the network, as well as tracking cost and maintenance records, (B) the actual network (which is working and may provide measured performance data over time to the CAD application or other hardware components, (C) the network components themselves (which may also run programs that connect with or are part of the CAD application as well as store some or all of the data incorporated at the CAD application running the site-specific model of the network, or may simply contain handshaking software and instruction interpretation in order to communicate with the CAD application) and (D) the managers of the network, such as network engineers technicians, or call centers or alarm stations who use the CAD application (these are the users who need to be able to manage and compare on-going performance and quality of the actual network using the site-specific adaptive control and asset management system described by the current invention). The infrastructure information contained within the records may be modified, edited, altered, and analyzed by a wide variety of methods over time, as described below. The managers may not need to be present to operate the invention, as alarms may be sent through means such as paging/telephone systems to alert humans of a network change of condition or problem. Adaptive control of components in this invention can be used to "repair" network operations, as well.

A computer program permits connection and interaction between the modeled components within the modeled network and the actual components that make up the actual physical network, so that ongoing, periodic, or sporadic communication may occur between hardware components and the CAD application, and so that on-going measured data may be retained and processed by the invention. Additionally, the CAD computer program will allow the components comprising the physical network to be remotely controlled.

For example, an engineer can remotely adjust the channels used by an access point, or the power supplied to a base station antenna in the network in response to an alarm sent by the base station or a remote receiver. Alternatively, the invention may autonomously determine equipment settings as needed. Alarm conditions for all operating parameters that may be simulated or measured may be set in software, via a mouse, or keypad, touchpad, or text line editor, using well known methods for setting fields and data entry in software applications. When alarm settings are established in the CAD application, and when measured data causes an alarm to be set, the invention causes certain predefined actions to occur (such as pace the IT staff call a cell phone, send an email alert, or shut down or reduce power or data rates in the network, etc.) Alternatively, the program, itself, may automatically cause such changes based on preprogrammed responses, and may take action to try and cause the alarm condition to disappear, based on its control capabilities. Time out times may provide a limited or preset time for the invention to attempt to self-heal itself when an alarm occurs, before predefined failsafe instructions are implemented.

The infrastructure information for each actual physical component may be represented in a site-specific manner within the environmental model of the physical environment, and such infrastructure information is preferably embedded within the environmental model 182 as described above. The embedding of infrastructure information for actual components may be done either prior to, during, or after the site-specific placement of the modeled components within the database model. The infrastructure information includes but is not limited to graphical objects representing the actual physical locations of infrastructure equipment used in the actual communication system, as well as data describing the physical equipment brand or type, a description of physical equipment location (such as street address, suite or apartment number, owner or tenant, latitude-longitude-elevation information, floor number, basement or subterranean designation, GPS or Snaptrack reading, etc.), equipment settings or configurations, desired or specified performance metrics or performance targets for the equipment whereby such desired or specified data are provided by the user or the prediction system, desired or specified performance targets or performance targets for the network which the equipment is a part of, whereby such desired or specified data are provided to by the user or the prediction system, measured performance metrics or, network metrics as reported by the equipment, predicted alarm event statistics or outage rates, actual measured alarm event statistics or outage rates, alarm threshold settings or alarm metrics as reported by the equipment or the user or the prediction system, equipment orientation, equipment specifications and parameters, equipment manufacturer, equipment serial number, equipment cost, equipment installation cost., ongoing actual equipment upkeep costs and records, predicted ongoing equipment upkeep costs, equipment use logs, equipment maintenance history, equipment depreciation and tax records, predicted or measured performance metrics, equipment warranty or licensing information, equipment bar codes and associated data, information regarding methods for communicating with the physical equipment for the purposes of remote monitoring and/or alarming, alarm records, malfunction records, periodic or continuous performance or equipment status data, previous or current physical equipment users or owners, contact information for questions or problems with the equipment, information about the vendors, installers, owners, users, lessors, lessees, and maintainers of the equipment, and electronic equipment identifiers such as radio frequency identifiers (RF Ids or RF Tags), internet protocol (JP) addresses, bar codes, or other graphical, wired, or wireless address or digital signature.

The "equipment" or "component" above refers to any actual physical object or device, which may be mechanical or electrical or arterial in nature, or any architectural or structural element of a distributed network, including but not limited to wiring, piping, ducting, arteries, or other distributed components or infrastructure.

While the present invention considers the site-specific database model, adaptive control capabilities, and asset management of a wired or wireless communication network as a preferred embodiment, it should be clear to one of ordinary skill in the art that any infrastructure equipment of a distributed nature, such as structured cabling, piping, or air conditioning could be controlled in such an adaptive manner. Some preferred methods for embedding the infrastructure information within a site-specific environmental model is detailed in U.S. Pat. No. 6,493,679, entitled "Method and System for Managing a Real Time Bill of Materials," awarded to T. S. Rappaport et al, and pending application Ser. No. 09/764,834, entitled "Method and System for Modeling and Managing Terrain, Buildings, and Infrastructure" filed by T. S. Rappaport and R. R. Skidmore (Docket 02560041aa) which are hereby incorporated by reference.

The resulting combined environmental and infrastructure model, wherein the modeled infrastructure and the associated infrastructure information for each component having been embedded in the environmental model in a site-specific manner, and also embedded in each piece of actual equipment, may then be stored onto any variety of computer media. The combined model is understood to include detailed cost data and maintenance data, as well as specific performance attributes and specific operating parameters of each piece of network hardware, some or all of which may be required for useable predictions and simulations and iterative control of the network. At any point in time, the combined environmental and infrastructure model may be retrieved from the computer media, displayed or processed in a site-specific manner with actual locations of components and component interconnections shown within the environment on a computer monitor, printer, or other computer output device, and/or edited using a computer mouse, keyboard or other computer input device known now or in the future. Furthermore, the combined model may also be embedded in software, or implemented in one or more integrated circuits, for real time or near real-time implementation in a hardware device, portable computer, wireless access point, or other remotely located device.

The editing above may involve changing any of the infrastructure or environmental information contained in the model, including any equipment or operating parameters of particular pieces of hardware that may be altered by the control of the computer CAD application of this invention.

Such changes may happen whether the combined model is implemented in chip, embedded software, or standalone form.

Furthermore, the combined environmental and infrastructure models stored on computer media may contain models of infrastructure equipment that are capable of communicating and exchanging data with the CAD computing platform in real-time. The actual hardware represented by such models are understood to be able to provide such communications, and the invention exploits this capability. This enables the invention to measure, predict, display, aggregate, iteratively operate upon, and store measured equipment performance, where performance data includes but is not limited to sensible performance metrics such as frequency utilization (such as a spatial-temporal record of occupied channels, unused channels, and lists of channels associated with different transmitters, lists of available, unavailable, used and unused channels, over time and/or space, where channel lists and channelization methods or strategies may be monitored, established, or adjusted remotely by the present invention), capacity utilization (such as data throughput performance, noise levels, performance data for particular classes of users or subclasses of a particular class of users, the amount of blocked or delayed calls or packets, holding times or dropped traffic data, instantaneous or time averaged data transport, and other metrics that denote the amount of capacity provided over a specific spatial environment, some of which may be adjusted, monitored or established by the present invention) received signal strength (RSSI), signal-to-interference ratio (SIR), signal-to-noise ratio (SNR), bit error rate (BER), loading, capacity, frame error rate (FER), frame resolution per second, traffic, packet error rate, packet latency, packet jitter, interference levels, power levels, quality of service (QoS) for one or more users, data throughput, outage statistics, failure rates, as well as sensory data such as temperature, pressure, flow rate, environmental conditions, power consumption and fluctuation, production levels, storage levels, cycle time, or other performance metrics or statistics known now or in the future. Further, using the infrastructure information records, this enables the invention to remotely access equipment for the purposes of remote monitoring, malfunction detection and/or alarm generation, or other forms of messaging known now or in the future. For example, the invention may store desired network operating performance parameters that are communicated to certain pieces of actual equipment, and if the equipment ever measures the network performance and finds the performance parameters out of range, an alarm is triggered and reported to the invention for display, storage, processing, and possible remote returning of pieces of equipment by the invention to readjust the network to move performance back into the desired range.

Communication between the physical equipment and the combined environmental and infrastructure model running on the CAD application at a computer may occur via the Internet, via standard communication protocols such as SNMP and TCP/IP, wireless or wired telephone networks, passive or active wireless RF tags, bar code scanning, or any other wired or wireless communication system known now or in the future. This communication could be unidirectional, where information is only being sent from the environmental model to the physical equipment, or vice versa, or the communication could be bi-directional, where information is being sent back and forth between the CAD application and the physical equipment.

A communication link between the CAD application running the site-specific environmental and infrastructure model and the physical equipment represented in the environmental and infrastructure model could be established or initiated by either side of the link, and may be established on a continuous, periodic, or intermittent basis, so that information may be exchanged. This control and data exchange may take the form of commands or instructions for the equipment to perform certain actions or for the database to receive or request certain results. For example, as described above, an engineer can remotely control, in manual fashion, the physical equipment making up the network by interacting with the CAD application running the site-specific environmental model, or the CAD application may automatically (or under user-control) cause the physical equipment to adjust operating configurations in a prescribed or desired or optimal or preferred manner. The control and data exchange may also include the results of those control actions (feedback provided between the CAD application and the equipment) and may also provide new or previous equipment performance and configuration parameters, updated maintenance or equipment use information, inspection logs, cost or price information, physical positioning information, time, malfunction or hazard alerts, emergency information, new or updated instruction sets, updated or new equipment information, or any other form of communication that may be supported by, generated by, recorded by, or reported by the equipment to the CAD application, or by the CAD application to the equipment.

Information received from physical equipment via the communication link is then embedded or linked within the site-specific environmental and infrastructure model at the CAD application, and may be displayed, aggregated, processed, analyzed, iterated and compared to simulations, and/or stored. The communications between the CAD application running the site-specific environmental and infrastructure model and the physical equipment may be manually initiated by a user of the invention, or automatically or periodically initiated by either by a system incorporating the invention or the physical equipment, say at a particular time of day or every 15 minutes, or automatically initiated by the physical equipment in response to sole pre-determined or experienced or measured event. For example, a particular piece of equipment may have the ability to be instructed to or may automatically or periodically perform a diagnostic routine on itself and report the results. In the present invention, if that piece of equipment has been site-specifically modeled and embedded within an environmental model as described above, the results of the diagnostic routine for the equipment can be received from the equipment and embedded into the CAD application running the environmental model for that piece of equipment. The updated environmental and infrastructure models may then be stored with the new information embedded in the model. Similarly, the physical equipment may be capable of monitoring performance metrics such as quality of service (QoS), throughput, or other important performance metrics of the network it is a part of, and such data may be communicated to, received by, stored, displayed, and processed by the invention.

Accessing and utilizing this communication link between the site-specific model of the communication network and the physical equipment can be performed by a variety of means, one of which is detailed in pending application Ser. No. 09/954,273, which is herein incorporated by reference.

The placement of infrastructure equipment may include cables, routers, antennas, switches, access points, and the like, or which would be required for a distributed network of components in a physical system. Important information associated with some or all pieces of infrastructure equipment that are modeled by and maintained within the invention using the described database format includes physical location (placement of the equipment within the database so as to site-specifically represent its actual physical placement) as well as data such as equipment vendors, part numbers, installation and maintenance information and history, system or equipment performance and alarm data and history, as well as cost and depreciation information of the specific components and subsystems.

Figure 3:
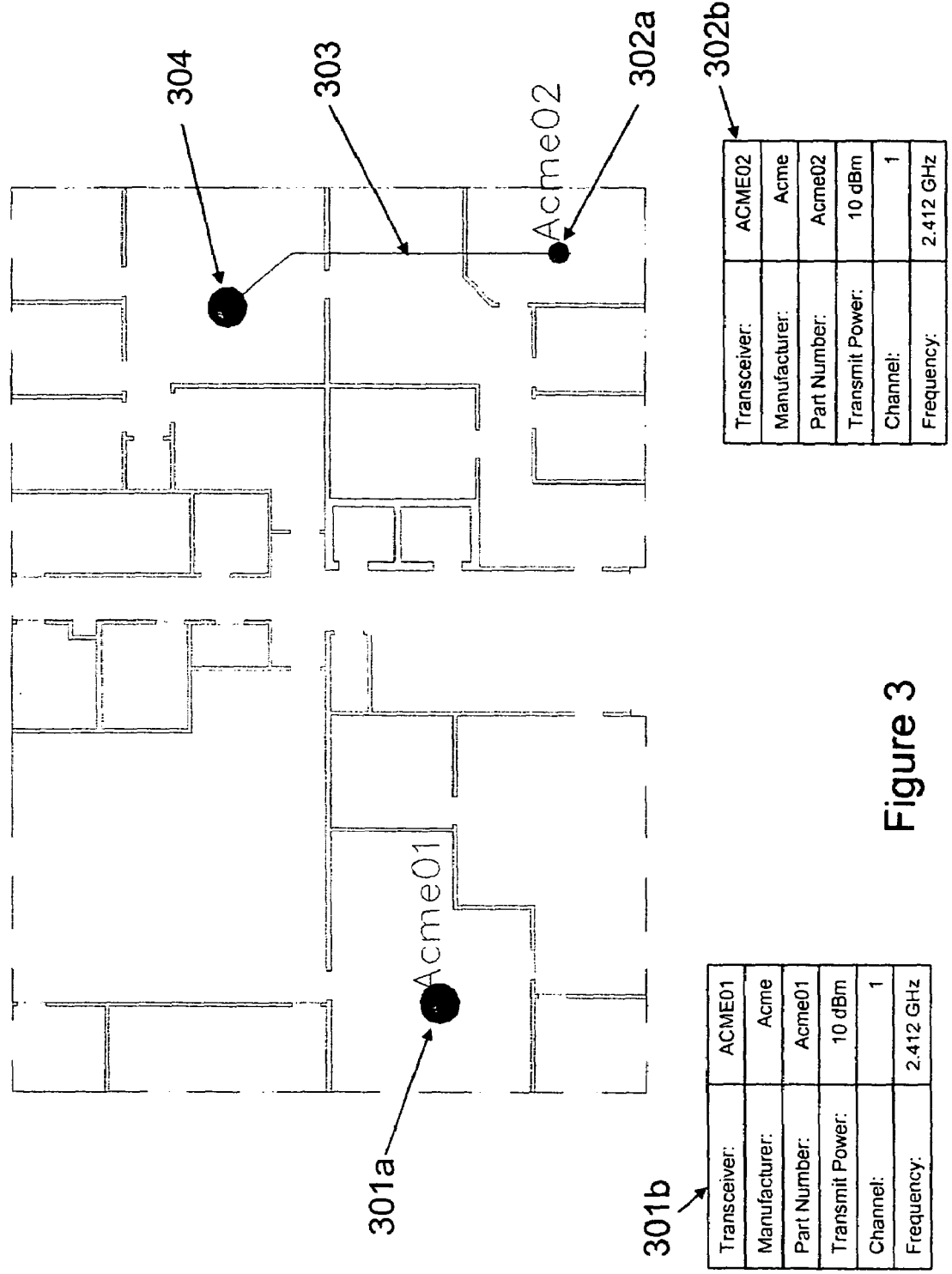
FIG. 3 is a top-down view of a building floor plan containing transceivers and other communications network infrastructure.

Referring to FIG. 3, there is shown the same site-specific environment as shown in FIG. 2. Using the preferred embodiment of the invention, an example communications network has been defined in FIG. 3. A transceiver 301a has been positioned within the site-specific environment and configured 301b. The configuration information 301 includes the manufacturer ("Acme"), part number ("Acme01"), transmit power ("10.0 dBm"), channel setting ("1"), and corresponding frequency ("2.412 GHz"). A similar transceiver 302a has also been positioned within the site-specific environment and configured 302b. The second transceiver configuration information 302b includes the manufacturer ("Acme"), part number ("Acme02"), transmit power ("10.0 dBm"), channel setting ("1"), and corresponding frequency ("2.412 GHz"). In addition, the second transceiver 302a has a coaxial cable 303 attached onto it. The coaxial cable 303 has been positioned within the facility and is itself connected to an antenna 304.

Referring to FIG. 1, once a communications network has been represented within the site-specific model of the environment, the invention allows for the selection of potential substitute equipment and potential alternate configurations for each network component 103. That is, the user of the present invention may select from a pick list of defined equipment types and configurations a finite number of alternate configurations for each transceiver or communications network component within the site-specific model, or the invention may automatically sense the equipment which is connected to the CAD application, and then not allow a change of the equipment in simulation if the network is running real time, or cause the user to select an "off-line" mode where simulations may be run but not used to control the network hardware for desired performance criteria.

The selection of alternate equipment and their locations is allowed if the CAD application is not in control mode, that is, when it is not in communication with and control of actual network hardware. In this mode, the invention serves as a design system with smart algorithms that allows a user to simply set up particular performance criteria, and then the CAD application iteratively explores a very large number of possible configurations, locations, settings, cost criteria, etc. to determine a best or group of best designs. A designer or maintenance technician may manually select equipment from the same or different manufacturers or ask the CAD application to automatically select equipment from one or more manufacturers, different models of equipment from the same manufacturer, different power output settings, different power input settings, different configurations of channel or frequency settings, different antenna locations, pointing directions, phasing, gain patterns or orientations, different equipment locations, different costs QoS or coverage or capacity performance goals within the environment, or any device-specific configuration setting or information that could impact network performance or cost, or any combination of the above.

Referring to FIG. 4, there is shown a sample selection window for alternate equipment as exists in the preferred embodiment of the invention. A table containing a list of desirable equipment is displayed to the designer or maintenance technician. The table shown in FIG. 4 organizes the equipment by Type, Manufacturer, Part Number, Description, Loss (a performance metric), Number of Connections, and Physical Cost. One skilled in the art could see how any number of additional criteria could be used to organize the equipment shown in the table, including but not limited to weight, physical dimensions, color, form factor, shape, material of construction, power supply, availability, or any other criteria. Using a mouse or other computer pointing/selection device, the user may select entries from the table 401 representing equipment that is to be considered for placement within the network. Entries in the table that are not selected 402 will not be considered for placement within the network. Equipment that has been selected 401 will be analyzed during the iterative loop 106-112 shown in FIG. 1.

The listing of desirable equipment shovel in FIG. 4 may be constructed through several means, such as including but not limited to importing from external equipment databases, downloading from off the web, creation in text or file editors, or retrieved from Wireless Valley's SitePlanner or PartsPlanner products. The listing may display all or some subset of equipment contained within a computerized database of equipment. The computerized database of equipment contains detailed information on each piece of equipment in a manner suitable for display in a table similar to that shown in FIG. 4. The computerized database of equipment may be located anywhere on the Internet or local computer network, and may be edited or customized by the designer, maintenance technician, or anyone with authority to access and alter the database contents.

In the preferred embodiment of the invention, the designer or maintenance technician may choose to display all equipment contained within the database of equipment or simply a subset of equipment. The selection criteria for displaying equipment subsets is determined by the designer or maintenance technician, and may be based upon any information stored within the equipment database regarding each piece of equipment. For example, the user may choose to only display equipment below a certain cost threshold or within a certain range of performance or physical dimensions, or with suitability to the particular desired application. This enables the designer or maintenance technician to limit the number of entries that appears in the selection window shown in FIG. 4.

In addition, the user may choose to allow the invention to automatically determine appropriate equipment types, such as from preferred vendors or based on good past experience, for display in the selection window of FIG. 4. If so, the invention will analyze the current equipment utilized in the network (refer to FIG. 3) and use the information regarding the equipment currently used to automatically create a selection criteria used to determine the appropriate equipment to display in the selection window of FIG. 4. For example, the network shown in FIG. 3 consists of two types of wireless LAN access points 301, 302, a coaxial cable 303, and an antenna 304. The invention may analyze the network shown in FIG. 3 and determine that the appropriate equipment to display in a selection window are wireless LAN access points, coaxial cables, and antennas; other types of equipment (e.g., fiber optic cables, amplifiers, etc.) may be excluded. The automatic subset of equipment selected by the invention for display in FIG. 4 may then be further limited based on user input. For example, only wireless LAN access points that fall within a certain price range or by a certain vendor or with a particular form factor may be shown, or only antennas that are immediately available within existing stock may be shown.

An alternate method for the automatic selection of equipment types for display in the selection window of FIG. 4 involves the use of a relational database of equipment. Through using a relational database, associations between different or similar types of equipment can be established. For example, particular types of wireless LAN access points may be identified as being compatible with particular types of antennas. This enables the invention to more intelligently select the equipment to display to the user for selection in FIG. 4. If the network shown in FIG. 3 contains a specific type of wireless LAN access point 302 and a specific type of coaxial cable 303, and the user only desires to replace or identify an alternate for the coaxial cable 303, the invention can search the relational database to identify all types of coaxial cables that are compatible with the existing wireless LAN access point 302. The resulting subset of coaxial cables can then be further filtered by user criteria, such as cost, performance, and availability.

Note that although the invention has been described as utilizing an existing database of equipment types, one skilled in the art could easily see how the described database could be generated in real-time through interaction with equipment manufacturer websites or electronic catalogs via the Internet or other communication medium. Thus, instead of searching a computer database of equipment types, the invention could search various vendor websites or electronic catalogs for suitable equipment. Similarly, it is clear that many aspects of the disclosed invention, itself could be implemented on the world wide web.

The designer or maintenance technician may choose to identify different configurations or settings for each piece of equipment selected in FIG. 4. In the preferred embodiment of the invention, a selection window of configurational settings for each piece of equipment is shown, and the user then may choose which particular configurations or settings he or she considers desirable. Referring to FIG. 5 there is shown a sample selection window for alternate equipment configurations or settings. In FIG. 5, there is shown a selected piece of equipment (a Cellular Specialties Amplifier pail number CSI-BDA110) 501. There are three possible configuration settings for the selected amplifier, where each configuration setting results in a different Loss (a performance metric) for the amplifier 502. Thus, the selected amplifier may be configured for a performance of −40 dB, −30 dB, or −20 dB. Using a mouse or other computer pointing/selection device, the user may select any or all of the displayed equipment configurations. The selected possible equipment configurations will be iterated by the invention in steps 106-112 as shown in FIG. 1.

Referring to FIGS. 6a and 6b, there is shown another sample selection window for alternate equipment configurations or settings. In the case of antenna or radiating elements; the orientation of the piece of equipment itself is a configuration setting. In this case, the present invention displays the various orientations as selectable configuration settings. In FIGS. 6a and 6b, for example, two different orientations 601 of the same antenna are selected by the user, the first is the antenna rotated 120 degrees in elevation while the other is the antenna rotated 270 degrees in elevation.

Rather than the user being required to select desirable equipment configurations, the invention may automatically select desirable equipment configurations. This can occur through use of a relational database, wherein certain configurations of equipment are desirable given the existing configurations or settings of other equipment in the network. For example, referring to FIG. 3, if the existing antenna 304 is mounted upside down on the ceiling, the invention may choose to automatically limit all possible alternate antennas selected to have the same orientation. The iterative loop 106-112 in FIG. 1 also provides for the automatic determination of desirable equipment positions. The invention provides the means for the identification of a finite number of desirable equipment positions within the 2-D or 3-D modeled environment for use in the iterative loop. There are several possible methods for identifying these finite number of desirable equipment positions.

Figure 7:
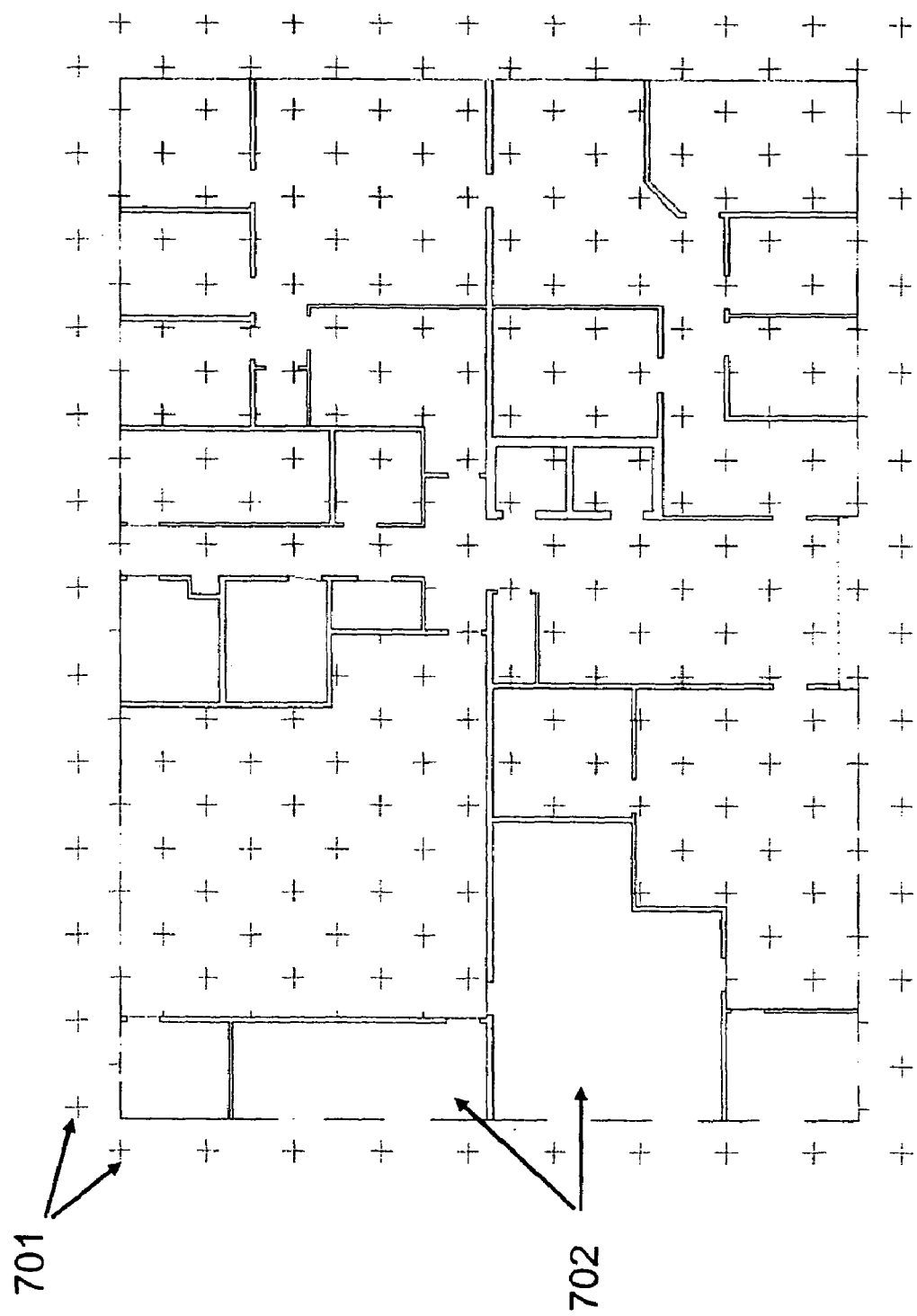
FIG. 7 is a floor plan overlaid with a regular grid of possible (or existing) equipment positions.

Referring to FIG. 7, the invention overlays the 2-D or 3-D modeled environment with a regularly spaced grid of points 701. These points 701 are evenly spaced in either a 2-D plane or 3-D matrix at intervals specified by the user. The points may then be used in the iterative loop as possible locations to position equipment within the modeled environment. There may exist locations within the environment where equipment is either not desirable or it is just not feasible to position equipment. For example, it may not be possible or desirable to position equipment within a hospital x-ray room or within another tenant's office space. The present invention allows the user to identify such non-desirable locations and thus eliminate positions within those areas as considerations for equipment placement. Using a mouse or other computer pointing/selection device, the user may select areas or regions within the modeled environment to exclude from consideration of equipment placement. Referring to FIG. 7, several rooms 702 within the modeled environment have been identified as areas to exclude from consideration for equipment placement. Using the same approach as described above, it is clear that for an already-installed network, FIG. 7 may represent where equipment is already located, and where equipment has already been verified to not be located, etc.

Rather than overlay the modeled environment with an evenly spaced grid of possible positions, the invention alternately allows the user to identify likely or possible locations for equipment positions. Using a mouse or other computer pointing/selection device, the designer or maintenance technician may identify positions within the 2-D or 3-D modeled environment as potential equipment positions. Referring to FIG. 5a, the user has identified several positions 801-805 where equipment may be placed. Note that such identified positions may imply or exclude certain equipment configurations. For example, if the selected position 801 is on the ceiling, such a position may further limit the type or configuration of equipment that is to be positioned at that location. The invention may utilize such information to more intelligently make equipment type, configuration, and position decisions.

Figure 8A:
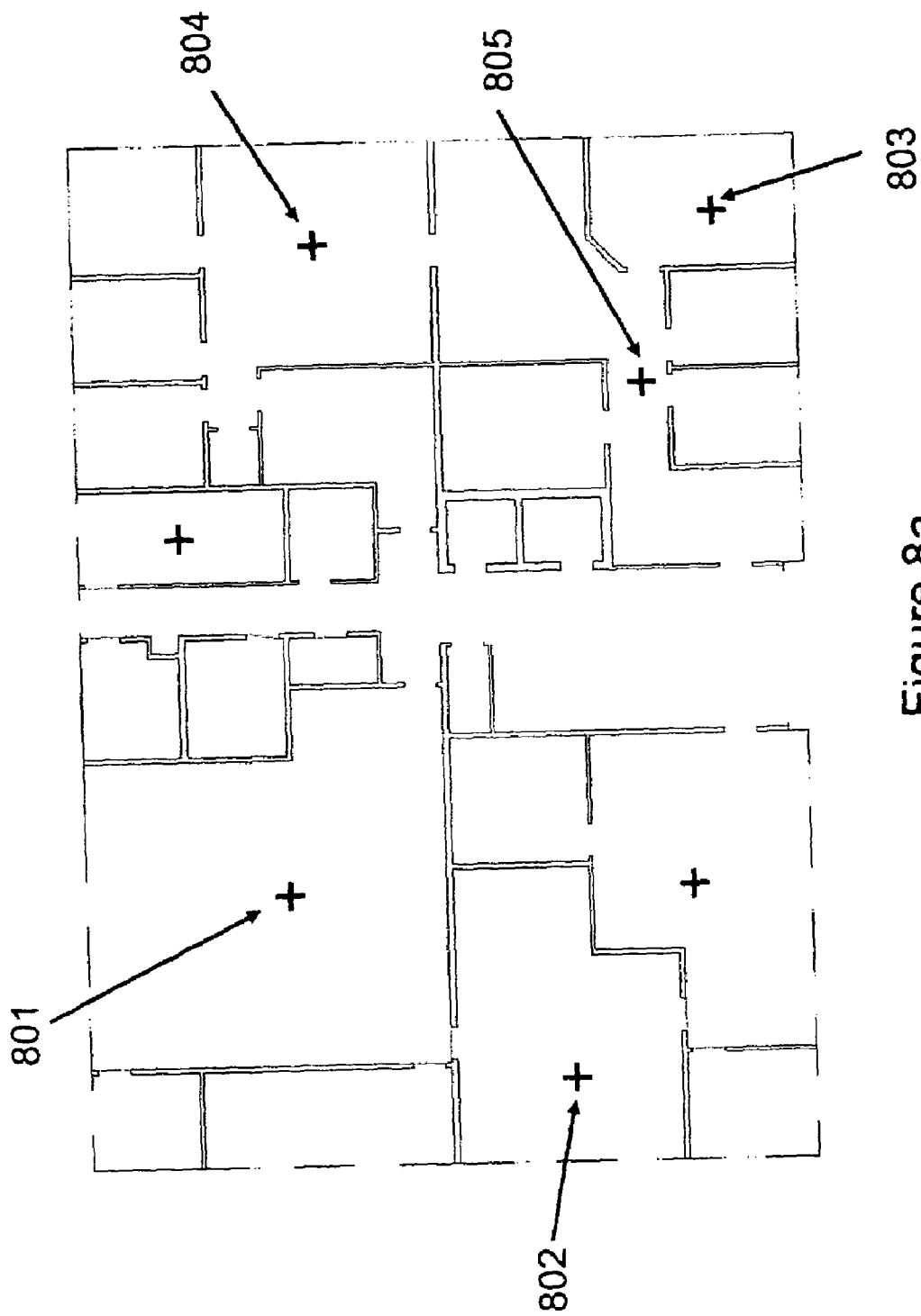
FIG. 8 shows a set of possible (or existing) selected equipment positions.
Figure 8B:
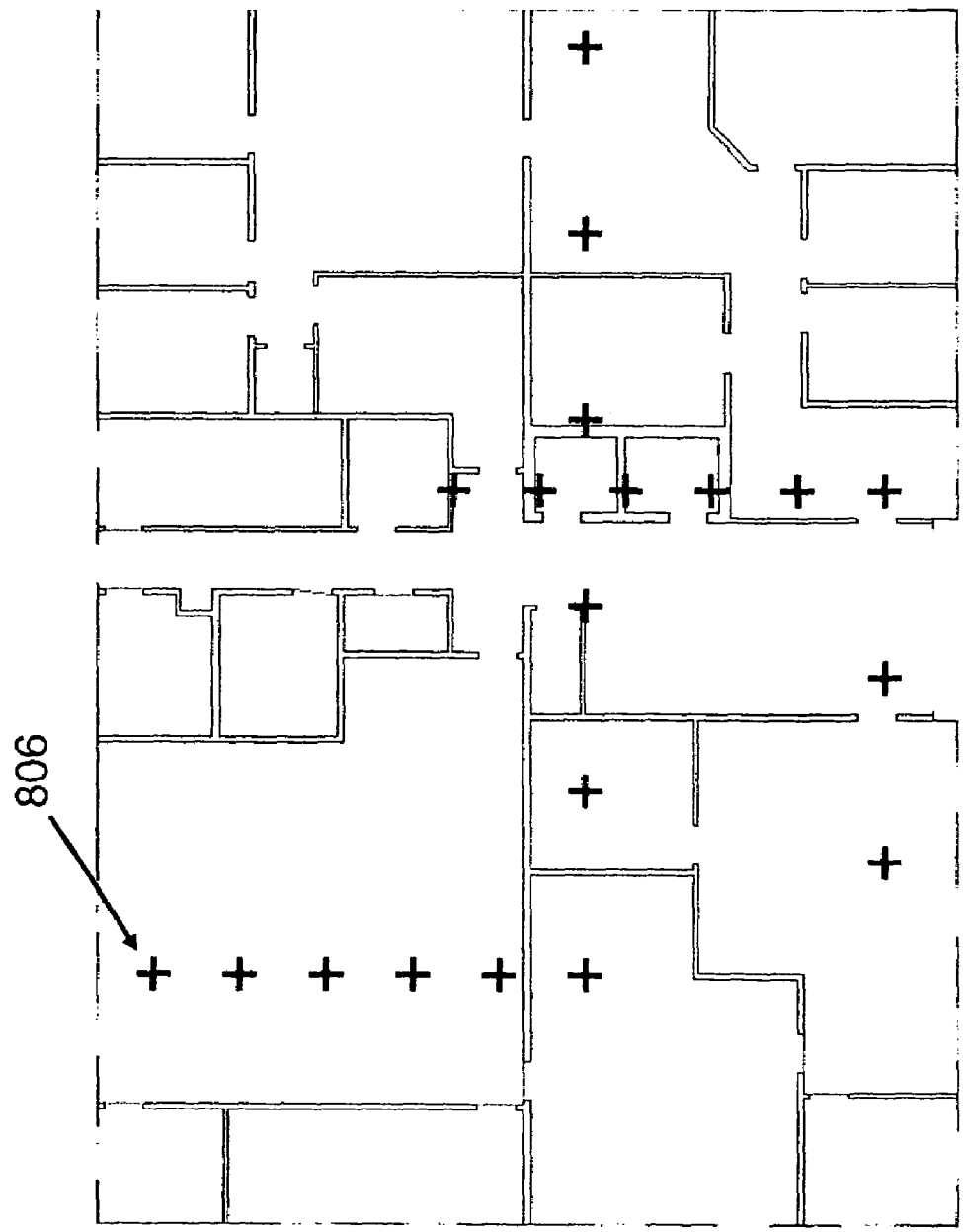

Note that modern architectural CAD systems provide the means for architects and structured cabling designers to specify to a high degree of detail the location and availability of electrical wiring or other communication infrastructure. For example, a CAD drawing of a facility may include detailed wiring diagrams providing the accessibility of electrical outlets, or detailed Ethernet wiring diagrams providing the accessibility of the existing wired network infrastructure. The present invention can utilize this information, if the information is available, to generate a set of possible equipment positions based upon the availability of power and/or communications infrastructure. Referring to FIG. 8b, the invention has utilized knowledge of the facility's Ethernet wiring to generate a set of possible positions 806 at which wireless LAN access points could most easily be positioned.

If detailed CAD drawings containing such information are not available, the invention can rely upon alternate sources such as color coded raster images (i.e., where electrical and/or Ethernet infrastructure is identified by colored or dashed lines). One skilled in the art could easily see how this automatic position identification process could be extended to any other selection criteria, including availability of HVAC, water piping, sewage piping, ventilation ducts, cable trays, drop ceilings or raised floors, fiber optic infrastructure, telephony infrastructure, or any other criteria known now or in the future. Note that for FIG. 8, if performance measurements were readily available for an already installed network, the invention could process measurements in order to similarly determine how to more intelligently select equipment type, configuration, settings, and positions. Autonomous network control could also be provided. For example, channels could be re-tuned, antenna patterns readjusted, and power levels reset "on-the fly" through control of hardware equipment by the CAD control/GUI portion of the invention, in order to achieve a particular desired metric or metrics, or to improve the overall quality or allocation of bandwidth, quality of service, etc. to the users on the network.

Referring back to the design case, note that any of the steps of selecting alternate equipment types, configurations or settings, or positions may be skipped at the user's option. For example, the user may choose to skip the step of selecting equipment positions and instead choose to only iterate equipment types and configurations.

The set of selected alternate equipments and/or alternate equipment configurations and parameter settings and/or alternate equipment positions is iterated across specific discrete values (set either automatically by the CAD application, as specified by the user, or provided for by the equipment or its specification) during the automated processing loop 106-112 in order to determine what combination of equipment types and/or configurations or locations or orientations produces the most desirable overall network performance.

Once a set of defined transceiver or other equipment types and/or configurations have been defined 103, the current performance of the communications network is predicted 104. Note that the predictions may be developed through no measurements (e.g. "blind" predictions), or may be derived from models that use measurement data that has been collected by a measurement tool or sensor or made available through some other means The invention allows the visualization and recording of simulated or predicted or measured performance of telecommunication systems that would be designed, or which have already been designed for, operation within an actual physical 3-D environment that is modeled using the techniques taught herein, and furthermore supports the ability to compare predicted versus actual network or system performance, as well as the placement, display and storage of infrastructure equipment such as telecommunication system components and cables used to create a wireless or wired network. Embodiments of such prediction., visualization measured and comparison capabilities that may be used in the invention, for example, are taught in U.S. Pat. No. 6,317,599, U.S. Pat. No. 6,442,507, and U.S. Pat. No. 6,499,006, and co-pending application Ser. No. 09/668,145, entitled "System and Method for Design, Tracking, Measurement, Prediction and Optimization of Data Communication Networks," filed by T. S. Rappaport, R. R. Skidmore, and Ben Henty, each of which are hereby incorporated by reference. Predicted performance metrics may include but are not limited to: adequate connectivity, radio signal strength intensity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best serer locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, querying delay, signal level, interference level, quality of service, bandwidth delay product, handoff delay time, signal loss, data loss, number of users serviced, user density, locations of adequate coverage, handoff locations, locations of adequate throughput, $E_cI_o$, system performance parameters, equipment price, maintenance and cost information, user class or subclass, user type, position location, and other commonly used communication network performance metrics as mentioned elsewhere herein, all in either absolute or relative terms.

Figure 9:
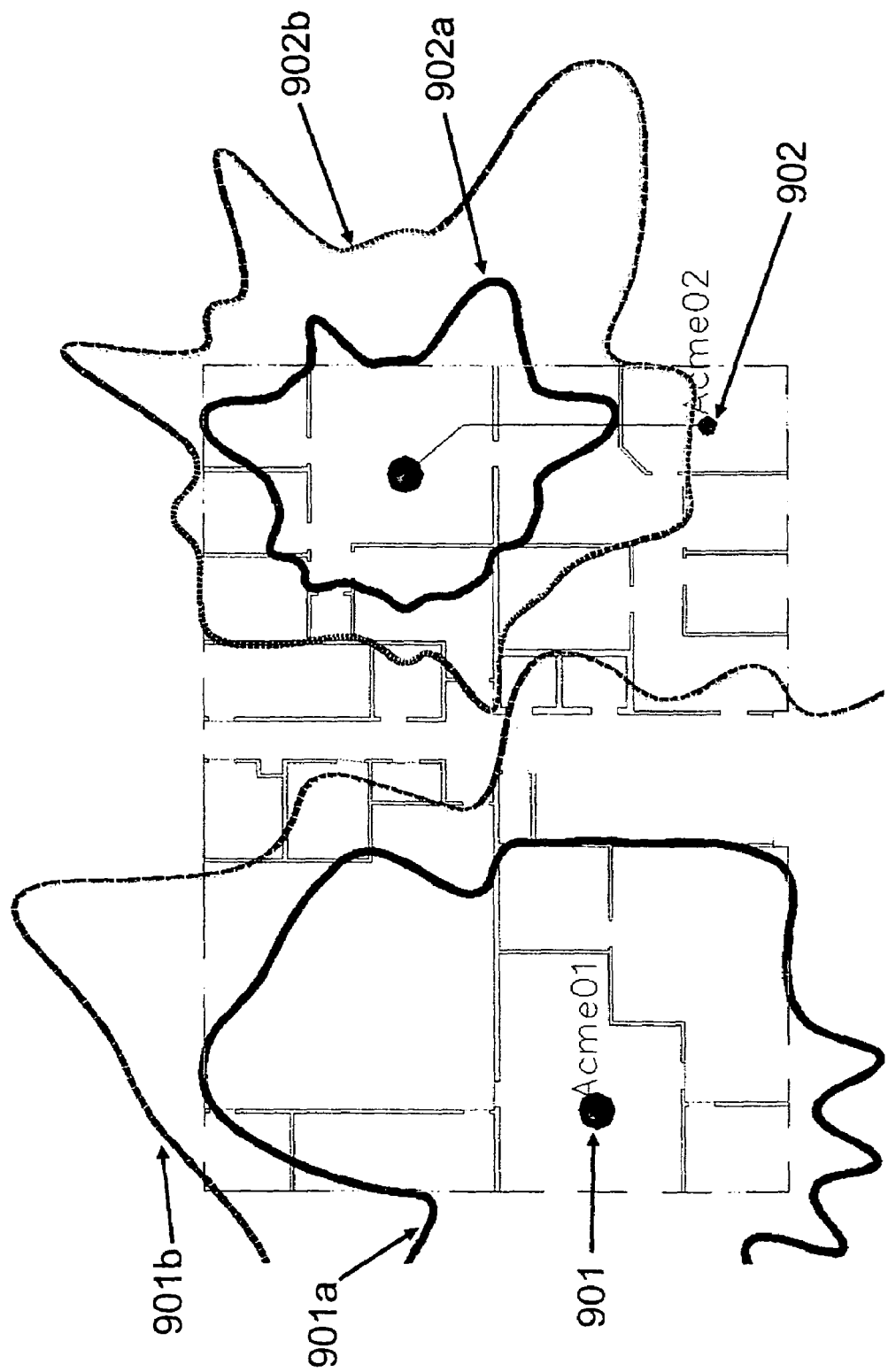
FIG. 9 is a top-down view of a building floor plan containing predicted (or measured) coverage contours.

Referring to FIG. 9, there is shown the predicted coverage of the communication network that was defined in FIG. 3. In FIG. 9, the "Acme01" transceiver 901 has predicted coverage boundaries shown for −60 dBm 901*a* and −70 dBm 901*b* respectively. Similarly, the "Acme02" transceiver 902 has predicted coverage boundaries shown for −60 dBm 902*a* and −70 dBm 902*b* respectively. Note that the coverage boundaries do not overlap one another, resulting in potential areas without coverage within the building. These boundaries could also be throughput, bit error rate, etc., and other and other metrics known now or in the future. Note that in addition to predicted performance, the same approach may apply to measured performance metrics collected by measurement devices or reported to the CAD control/GUI software. That is, FIG. 9 could also be constructed from measurements supplied by the invention, or measured data provided by other means, for example, through walk test data or from data supplied by a switch or other means (e.g., collected data would be input into the database model and used to analyze operations of the communications network or the measured data may be used in in prediction calculations, in addition comparisons of predicted to measured data may be performed and comparisons of measured data from measurements made at different times may be analyzed).

Figure 10:
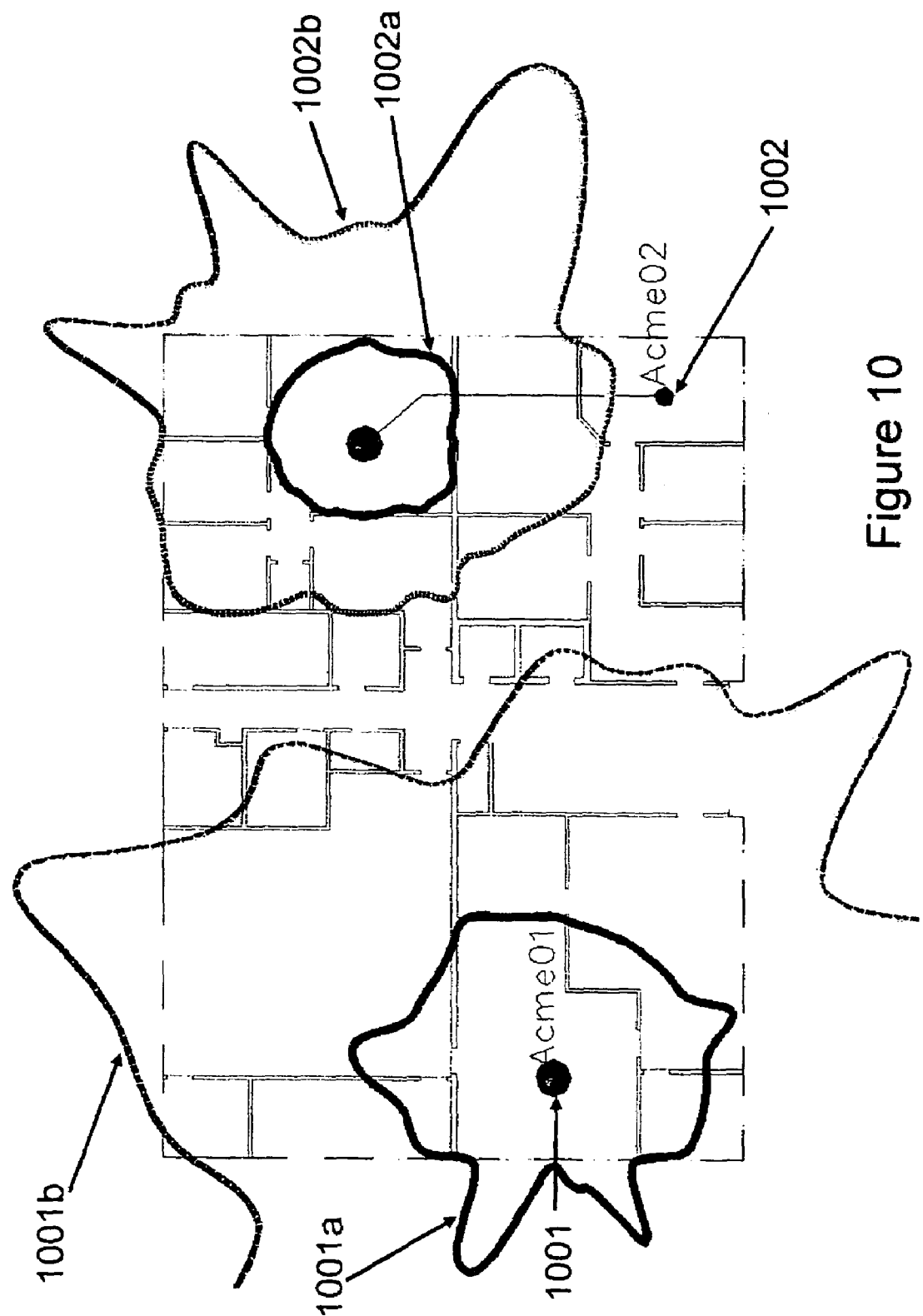
FIG. 10 shows a top-down view of a building floor plan containing predicted (or measured) interference contours.

Referring to FIG. 10, there is shown the predicted interference for the communication network defined in FIG. 3. As noted in FIG. 3, both transceivers "Acme01" 301*a* and "Acme02" 302*a* are configured to have the same channel ("1") and frequency ("2.412 GHz"). Thus, they directly interfere with one another. This is shown hi FIG. 10, where the transceiver "Acme01" 1001 has predicted interference boundaries shown for 30 dB signal-to-interference (SIR) 1001*a* and 10 dB SIR 1001*b* respectively. Similarly, transceiver "Acem02" 1002 has predicted interference boundaries shown for 30 dB SIR 1002*a* and 10 dB SIR 1002*b* respectively. Note that the interference contours project away from one another, confirming the fact that the two transceivers are interfering, with one another. It is clear that such interference shown in FIG. 10 could also be measured. For example, FIG. 10 could display measured interference results from an actual installation, where a new tenant in a shared office space deploys her own Wireless LAN network without knowledge or concern for the other (existing) transceiver within the physical environment.

In order to accurately capture the performance of the network as a whole, the present invention provides for predicting the performance of the network throughout the entire simulated environment, and then further allows feedback to the simulated design containing models of hardware components to achieve a desired or improved result. The simulation needed to first achieve the predicted performance of the site-specifically modeled network is carried out by the invention by discretizing in either an automatic or user-selected pattern the modeled site-specific environment into a grid of points. Also, the invention, when supplied measurements and connected in real time to actual network hardware, is able to use the measured data throughout the environment, as seen from particular devices on the network or as provided by some other means, in order to reconfigure the network equipment in actual operation.

Figure 11:
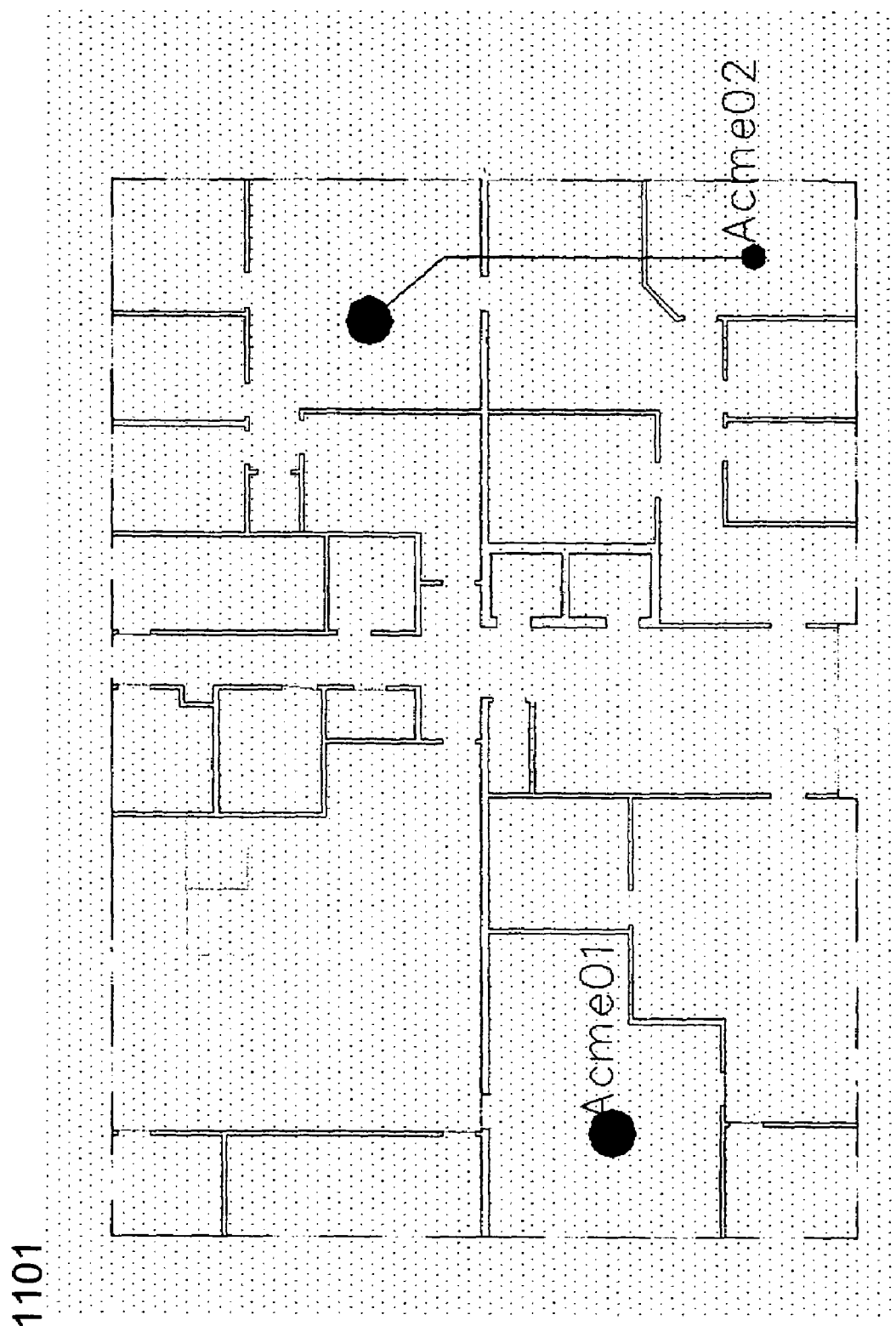
FIG. 11 shows a top-down view of a building floor plan overlaid with a selected grid of positions at which to predict (or measure) network performance.

The predicted performance of the network at each point is calculated and stored by the present invention. FIG. 11 provides an example of a visible overlay of the site-specific computer database with a grid of points 1101 from the top down perspective. The performance of the network is then calculated on the bases of the average network performance across all points within the environment. Individual or selected sets of points and locations within the three-dimensional grid may be weighted as higher or lower priority areas than others. For example, a hospital emergency room or conference room may be deemed higher priority areas for improved network performance than the bathrooms or stairwells. It is clear that FIG. 11t could also be derived from measured data.

Referring to FIG. 1, once the current performance of the network has been determined 104, the processing loop) (iterative processing) of the invention begins 105. At the start of the processing loop, the user selects one or more performance criteria that are desirable to improve. For example, the user may select to improve the coverage area of the network or reduce the overall interference of the network, or provide better service to particular types of users who are specified within the CAD model, or a combination of many such goals. The user may also specify priorities on particular portions of the coverage area, where service is a premium for all users, regardless of the class of user. Available performance criteria considered by the present invention includes but is not limited to adequate connectivity, RF coverage, data throughput, quality of service (QoS), packet error rate, packet throughput, packet latency, bit error rate, signal-to-noise ratio (SNR), carrier-to-noise ratio (CNR), signal strength or RSSI, rms delay spread, distortion, equipment cost, equipment reliability, installation cost, equipment warranty periods, or any other criteria known now or in the future that directly or indirectly effects the decision-making process in designing, deploying, maintaining, troubleshooting, or upgrading a network of equipment. The selection and desirability of each performance criteria is selected by the user through computer dialog interfaces defined in the present invention, or from table look ups, embedded settings, preset or default values, or other standard means. More than one performance criteria may be selected, but each is ranked by the user according to importance.

Once one or more performance criteria have been selected as goals to improve within the network 105, the present invention begins the iterative, user-specified, or automatic analysis process. The analysis process may be automated, may time out automatically, or may allow the user to intervene or set initial conditions, in order to help avoid and deal with convergence issues or to deal with the cases when particular goals are met satisfactorily without further computation being required.

Recommender systems may also be used as part of the analysis process. The present invention loops through the various settings of each selected transceiver or communications network component 106, and through each possible pre-specified location for each particular component (not shown). For each transceiver (or other hardware component or equipment), the present invention sequentially or intelligently selects each possible alternate or substitute transceiver or network component 107 (as identified in step 103), and for each device, may also step through each of the available channels, channel lists, power settings, thresholds, number of users, etc. For each alternate or substitute device, the present invention loops through each possible defined configuration for the device 108 (as identified in step 103). Each transceiver in turn is then replaced by each possible combination of hardware device and configuration setting 109. The overall performance of the network is predicted once more 110, and the result is compared with the previous predicted performance result on the basis of the performance criteria selected by the user (as identified in step 105). If the performance of the overall network given the revised types and/or configurations of the transceiver is better than the predicted performance for prior iterations, the type and configurations of all transceivers is stored 111. Note that one or many "acceptable" configurations and types may be stored and a number of well known methods are available to collect, store, and sort the best results. It can be seen that antennas and their locations and orientations could also be iterated through.

The iterative process continues until all possible combinations of types and configurations and settings and orientations and locations for each network component under consideration have been analyzed. Thus, when the iteration has concluded 112, the ideal type and configuration for each component in the network has been identified that provides the most dramatic improvement in the performance criteria.

Through this mechanism, the present invention determines one or more optimal or preferred types and configurations of components in the modeled communication network that provides the most desirable overall network performance. The results are displayed graphically to the end user for post-processing and analysis 1113. Despite the large number of possibilities of configurations and iterative steps, the computations are extremely fast, on the order of a few seconds, on today's modern computers with 2 GHz clock speeds, and these speeds may be increased further with smart algorithms such as generic algorithms, recommender systems, or tree searches, and with faster computing equipment and deeper memories which are evolving.

For the case when the invention provides control of actual operating networks, certain features are not allowed to be adjusted during iterative analysis—for example, since the operating network is already installed, the reorientation or re-location of components is not allowed, and only the existing hardware components that can be remotely adjusted by the CAD application are modeled in the iterative processing (settings such as frequencies, bandwidths, antenna patterns that may be electrically steered, power levels, etc.). Nevertheless, there is still a great deal of improvement that can be gained by adjusting configurations or adjustments on existing equipment, and the improved performance, obtained through iterative simulation, can be implemented through control to the actual hardware. For example, emerging network equipment will include MIMO (multiple-input multiple output) antennas, modems, or ultrawideband devices, or sensors which provide network operators with unprecedented flexibility between applications, bandwidth and power tradeoffs in an actual network The current invention could provide real-time or near real-time control for such future equipment in a communication network using the described techniques.

Figure 12:
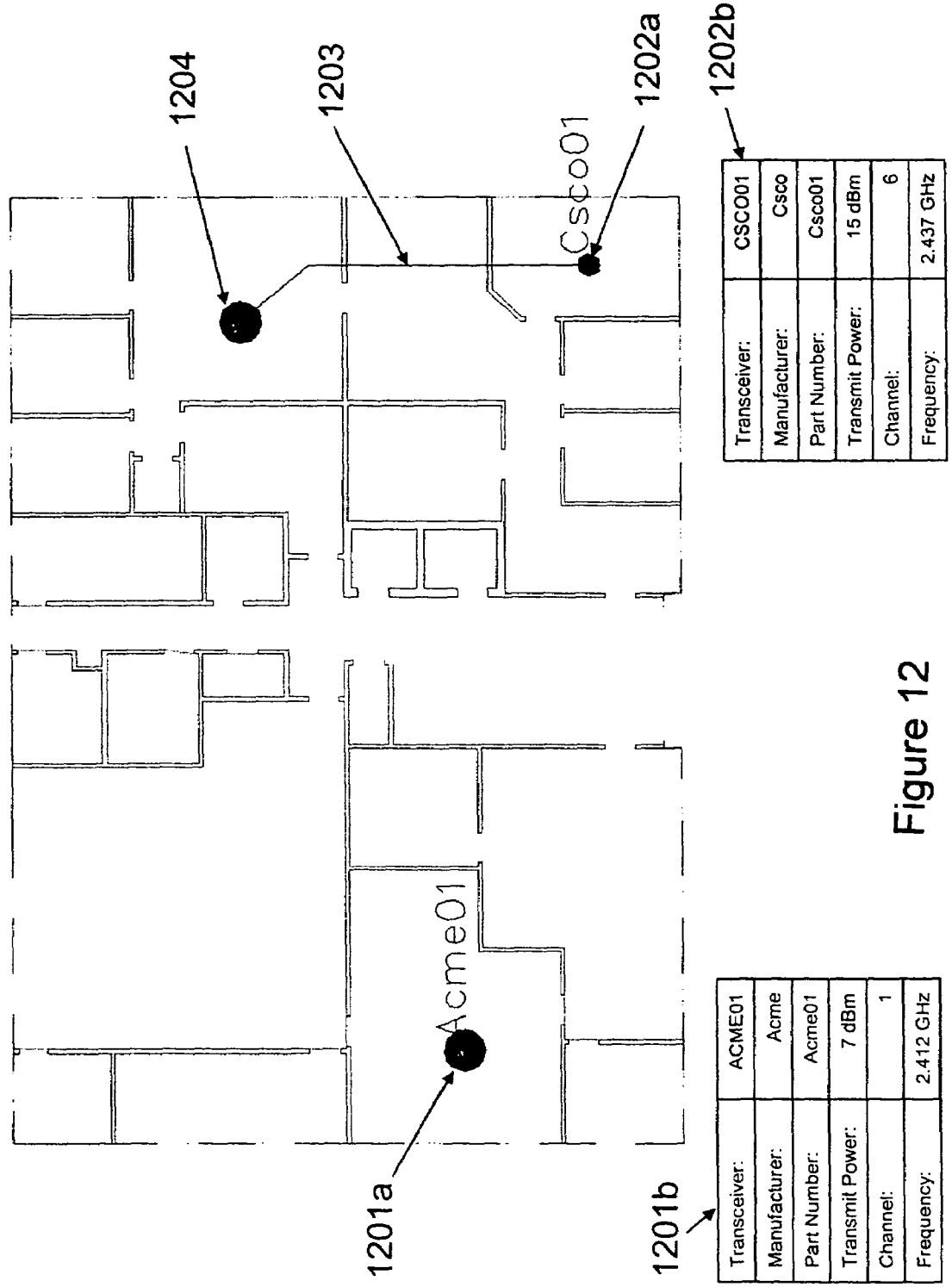
FIG. 12 shows a top-down view of a building floor plan containing new types of network hardware or equipment.

Referring to FIG. 12, the results of having the communications network presented in FIG. 3 processed by the present invention is displayed. The original "Acme01" transceiver 1201a has had it's transmit power altered from "10 dBm" to "7 dBm" 1201b. More dramatically, the original "Acme02" transceiver from FIG. 3 has been replaced with a new transceiver from a different manufacturer—"Csco" 1202a. The new "Csco01" transceiver 1201a has been configured with a transmit power of "15 dBm" 1202b, and set to send and receive on channel "6" 1202b, which corresponds to a frequency of "2.437 GHz" 1202b. It is clear that FIG. 12 could also be due to results originally obtained from measurement of actually operating networks, where the network owner or tenant would then be able to physically replace or remove equipment to obtain a new configuration shown in FIG. 12.

Figure 13:
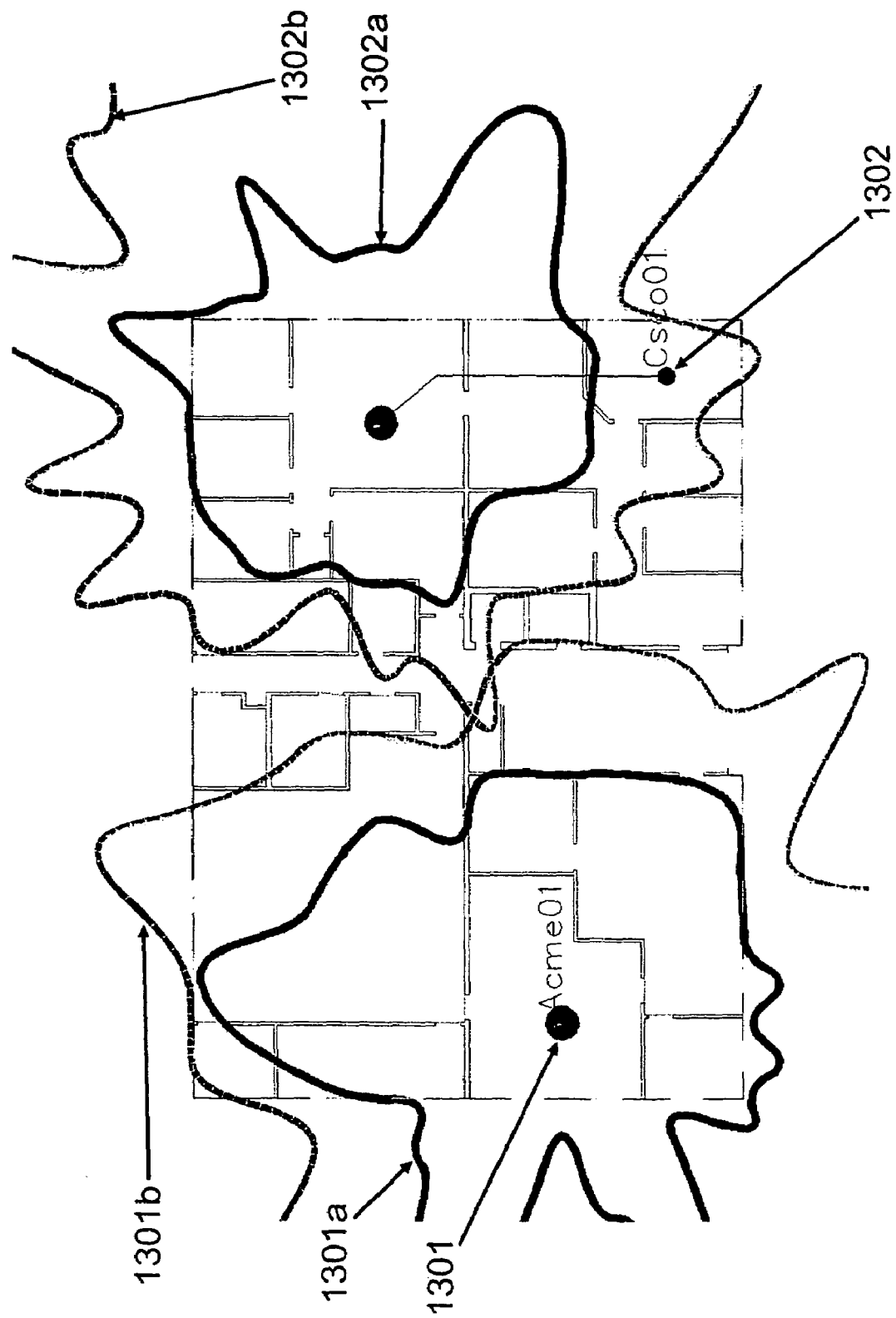
FIG. 13 shows a top-down view of a building floor plan containing predicted (or measured) coverage contours.

Referring to FIG. 13, the new predicted communication network performance in terms of coverage area is shown. In FIG. 12, the "Acme01" transceiver 1301 has predicted coverage boundaries shown for −60 dBm 1301a and −70 dBm 1301b respectively. Similarly, the "Csco01" transceiver 1302 has predicted coverage boundaries shown for −60 dBm 1302a and −70 dBm 1302b respectively. Note that the coverage boundaries now overlap one another in places, indicating an improvement in performance versus the original network configuration shown in FIG. 14. It is clear that FIG. 13 could also be due to results originally obtained from measurement of actually operating networks, where the network owner or tenant would then be able to physically replace or remove equipment to obtain a new configuration shown in FIG. 13.

Figure 14:
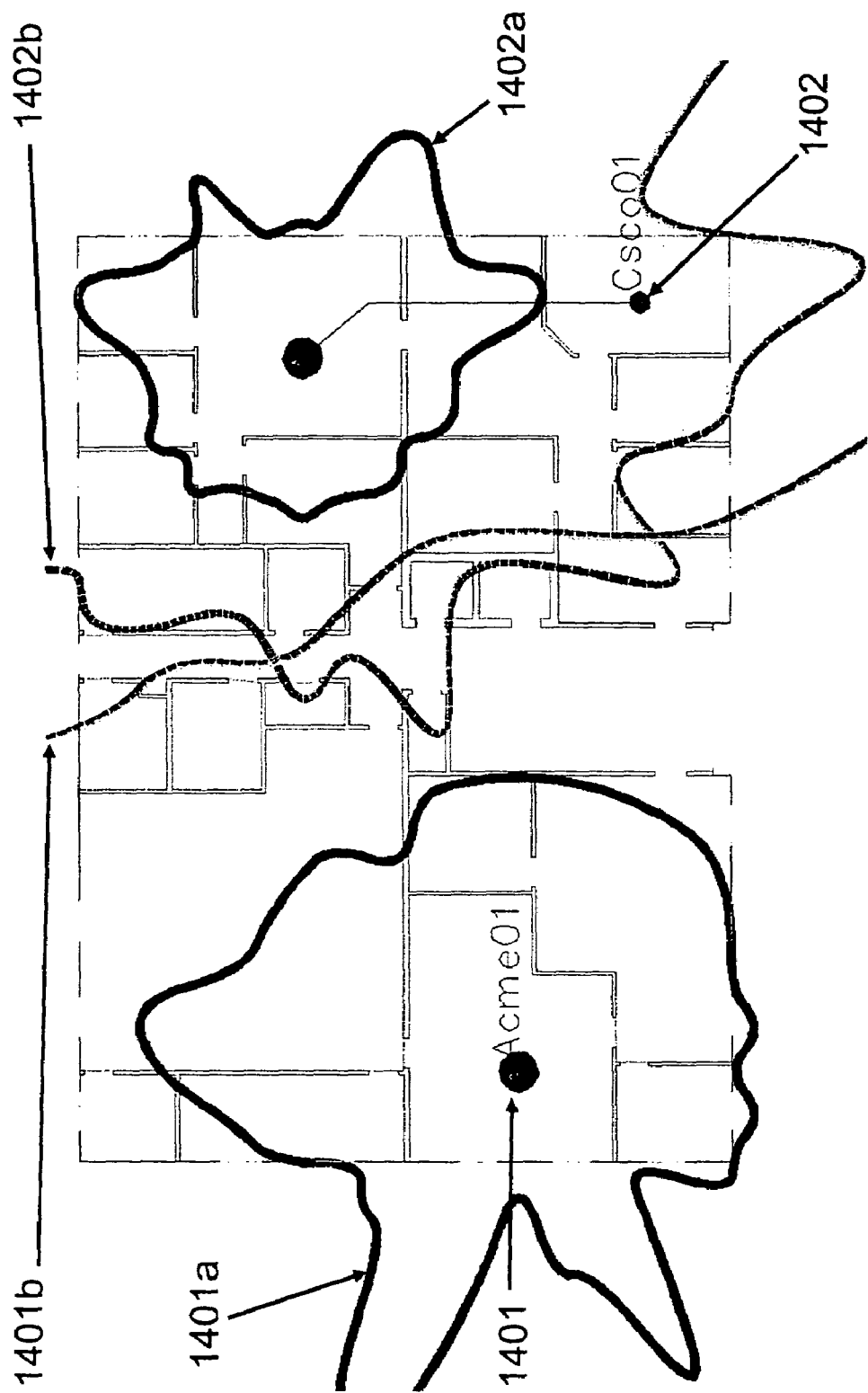
FIG. 14 shows a top-down view of a building floor plan containing predicted (or measured) interference contours.

Similarly, in FIG. 14 there is shown the predicted interference for the communication network defined in FIG. 12. As noted in FIG. 12, transceivers "Acme01" 1401 and "Csco01" 1402 have been recomputed and reconfigured by the invention such that they no longer share the same channel or frequency. Thus, they no longer directly interfere with one another as was the case originally. This is shown graphically in FIG. 14, where the transceiver "Acme01" 1401 has predicted interference boundaries shown for 30 dB signal-to-interference (SIR) 1401a and 10 dB SIR 1401b respectively. Similarly, transceiver "Csco01" 1402 has predicted interference boundaries shown for 30 dB SIR 1402a and 10 dB SIR 1402b respectively. Note that the interference contours now reflect the much improved performance of the revised network on the basis of signal-to-interference ratio (SIR). It is clear that the above illustration could easily have been implemented in an active network, where the same transceiver would have been used in the iterative process, so that the simulations would represent that actual installed and operation network. In such an instance, it would have then been possible to feed back the new settings of the hardware to the actual hardware devices, to affect the improved network conditions in an autonomous, remote controlled manner.

Figure 15A:
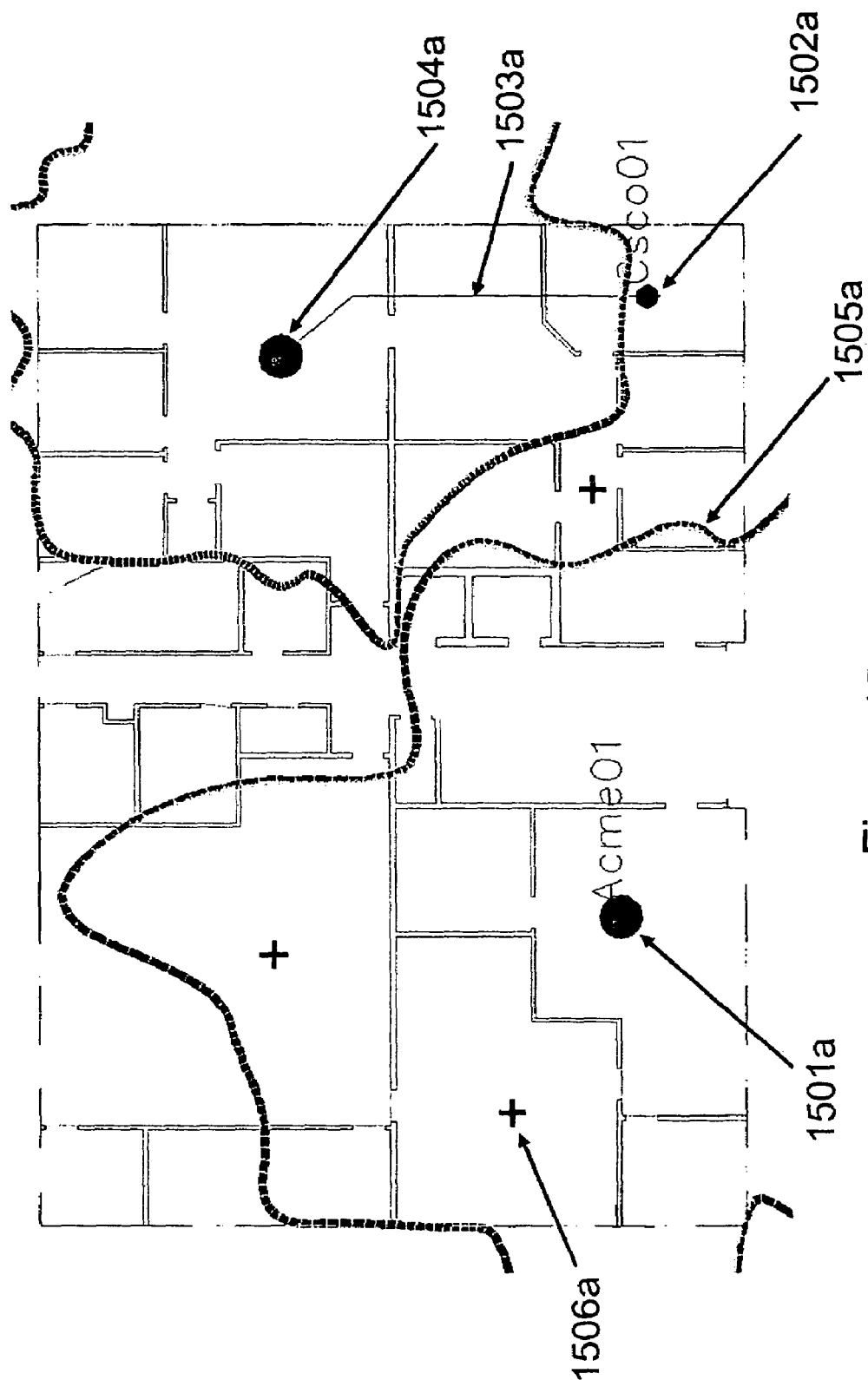
FIG. 15 shows a top-down view of a building floor plan containing new predicted (or measured) interference contours for equipment in revised positions.

In addition to analyzing different equipment types and configurations and/or settings to achieve some desirable level of network performance, the present invention may also analyze different equipment placements. Using the set of possible positions within the 2-D or 3-D model of the environment identified within FIGS. 7, 8a, and/or 8b, the invention may iterate equipment positions and perform performance predictions to gauge the desirability of the new positions on the overall network performance. Referring to FIG. 15a, the transceiver "Acme01" 301a from FIG. 3 has been repositioned to location 1501a. Transceiver "Csco01" 302a from FIG. 3 remains in its original position 1502a, as do its connected coaxial cable 1503a and antenna 1504a. The new predicted communication network performance in terms of coverage area is shown. In FIG. 15a, the "Acme01" transceiver 1501a and "Csco01" transceivers have predicted coverage boundaries shown for −70 dBm 1505a. Note that the coverage boundary for the "Acmo01" transceiver 1501a is now worse than when it was in its original position in FIG. 13.

Figure 15B:
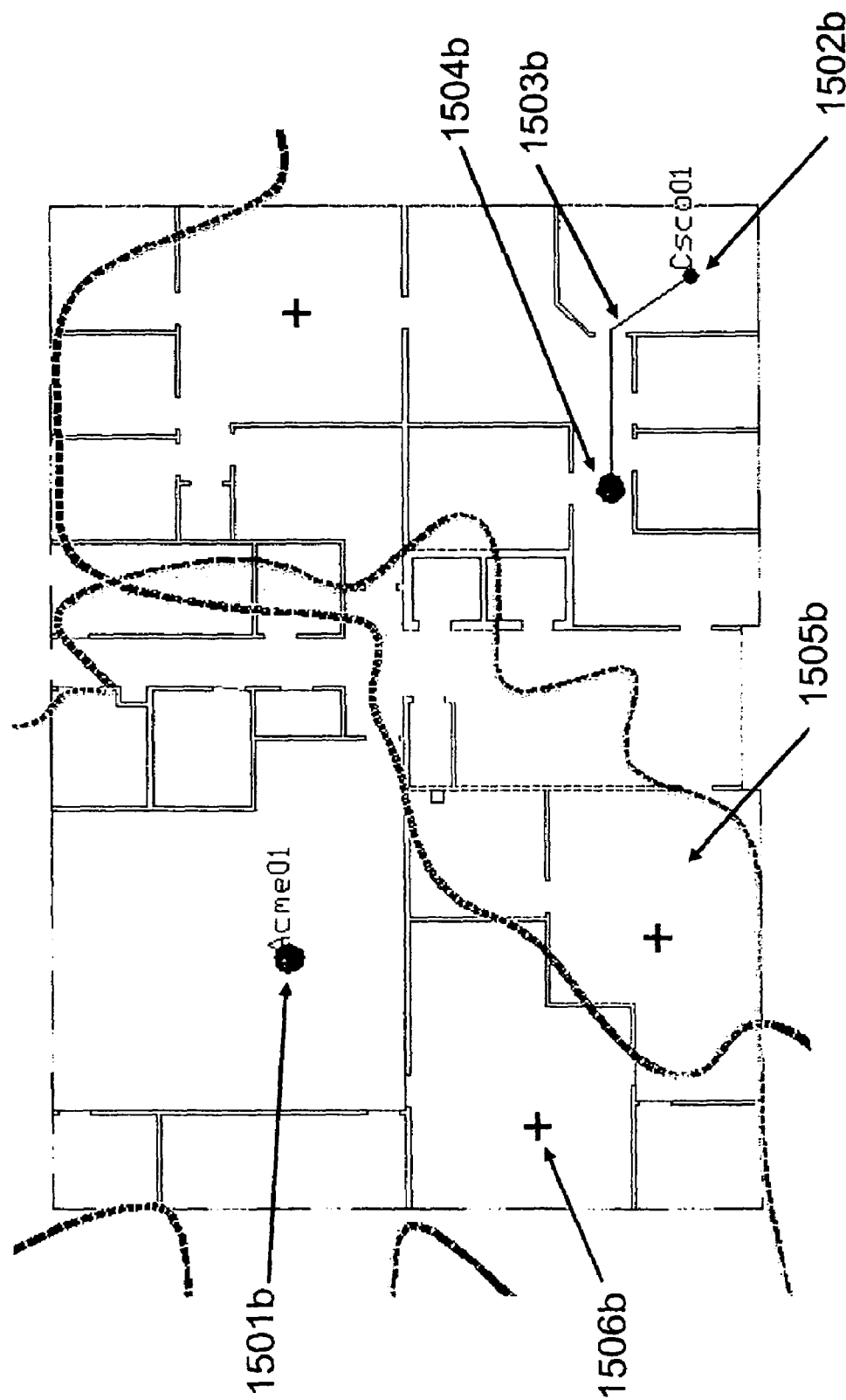

Note the other possible equipment positions 1506a indicated in FIG. 15a that have either already been considered or are still available for consideration. The invention continues iterating equipment positions until it reaches an optimal or preferred network configuration. Referring to FIG. 15b, note the new positions for transceiver "Acme01" 1501b, transceiver "Csco01" 102b, coaxial cable 1503b, and antenna 1504b. The new predicted communication network performance in terms of coverage area is shown. In FIG. 15b, the "Acme01" transceiver 1501a and "Csco01" transceivers have predicted coverage boundaries shown for −70 dBm 1505b. Note the significant overlap between the coverage boundaries 1505b, and the improvement over previous configurations shown in FIGS. 9, 13, and 15a. Through the process of iteration, the invention has identified optimal or preferred equipment placement to maximize the performance of the overall network.

In FIG. 15b, it is shown that the coaxial cable 1503b has been rerouted to provide a continual connection between transceiver "Csco01" 1502b and antenna 1504b. In the present invention, this automatic re-routing occurs on the basis of either shortest path (generally a straight line), shortest path avoiding obstacles (e.g., avoiding walls), or least cost. If the 2-D or 3-D model of the environment includes such information as cable trays, drop ceilings, or raised floors, such optimal or preferred paths for cable placement can be taken advantage of for the purpose of automatic cable routing to maintain connectivity between different pieces of equipment within the same network.

It should be understood that, in addition to remote control of the antenna pattern, the invention permits remotely controlling the channels, power levels, modulation, and other parameters. This provides a pre-install functionality, as well as an adaptive, real-time, remote control functionality.

Figure 16:
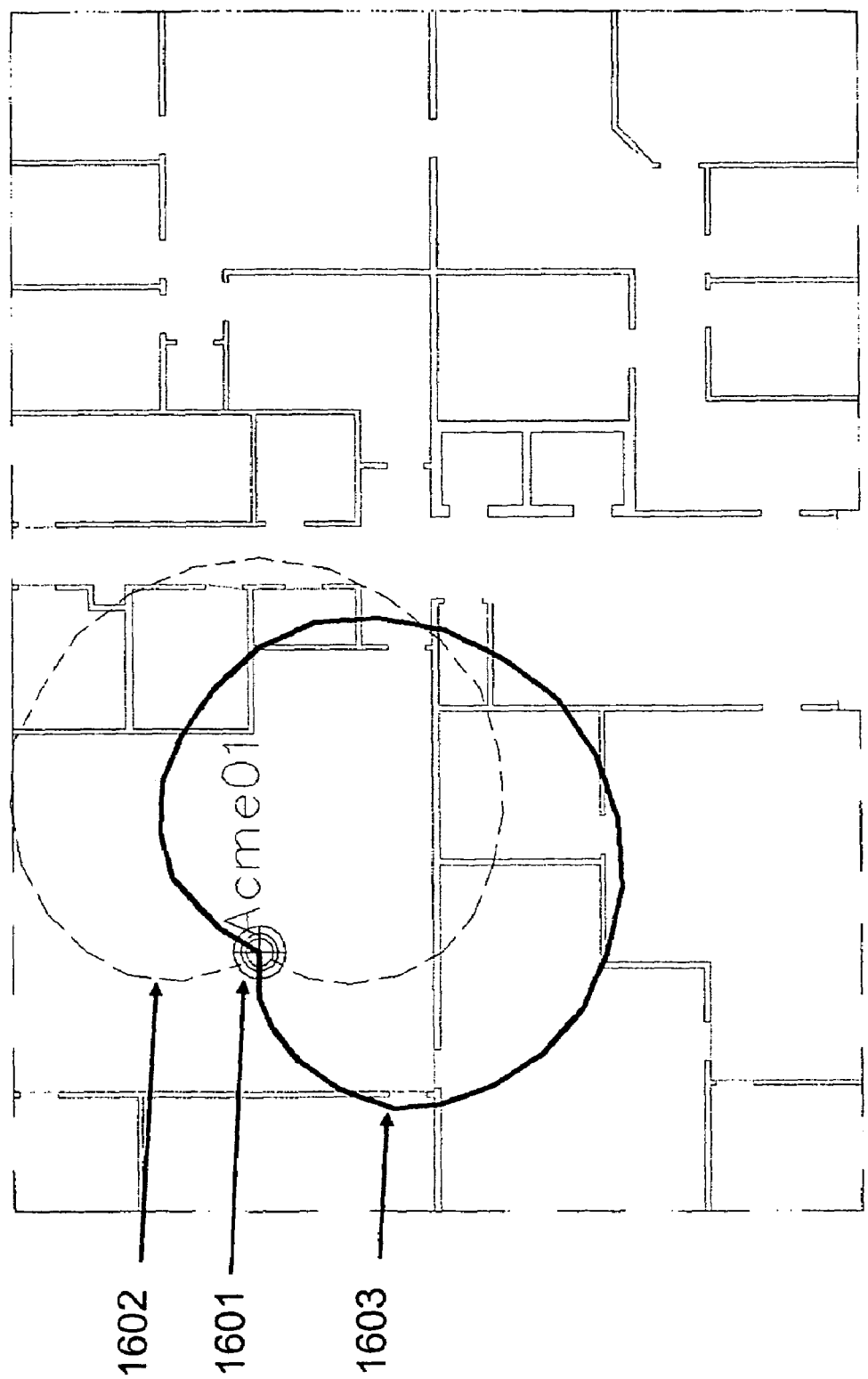
FIG. 16 shows a top-down view of a building floor plan containing equipment with antennas having been re-oriented in order to provide improved network performance.

In FIG. 16, there is shown an example of optimizing, the configuration of an antenna (per step 108 in FIG. 1). For certain pieces of equipment such as antennas the primary means of configuration may be in the physical orientation of the device itself. In which case, the invention is able to determine the orientation of the equipment in the network that achieves the optimal or preferred or near-optimal performance. Note that the orientation can occur around any axis of rotation possible for the piece of equipment in three dimensions. In FIG. 16, the radiation pattern for the antenna 1601 in a particular orientation of the antenna is shown as the dashed line 1602. That is, the radiating characteristics of the antenna 1601 (e.g., the amount of RF power being transmitted from the antenna in every direction) is represented by the dashed line 1602. During the iterative processing loop, the invention analyzes the selected antenna in the various orientations identified for it in step 103 of FIG.

Figure 6:
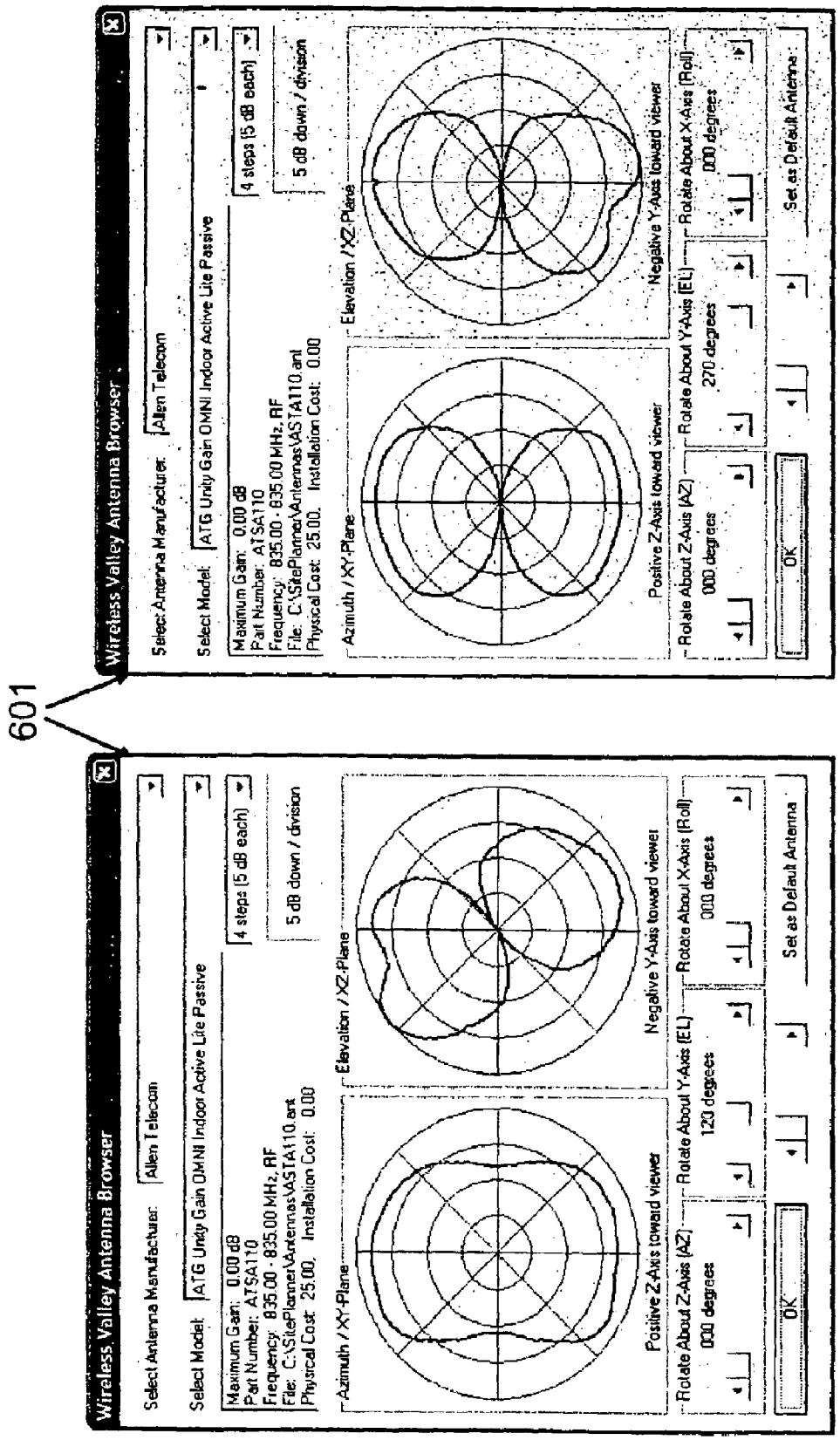
FIG. 6 is another examples pick list of equipment configurations.

1 and further described in FIG. 6. The invention determines which of the selected configurations achieves the most desirable network performance as defined by the user in step 105 of FIG. 1. In FIG. 16, the solid line 1603 indicates the radiation pattern for the antenna 1601 for the orientation of the antenna identified by the invention as the preferred orientation to place the antenna 1601 in order to achieve a more desirable network performance. Note that recent technology advances in antennae technology have made it possible to manufacture antennas that can adjust their radiating characteristics without the need for physically reorienting, the hardware. These antennas, commonly referred to as smart antennas or array antennas, if they can be remotely controlled or programmed via some form of communication link, whether through the Internet, wirelessly, or some other media, can be reconfigured by the invention through the remote equipment configuration and management process outlined in FIG. 8.

Although the example provided details a brute force algorithm for determining optimal or preferred equipment types, configurations, and/or positions, one skilled in the art could easily see how any other type of adaptive algorithm could be utilized to achieve the same or similar results Similarly one can immediately see how positions of client users could easily be predicted or determined using position location methods known now or in the future. Furthermore, by using the measurement capabilities provided through networked equipment, it is obvious that position location estimations may be conducted in real-time or in near real time, and could (also be displayed, by comparing the measured signal levels from one or more portable client users with those of predicted position locations determined from propagation prediction modeling. By resolving the measured signal levels with predicted levels, it is possible to use the current invention and known methods to accurately perform position location tasks.

Note that although the example provided is specific to improved performance on the basis of coverage area and signal-to-interference ratio (SIR), it should be obvious to one skilled in the art that any combination of one or more performance criteria such as quality of service (QoS), coverage zones, bandwidth or throughput availability, QoS for particular users, classes of users, or subclasses of users, overall handoff zones, overall data rate availability or data rate availability for particular users, classes of users, subclasses of users, overall or specific packet error rate, packet throughput, packet latency, bit error rate, signal-to-noise ratio (SNR), carrier-to-noise ratio (CNR), signal strength or RSSI, rms delay spread, distortion, or any other performance criteria such as cost, equipment vendor set, low-maintenance equipment, easy to install equipment, etc., known now or in the future could be utilized in performing similar network improvements.

Figure 17:
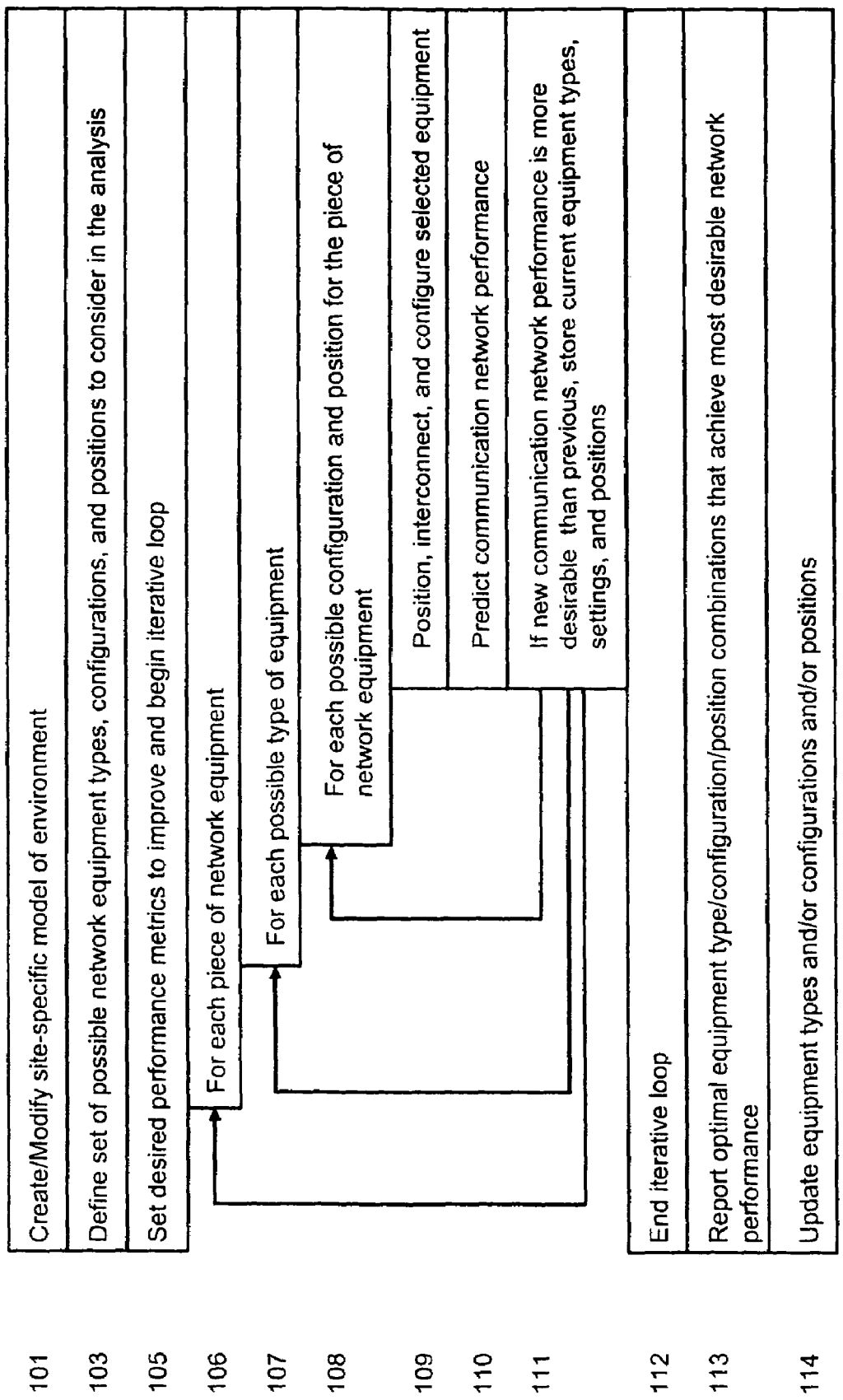
FIG. 17 shows an alternate method of the preferred invention involving iteratively determining the placement of new network equipment.

Referring now to FIG. 17, there is shown an alternate method of the current invention. The method shown in FIG. 17 follows closely the method of FIG. 1 with several exceptions. In the alternate method of FIG. 17, steps 102 and 104 of FIG. 1 are skipped, enabling the invention to predict the placement and configuration of a number of new selected equipment types within the 2-D or 3-D modeled environment. Through the method of FIG. 17, the present invention can determine the number, type, interconnection, configuration, and placement of a finite number of network infrastructure equipment that best satisfy the desired performance criteria set in step 105. This is a novel and powerful capability that enables the invention to automatically (or with user-interaction) predict for any wired or wireless network of equipment the optimal or preferred or near optimal number, type, configuration, interconnection, and position of individual pieces of equipment that should comprise the network in order to achieve a desirable level of performance.

The final step of the process of the invention as outlined in FIG. 1 and FIG. 17 is the update of the type and/or configuration of each physical piece of equipment in the actual communications network that corresponds to the computer representation of the equipment in the site-specific computer model 114. In this step, a real-time communication link is established between the invention and the physical piece of equipment represented within the site-specific computer model. This communication link may be via the Internet, infrared, wireless, or any other form of electronic or communication medium or protocol supporting method. When placing and positioning equipment within the site-specific computer model 102, the user may define the method by which the physical piece of equipment being represented within the site-specific computer model of the environment may be contacted via a communication link. This method will vary depending on the type of communication supported by the piece of equipment. For example, a piece of equipment that supports communication via the Internet may be identified by an Internet Protocol (IP) address and the command set to which it will respond. Once a communication link is established between the invention and the physical piece of equipment, the invention transmits the command instructions appropriate for the given device (as defined by the user in step 102 of FIG. 1) and sends the new optimal or preferred configuration information. The physical piece of equipment receives the new configuration information and adjusts its internal settings accordingly. Note that this form of automated update of equipment is only available with certain devices that provide for the ability to be remotely configured. It is also impossible to update the actual type of equipment in this manner. Such an update requires a full replacement of the physical component with a different piece of equipment.

It should be clear that the invention may be implemented, viewed, displayed, or used using a remote client-server application, an application service provider model, or on or over the world wide web or Internet.

Figure 18:
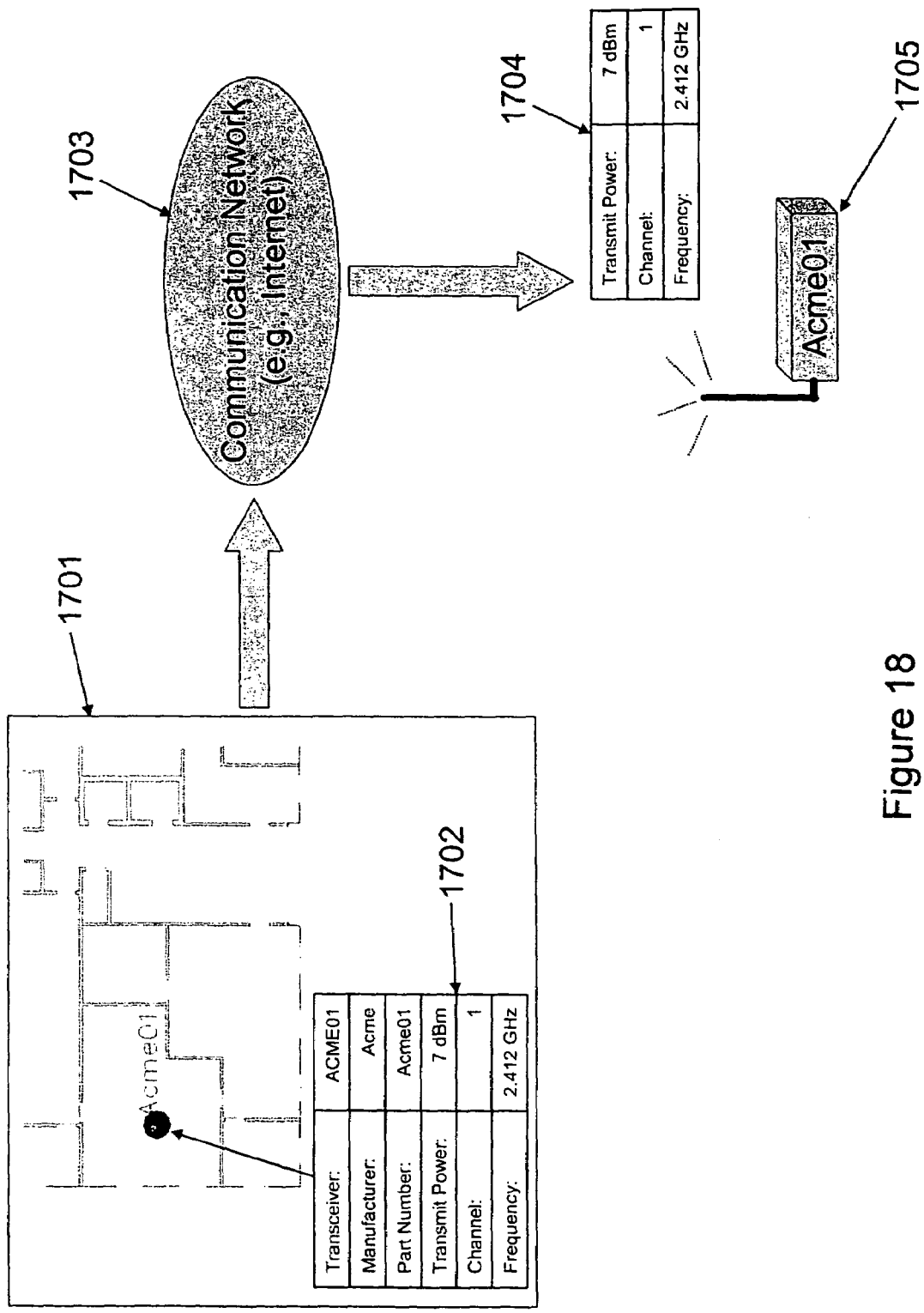
FIG. 18, shows a diagram illustrating the process whereby existing network equipment may be re-configured or re-adjusted remotely according to the invention.

FIG. 18 depicts the typical situation for the communication link between the invention and a remote piece of equipment (or some other component such as an adaptive or adjustable antenna, etc.). The invention maintains a site-specific model of the environment in which the piece of equipment is deployed or is to be deployed, and maintains a model and description of the piece of equipment itself 1801. Through the automated method described previously, the invention has determined the appropriate configuration for the piece of equipment in order to achieve some desirable performance goal for the network 1802. The invention establishes a communication link with the physical component (e.g. the piece of equipment 1805) via some medium 1803. The relevant configuration information 1804 is transmitted to the piece of equipment 1805, which receives the information and takes the appropriate steps necessary to adjust its settings accordingly.

The CAD application program as described herein could be simplified to be a low cost software application that serves as a simple 2-D or 3-D front end graphical user interface to a computational engine that is implemented in integrated circuit or embedded software form. In fact, a portion of the invention itself could be mass produced and embedded within chips or software that is shipped within wireless transceivers, or within other active components used within a network, whereas another portion of the invention could be provided on CD ROM: or other software medium provided with each access point or active component that was sold, or with operating systems sold or packaged on computers that control or connect with transceivers and hardware. Thus, for example, a combination of the CD ROM computer software with a connected network of components would allow a user to provide adaptive network design simulations on his or her PC (before a network were built) but also could provide adaptive control of an actual installed network. In another example of the invention, each wireless transceiver or other component might have with it a software application, either embedded in software, implemented in integrated-circuit form, sent via file download, or supplied with a CD ROM or some other medium, capable of enabling the performance of some or all of the functions detailed in the described invention, so that a user could be assured of having a powerful design, prediction, deployment, maintenance, and on-going adaptive network control capability in any wireless transceiver, access point, or equipment component that she bought.

It should be clear that the invention is not limited just to wireless communication networks, but may be used to present any type of electromagnetic characteristics superimposed on any simulated physical environment. For example, the invention would find application in the next generation field of smart cards, smart tags, or micro-machines and nanomachines or micro-electrical-mechanical machines (MEMS). These tags or machines are extremely small yet highly sophisticated functional elements that allow them to perform complicated tasks in hard-to-access locations, Such as inside cargo containers, embedded within buildings, the human body, in plumbing, in jet engines, etc.

For security and sensing networks, such tags or devices will become more important. For example, small sensors that can be made to detect when a package has been opened or tampered with may be constructed using MEMS capabilities. If an envelope or container is opened, a tiny spring may be activated which would flip a binary logic device, thereby indicating tampering—by using small RF devices (passive smart cards), a local reader could detect the tampering condition and send this information to a controller or maintain it in a portable reading device. The invention could be used to provide provisioning and then control of such a network of smart cards, say on board a cargo ship, inside a post office, within a library, or in other locations where security or assured sensing or network control must be maintained, even if the data rate is low. Another application of the disclosed invention would be for a new type of network herein disclosed: a network of new devices that do not yet exist —the new device is what we call the "wireless post-it", which is likely to emerge some day due to the continuing pervasiveness of wireless networks and Wireless LANs. The wireless post-it is a massive memory, made of silicon, GaAs, or some other material or composites, and is integrated with a passive RF smart card device, the complete invention being about the size of a small index card or a small post-it note. The wireless post-it could contain the equivalent of one or more books, and is much lighter, much cheaper to produce, and much more portable. The wireless post-it can be programmed at manufacturer (like a pre-recorded CD or record), or can be programmed, written to, and re-written to by a local application or by downloadable means. Normally passive, when illuminated by a local RF generating reader device, the post-it note receives enough power via RF carrier, and a simple instruction to transmit a part or all of its memory contents over a wireless or infrared link to the reader device. Each post-it would have a unique or semi-unique address (like a copyright notice or some other ID that enables wireless post-its to be identified from one another in content). These wireless post-it and reader devices are likely to operate at frequencies above 5 GHz, and will be used over very small distances, within a room, and perhaps shall be used in the 58-65 GHz band, or in even higher frequency bands where great bandwidths are now being provided for in a license-free fashion by the FCC. In this way, it will be possible to store books, encyclopedias, and massive data, such as computer hard drives and other memory devices, which today are typically found on book shelves, or which take up space because of bulk, and which could be downloaded very quickly due to the great bandwidths.

Note, however, with the proper power and antenna parameters or settings provided with a cradle or attachment for the reader, (or with a series of repeaters located in close proximity to the actual wireless post-it), the portable reader can be left unattended in the room and connected to an Ethernet or optical backbone, where it then becomes possible to remotely control the reader via remote computer control so that the reader is then able to download contents of specific Wireless post-its in the room and send such data throughout the world via Ethernet or Internet means. Clearly, addressing could be done to allow proper control of readers and wireless post-its. The remote access of books would allow someone to retrieve information over the internet, and such retrieval could be done wirelessly via internet connection to the reader in the room, so that someone does not have to lug the book from the bookshelf each time they wish to read information. The adaptive control of such networks that would support this novel wireless post-it concept is one example of potential application of the disclosed invention.

For example, the invention could be used where it will be necessary to both wirelessly communicate with these wireless post-its or sensors or machines as well as wirelessly provide power or recharging for these machines, such as in the form of RF pulses, infrared (IR) light or any other form of electromagnetic medium. The present invention would therefore facilitate the optimal or preferred configuration of this or any other wireless electromagnetic system. Furthermore, it should be clear that while the invention has been described as communicating with fixed infrastructure, it should be clear that the network infrastructure could itself be mobile or portable, such as in the case of ad-hoc networks. In addition, it should be clear that this invention could be implemented if standard protocols were developed between networking equipment and distributed equipment (such as home appliances or other mass produced products) such that cost, maintenance, configuration, control and measurement data could be passed easily and stored at network components, as well as stored at a CAD application, that itself is either stand-alone, embedded within software, or implemented in an integrated-circuit fashion.

As discussed above, the present invention allows for the management, control, archiving and monitoring of networks of wireless hardware devices, which include network infrastructure and mobile or user devices that are connected as part of the network. Hardware devices, such as portable computers, user devices, VoIP phones, smart tags, wireless post-its, RF tags, or sensors, etc. can be remotely accessed and configured, and even located, based on over-the-air instructions provided by the end user device, or based on instructions provided by the network infrastructure, provided by the controller, or through instructions communicated between the network controller or infrastructure equipment or mobile/user device to achieve some desired performance, bandwidth allocation or provision, or network security goat for each particular user or device or groups of users or devices on the wireless network.

Hardware devices can be remotely accessed and configured within the context of the physical location of each device within a site-specific model to achieve some desired performance or network security goal. This unprecedented degree of network control and management has direct benefit to and offers novel functionality to the area of voice over internet protocol (or VoIP). VoIP is an emerging technology that enables voice communication on a wired or wireless internet protocol (IP) based network. Inherently a packet-based protocol, IP is not particularly well-suited to real-time applications, although the user datagram protocol (UDP) supports real-time unprotected transmission of data. As such, the efficiency and robustness of the network design and the ongoing management of the network infrastructure and coding of IP data is critical to the quality and success of VoIP. Also, cross-layer design, as described by Shakkottai, Rappaport, and Karlsson in October 2003 IEEE Communications Magazine may be useful to properly provision and implement VoIP in a multi-user wireless network.

Use of the Invention for Security, Bandwidth Provisioning, Position Location, and Wireless Post-its As previously described, there can be interactive feedback between the user device, the network infrastructure, and the controller, using the wireless network and the wired infrastructure, to achieve the particular desired bandwidth provisioning for each user, or groups of users, access points, network nodes. Furthermore, it can be seen that with such capabilities to communicate throughout a network, it is possible to authenticate, allocate, or ensure desired security for each user, whereby the display of such data may be performed on a site-specific model of the physical environment of where the network operates. Security methods, that use a wide variety of techniques that are well known in standards bodies or which are currently being developed, such as IEEE 802.1x, Wired Equivalent Privacy (WEP), and other methods for ensuring proper bandwidth allocation and roaming of users in wireless networks, may be implemented by the network controller described here, and may further be implemented in an embedded or distributed manner between the network controller computer, infrastructure equipment, and end-user equipment, as described earlier. Methods described in the Intel Technology Journal, Vol. 7, Issue 3, August, 2003, and "Pick Your Wireless Solution" author and date unknown, include methods and techniques known to skilled artisans, and these references are hereby incorporated in their entirety in this application.

In the current invention, remote hardware devices which can be connected to the network, such as WLAN modems, RF tags, Smart Tags, mobile or portable user devices, pocket PCs with WLAN modems, integrated cellphone or VoIP communication devices, sensors., or wireless post-its, and the like, may be sporadic or unscheduled or they may be scheduled in their use of the network. Such remote devices may be used for providing end-user (human) communication, but also or alternatively may be used for machine-to-machine communication or human-to-machine communication in the network—such that such remote hardware devices may be used for storing data, measuring network performance, recording or recording data sent to it by a source, displaying important data such as interference levels or network usage levels seen by the device, security levels, setting, or breaches of the device and those connecting or attempting to connect to the device, access attempts, IDs, or time of attempts to connect to the device, authentication or identification or security data, and overall observed network activity or spectrum quality or network performance.

In addition, a network device may be used as an RF tag, or sensor, or wireless post-it, and may contain additional data such as price, pallet number, origination and destination location, customer and merchandising data, part number, manufacturer, weight, volume, quantity, item description, bar code data, customer or manufacturer data, shipping information, dates and times, maintenance history, warranty history, current operating status, author name, publication date, copyright information, watermarking information, title, and other informational fields or quantifiable value, may also be accessed, queried, and updated using the present invention. This provides a facility for monitoring and managing not only the hardware devices themselves, but the additional information that may be associated with, embedded within, or accessible from the hardware devices under management.

The present invention provides command and control as well as a communication connection to the network infrastructure and end user devices to control, read, write, process, alter, or coordinate information between devices using a site-specific interface. The present invention organizes and presents this information in a site-specific context, showing subsets of particular data which is read from end user devices or other hardware, and which may alternatively provide either a location display or pin-point presentation of assets, an archiving record of site-specific information about the users of the overall network performance, or a monitoring and control provision for particular end users or groups of users, on a site-specific representation of the physical environment.

The present invention is not limited to any single communication technology, as it can be used widely, and relates to and can be realized with any communication infrastructure known today or in the future. Applications for the invention may be found in network control, inbuilding and campus communications, and logistics, for example, where bar code readers throughout a factory or supermarket are connected (either wired or wirelessly) to one or more network controllers located in the store or located remotely at a data monitoring center. The network controller based on this invention provides a user with a site-specific display of the store or factory floor, and also allows users to interact with the actual RF tags (such as RF ID tags or wireless post-its, etc) and the RF tag readers (where tag readers are known to either read or write to a tag) that may be located on or near one or more individual products, store shelves, or aisles throughout the store.

For example, using the methods of Bahl (cited previously) or other position location methods such as SnapTrack, GPS, or inductive sensing, as well as other position location methods known now or in the future, a user of the invention could use the site-specific interface to query the network as to the location or to find specific data of one or more RF tags. Through the communication techniques described above, the invention could then provide a display of the location of the particular device or, groups of devices being searched. The invention not only displays the location of infrastructure, but also displays the exact or approximate location of the desired end-user device or devices, such as one or more RF tags which may be connected to a pallet or a particular product or batch of products. Note that the network infrastructure, in this case which includes the RF tag readers, is available to the network controller and may be displayed by the invention.

Also, the particular estimated position of the end user device or devices, in this case the RF tags being searched, may also be displayed. It should be clear that some of the network infrastructure, in this case the RF tag readers, may be fixed, or may be mobile or portable, used by personnel or located on carts, trucks, or fork lifts, etc. Similarly, the end user devices, such as RF tags or modem users, may be fixed or mobile. The ability to allow a user to rapidly query a large network of devices, Such as RF tags, and display the data pertaining to those tags on a site-specific representation of the environment, while combining the interaction with the network infrastructure and control capabilities of the network, provides an unmet need and fundamental breakthrough in inventory management. The present invention allows a store manager, for example, to rapidly find missing or expired products, or to track down the location of parts that have a defect and which must be recalled, by showing an actual blueprint or map of the facility, along with the locations of key infrastructure components and locations of the desired end user devices.

With the same invention, new data may be written to the selected RF tags, to reflect a change in price or expiration date, or to reflect entries by other automated processes used by other equipment (e.g. vendors who replenish the store shelves and who enter such data automatically using enterprise management systems or other inventory management software) so that customers could rapidly see new information displayed on the RF tag (price label, for example) on the store shelves. Furthermore, this data may be shared with or readily available from other resource management solutions used in stores and factories, thus allowing the present invention to be an add-on or complementary solution of great value to existing management software and other products used in logistics, as it provides a site-specific display of the particular location and status of various networked devices and infrastructure. It should be clear that while the above discussion considers RF tags and readers, other wireless devices and applications are applicable to the present invention. Further details of an embodiment for the described invention with application to RF tags are given below. In the meantime, consider the following example of another application of the present invention, given in the following diagrams.

Figure 19:
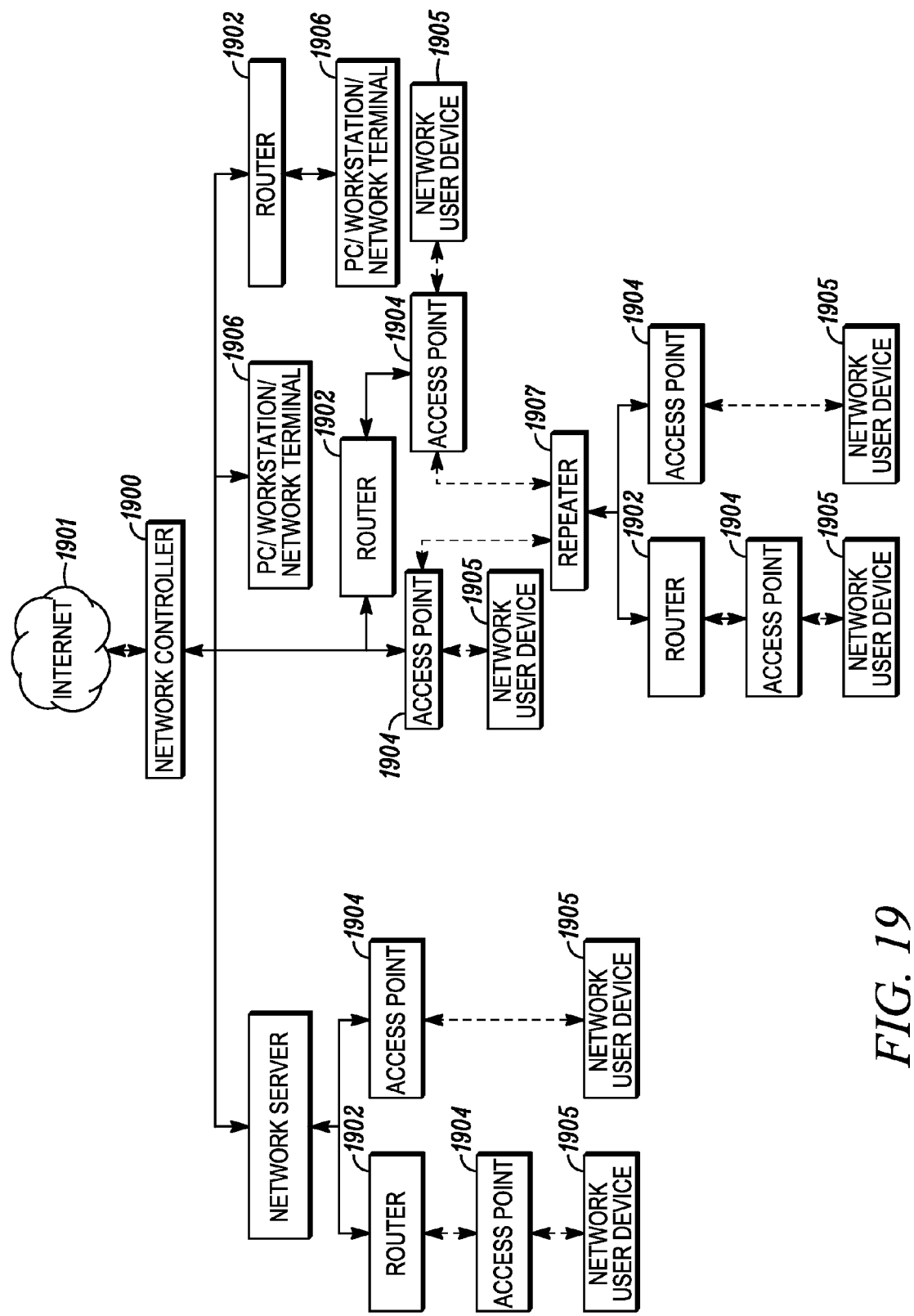
FIG. 19 shows a logical diagram of a typical local area network (LAN) that contains a wireless LAN (WLAN)

FIG. 19 presents the logical diagram of a typical local area network (LAN) that contains a wireless LAN (WLAN). Not all WLAN implementations will follow this precise layout, but one skilled in the art can see how variations on the logical network shown in FIG. 19 can exist within the scope of this invention. Note that the WLAN network may instead use RF card readers/writers and controllers, etc. The WLAN in FIG. 19 consists of a network controller 1900 (also referred to as a network switch) that typically acts as the gateway between the WLAN and the Internet 1901. Note that the Internet 1901 could alternatively be substituted with dedicated dial-up or circuit switched communication networking for special applications to remote hosts or other network controllers. The network controller 1900 is connected, either directly or indirectly through other intermediate equipment, via wired or wireless connections, either on site or remote, to various other pieces of equipment comprising the WLAN, including routers 1902, network servers 1903, personal computers (PCs) or workstations 1906, and access points 1904. Repeaters 1907 can be used to receive, amplify, and rebroadcast the wireless signal from any access point 1904 to end users 1905, as well. Repeaters 1907 may, in turn, be connected, either directly or indirectly through other intermediate equipment, via wired or wireless connections to various other pieces of equipment comprising the network, including routers 1902 and access points 1904. Network users 1905 that connect to the WLAN wirelessly using portable phones, laptops. PCs, pen tablets, personal digital assistants (PDAs), or other wireless communication devices may access the network, as well. Also, network users may not have a direct human interface, such as RF tags, wireless post-its, etc. Network users may be mobile or fixed in place, and may be actual living beings or some form of data or information monitoring, computing, storing, recording, and reporting devices, either passive or active.

Figure 20:
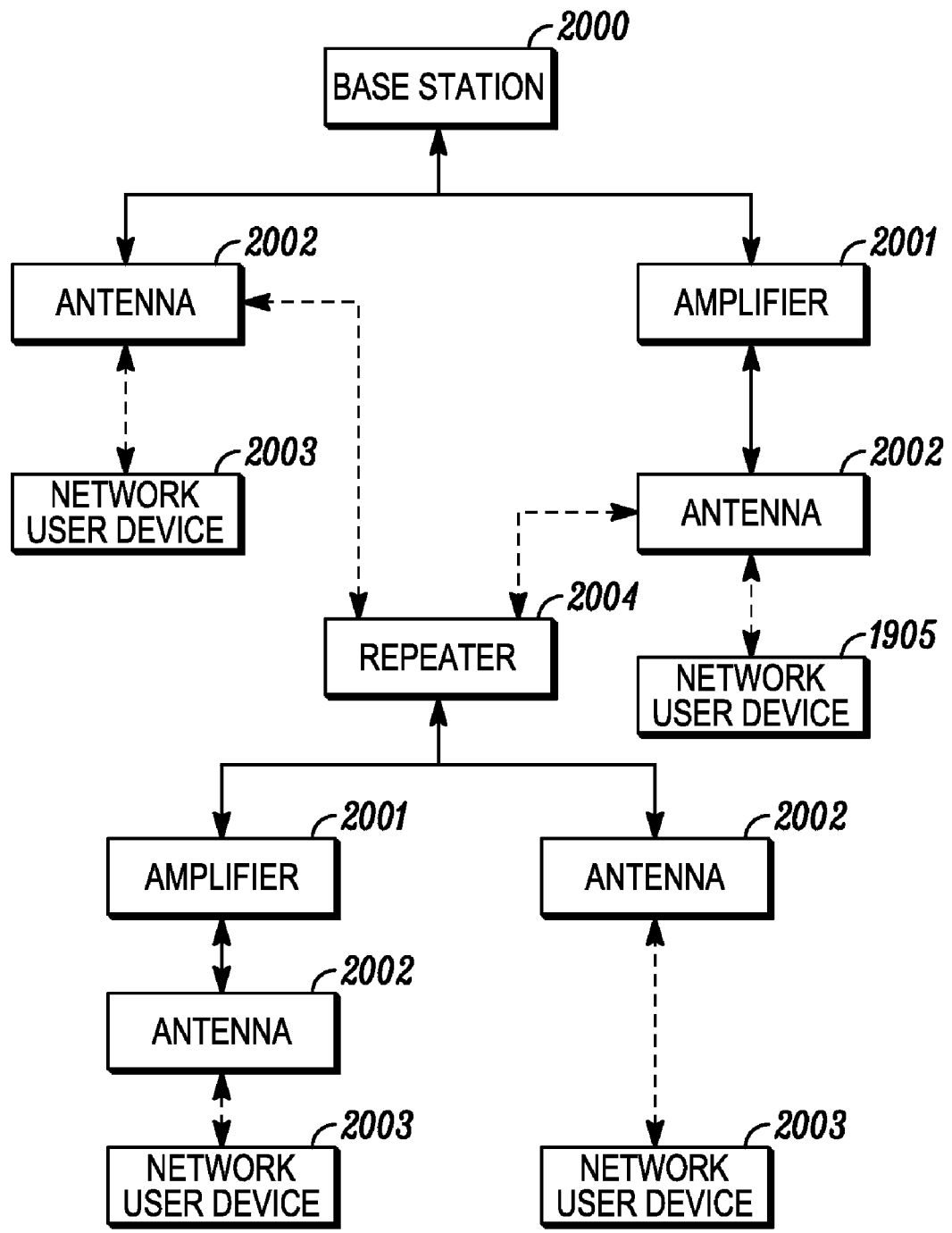
FIG. 20 shows a logical diagram of a tynical cellular, personal communication system (PCS) third generation (3G) or fourth generation (4G) wireless network.

FIG. 20 presents the logical diagram of a typical cellular, personal communication system (PCS), third generation (3G), or fourth generation (4G) wireless network. Certainly not all cellular, PCS, 3G, or 4G network implementations will follow this precise layout, but one skilled in the art can see how variations on the logical network shown in FIG. 20 can exist within the scope of this invention. The communication network depicted in FIG. 20 consists of a base station 2000 that is analogous to the network controller 1900 of FIG. 19. The base station 2000 is connected, either directly or indirectly through other intermediate equipment, via wired or wireless connections to various other pieces of equipment comprising the network, including amplifiers 2001 and antennas 2002. Repeaters 2004 can be used to receive, amplify, and rebroadcast the wireless signal from any antenna 2002. A repeater 2004 may, in turn, be connected, either directly or indirectly through other intermediate equipment, via wired or wireless connections to various other pieces of equipment comprising the network, including amplifiers 2001 and antennas 2002. Network users 2003 that connect to the communication network wirelessly using portable phones, laptops, pen tablets, personal digital assistants (PDAs), or other wireless communication device may access the network as well. Network users may be mobile or fixed in place, and may be actual living beings or some form of automated data monitoring, recording, and reporting devices.

Figure 21:
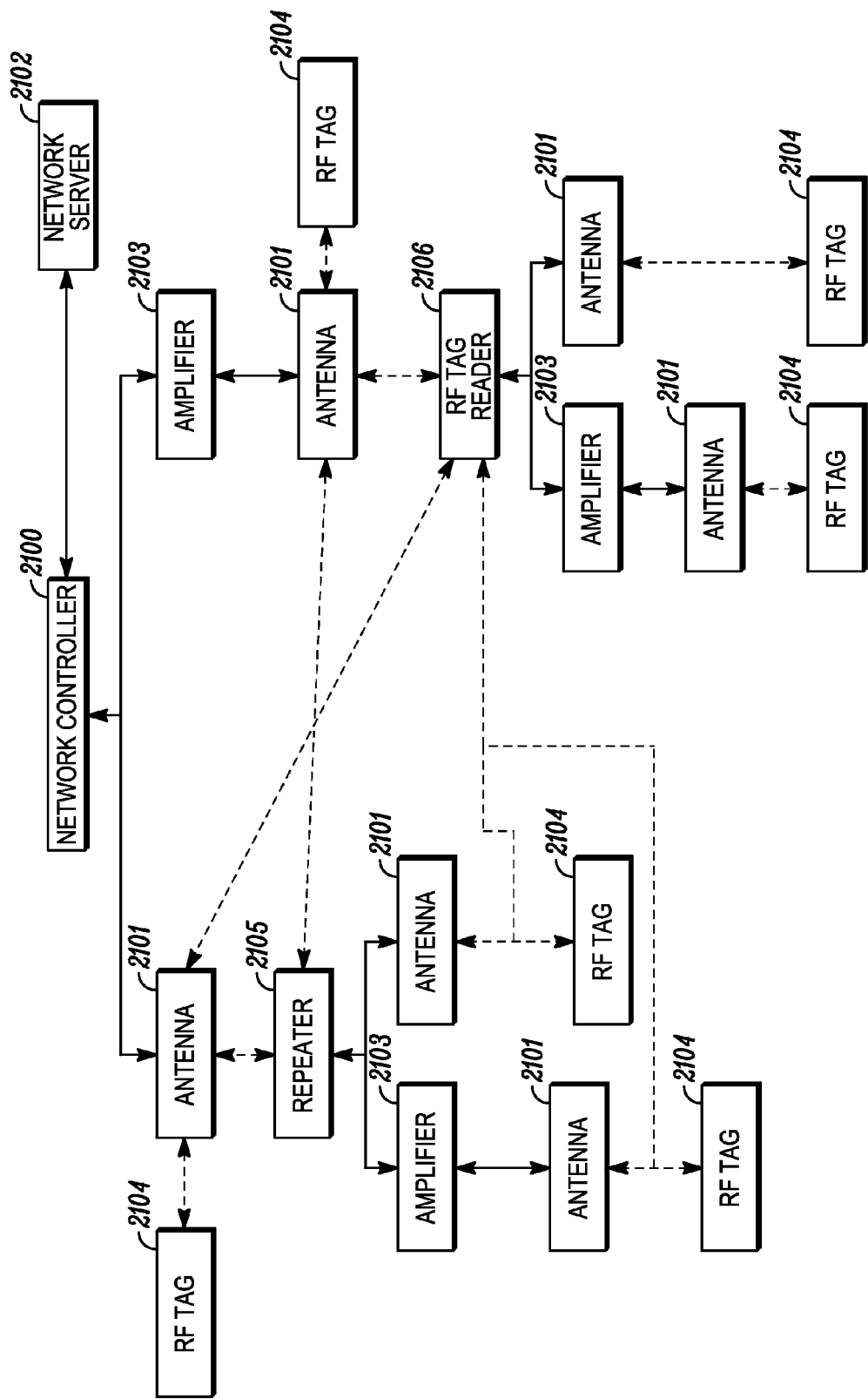
FIG. 21 shows a logical diagram of a typical radio frequency (RF) tag network.

FIG. 21 presents the logical diagram of a typical radio frequency (RF) tag network. Certainly not all RF tag network implementations will follow this precise layout, but one skilled in the art can see how variations on the logical network shown in FIG. 21 can exist within the scope of this invention. The network controller 2100 is connected, either directly or indirectly through other intermediate equipment, via wired or wireless connections to various other pieces of equipment comprising the network, including computer servers network controllers or PCs 2102, amplifiers 2103, and antennas 2101. The network controller may, in an alternative embodiment, be viewed as a RF card reader or transponder or reader/writer. Wireless signals pass between the antennas 2101 and passive or active RF tags 2104 in order to exchange information. The antenna 2101 enables the network infrastructure to wirelessly connect to the RF Tag 2104. The RF Tag 2104 itself has its own antenna (not shown) which may be integrated on a single assembly or may be discrete components. For the purposes of this document, passive RF tags are mobile or fixed wireless devices that cannot independently originate a wireless signal, whereas active RF tags are mobile or fixed wireless devices that can independently originate a wireless signal of some type. Note that either passive or active RF tags may include storage, measurement, and display capabilities, and may be used for displaying prices to customers, or may be used to receive or invoke the display of time-varying information such as a moving picture, blinking, lights, flashing, audio signals, or some other means to attract human attention. In addition, RF tag readers 2106 can be used to process and detect and transmit the wireless signal from any RF tag 2104 or antenna 2101. The card reader or transponder (RF tag reader or transponder) 2106 may, in tun, be connected, either directly or indirectly through other intermediate equipment, via wired or wireless connections to various other pieces of equipment comprising the network, including amplifiers 2103 and antennas 2101, or through hard wiring to a controller.

Referring to FIGS. 19, 20, and 21, it is clear that any of the equipment, devices, or users depicted in the figures may be mobile or fixed, embedded within or attached onto other devices or structures, and may optionally allow for human interaction through attached input devices (such as keyboards, pen, stylus, or a mouse) and display or feedback devices.

As discussed previously, the present invention is capable of representing a two-dimensional (2-D) or three-dimensional (3-D) computerized model of a physical environment. Furthermore, the present invention provides the ability to design and configure a wireless network communication system by determining the type, placement, configuration, and interconnection of network infrastructure within the context of the site-specific model of the physical environment, and further supports the interaction, management, and control of end user devices and network infrastructure within a wireless network. In addition, as the computerized model of the network topology is being generated, the designer can identify a communication path between the graphical icon representing each network device within the computerized site-specific model and the actual physical network device. This identified communication path may take the form of an IP address, media access control (MAC) address, network serial number, phone number, bar code, user name, RF identifier (ID) tag, or some other identifier that both uniquely defines the network device and describes or implies a specific means of establishing a communication link with the device. For example, an IP address uniquely describes a network device that may be accessed using an IP protocol via the Internet.

Figures 22, 23A:
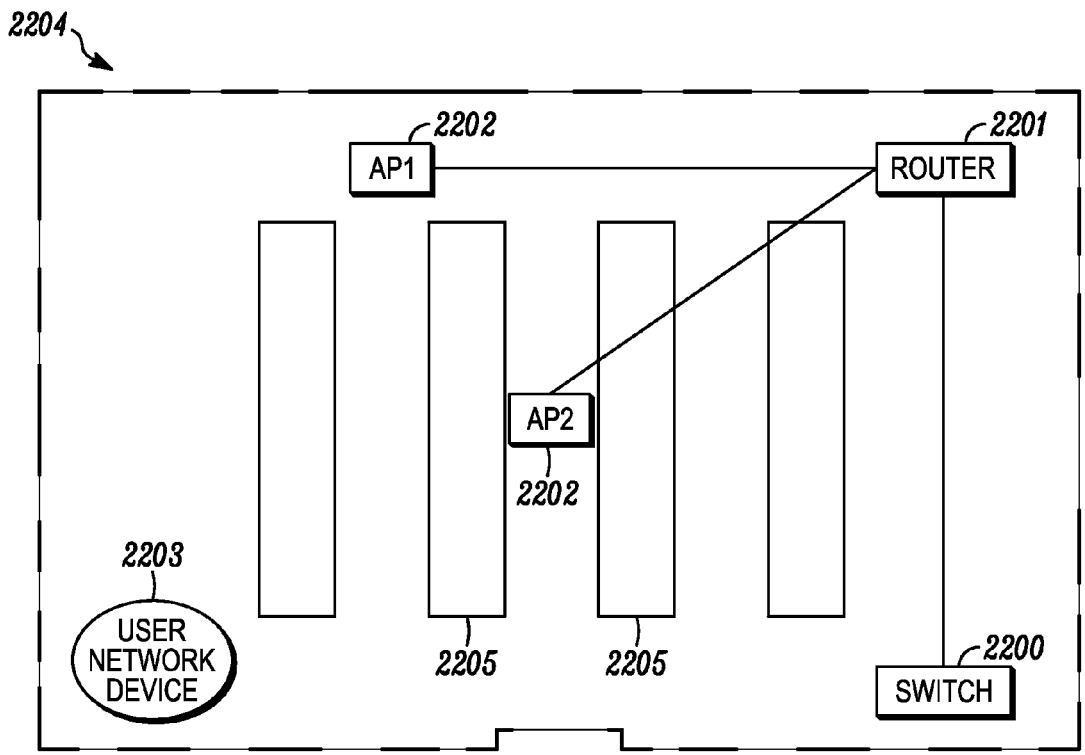
FIG. 22 shows a physical model of a WLAN.
FIG. 23a shows an example of user-input dialog boxes for inputting queries to specific types of information.

Referring to FIG. 22, there is shown a screenshot from the present invention showing a WLAN as designed for a warehouse environment. The warehouse 2204 consists of metal shelving 2205 and other physical obstructions that are represented by the invention. A WLAN consisting of a network controller 2200, router 2201, and access points 2202 is modeled by the invention within the context of the warehouse. Thus, FIG. 22 provides a physical model of a WLAN. Note the correlation between the physical model of the WLAN in FIG. 22 and the logical model of the WLAN in FIG. 19. Any logical network representation or variation thereof shown in FIG. 19, 20, or 21 or any other type of communication network, can be represented as a physical model within the present invention in similar fashion. Although a warehouse 2204 is used in this example, any physical environment such as a room, building floor, building, campus of buildings, city, or any outdoor environ could be represented within the present invention. A single floor and single room of a warehouse facility is shown for simplicity.

If the WLAN shown in FIG. 22 has been implemented in the real world within the given warehouse, the present invention can interact with the physical hardware represented by the icons in FIG. 22. For example, the network switch 2200 icon in FIG. 22 corresponds to an actual network switch of known type that is physically located in the corresponding location in the actual warehouse represented by the computer model. The Access Point or card reader AP 2 may be connected wirelessly or may be wired to the router, etc. The present invention provides the means to communicate with the hardware equipment using either a wireless or wired communication protocol. The actual form of the communication media and protocol may vary by equipment type or installation preference, but one skilled in the art can see how this invention encompasses any variation in the form of the protocol or medium implemented.

In addition, the present invention provides the means of communicating with devices that are interacting with the physical network infrastructure in some fashion. For example, the users 1905 in FIG. 19, the users 2003 in FIG. 20, and the tags 2104 in FIG. 21 may also be communicated with by the present invention in a similar fashion as with the physical network infrastructure. The actual form of the communication media and protocol may vary by equipment type, but one skilled in the art can see how this invention encompasses any variation in the form of the protocol implemented. Because the present invention can establish a communication link with physical network hardware and network users, information can be exchanged. This information can vary depending on the capabilities of the network hardware, but may take the form of some combination of numeric values and/or textual strings that represent information interpretable by the network hardware equipment, the present invention, a user of the present invention, and/or a user or onlooker interacting with the network in some fashion. The present invention can send instructions to a network hardware device that reconfigures the network device in some fashion. For example, the present invention can instruct the network hardware device to adjust its power levels, encryption settings, data throughput levels, user priority levels, communication protocol, allowed network users, channel settings, radiating characteristics, security protocols, or any other form of configurational setting. For network users, the present invention can instruct the communication device being used by the network user to adjust its configuration in a similar fashion. The present invention can also send information that is to be stored, manipulated, or displayed by the receiving network hardware or network user. For example, the present invention can send pricing information, bar codes, graphical images, textual messages, maintenance records, emergency instructions, or any other type of information. The present invention can also send instructions to be carried out by the receiving network hardware or network user. For example, the present invention can instruct a network device to monitor and report network activity or performance, to block a particular user's communication, to increase or lower a particular user's or group of users' priority levels, to change security protocols, to adjust bandwidth provisioning (bandwidth shaping), or other type of instruction that can be carried out by the receiving device.

The information flow between the present invention and the network devices and users may be initiated by the invention or by the network device, and may be unidirectional or bi-directional. For example, a network device may detect that an invalid user is attempting to register on the network and report this invalid activity to the present invention. In this fashion, network devices can report faulty or erroneous conditions, Such as rogue users or equipment, excessive interference or other poor performance conditions, excessive network traffic or blocking conditions, voice over Internet protocol (VoIP) traffic flow or billing minutes, bandwidth provisioning constraints, user authentications and authentication rates, security breaches, inventory levels, position changes or movement, or any other type of information that may be useful to monitor, track, archive, and display.

The present invention is capable of communicating with any of the infrastructure or mobile devices shown in FIGS. 19, 20, or 21 in order to monitor activity on the respective networks and display real-time or archived network activity in a site-specific context to an observer. As the present invention can also represent the physical network as shown in FIG. 22, the present invention provides the bridge between the physical representation of the communication network, the logical representation of the communication network, and the physical network and network users. Any of the informational flow items mentioned above can be actively monitored, archived, and displayed by the present invention in a site-specific manner. This can occur on demand., in real-time, or on an on-going basis. An example of this interaction is shown below.

FIG. 23a shows sample user-input dialogue boxes that allow a user to input queries for specific types of information to be displayed by the invention regarding a particular network infrastructure device or network user device. This query facilitates the ability for the invention to search the entire network for any network infrastructure device or network user device matching the query. The present invention allows for the querying of any numeric or textual data contained within or measurable by network devices that are accessible from the invention. For example, a user could query for users or groups of users have a specific user priority to level, security classification, or bandwidth allocation. In addition, queries can be generated for network performance metrics, security levels and breaches, bandwidth provisioning, and information contained or measurable by individual network devices, such as price, part number, location, quantity, etc. It should be clear that data represented by the query can be either retrieved or sent. That is, a query may take the form of a search and replace operation, where all instances of a given data type, information item, or configuration or performance setting should be replaced by a different value. Although the quests dialog window shown in FIG. 23a contains selections based upon an RF tag network, one skilled in the art can see how the form and content of the query dialog shown in FIG. 23a may be different depending on the type of network being accessed.

The query dialog shown in FIG. 23a may also take the form of a filter that is applied to information retrieved from network infrastructure devices or network user devices. As network devices are queried for information by the invention, or proactively send messages to the invention, the invention may apply a user-customizable filter to the messages so that only a subset of the complete message or information is displayed to the user of the invention.

Figure 23B:
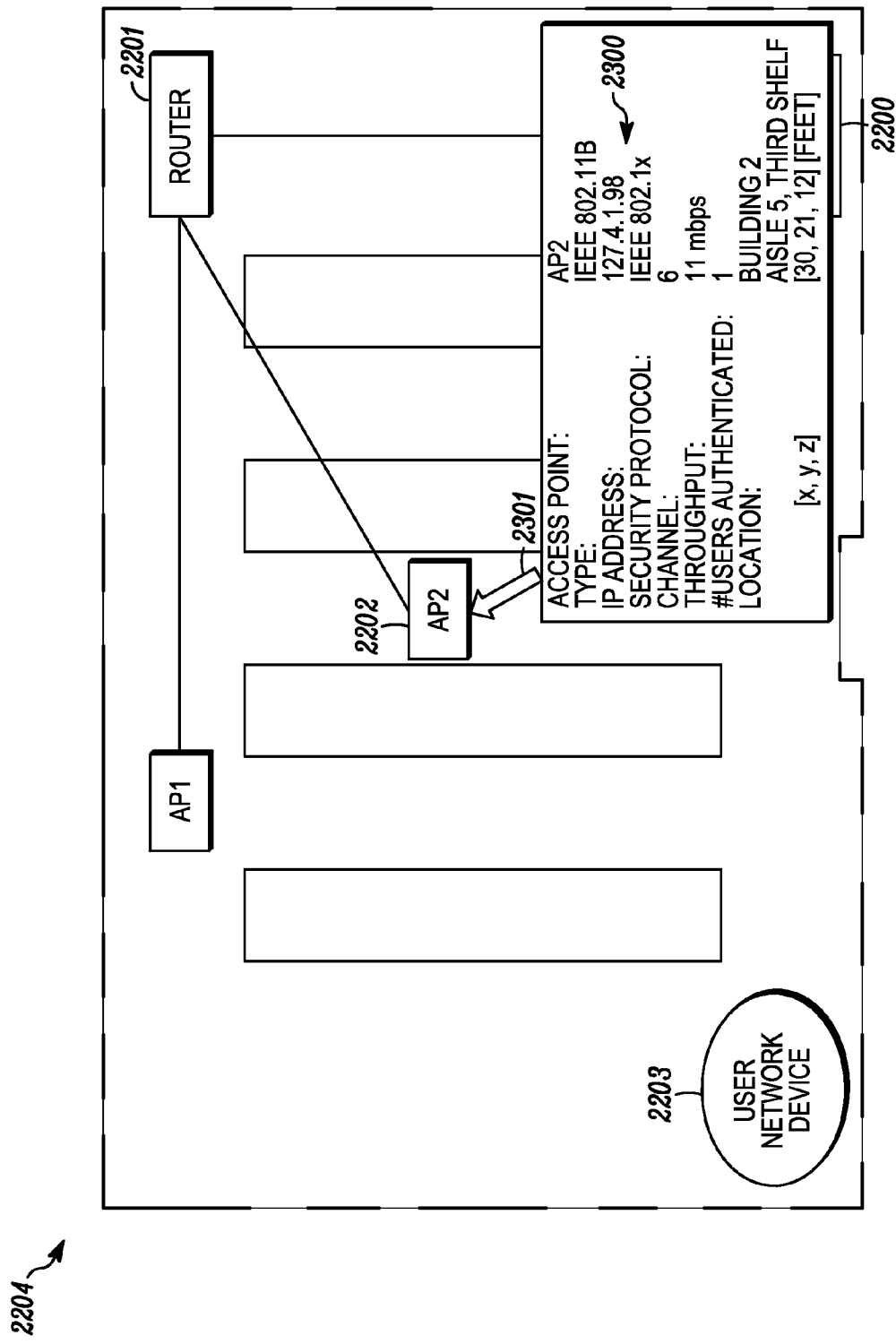

Referring to FIG. 23b, there is shown the WLAN of FIG. 22, which is representative of a display provided to a user by the invention after providing data requested from the query dialog similar to that shown in FIG. 23a. Based on the information inputted by a user to the invention, the user of the invention is able to gain information from the network. As the user of the present invention passes the mouse cursor or other computer pointing device 2301 over a network device 2202, the present invention determines the association between the graphical icon of the network device 2202 selected by the user with the actual physical device located within the warehouse 2204. Once this association has been made, the present invention establishes a communication link with the physical hardware device using the pre-defined communication method and/or unique device identifier and described above. Once a communication link has been established, the present invention can query the network device for whatever type of information or heuristics the user desires. As shown in FIG. 23, specific performance information is displayed to the user in the form of a tooltip 2300. The tooltip 2300 displays information such as current number of current network users, the security protocol in use, channel settings, transit power settings, and other performance information.

Any other types of information capable of being measured, displayed, or stored by the network device can be displayed in a similar fashion. This includes, but is not limited to: price, part number, manufacturer, serial number, weight, volume, quantity, item description, bar code, origination location, destination location, product vendor, expiration date, rework data, customer contact information, shipping information, dates and times, maintenance history, warranty history, current status, purchase history, position, number of users, each authenticated user's status (such as position, quality of service, bandwidth allocation, service type, security settings, and any other qualitative or quantifiable user parameter), rogue or erroneous users or devices and their status (such as position and perceived operating characteristics), measurable or quantifiable data values (such as packet error rate, packet throughput, packet latency, bit error rate, signal-to-noise ratio (SNR), carrier-to-noise ratio (CNR), signal strength or received signal strength intensity (RSSI), rms delay spread, distortion, bit error rate (BER), loading, capacity, frame error rate (FER), frame resolution per second, traffic, packet jitter, interference levels, power levels, quality of service (QoS) for one or more users, data throughput, outage statistics, failure rates, as well as sensory data such as temperature, pressure, flow rate, environmental conditions, power consumption and fluctuation, production levels, storage levels, cycle time, stress levels, light intensity, air or fluid quality, radiation levels, or any other quantitative measurable value), or any other information item that may be represented as a numeric or textual data field and processed for display on a display of some form.

Figure 23C:
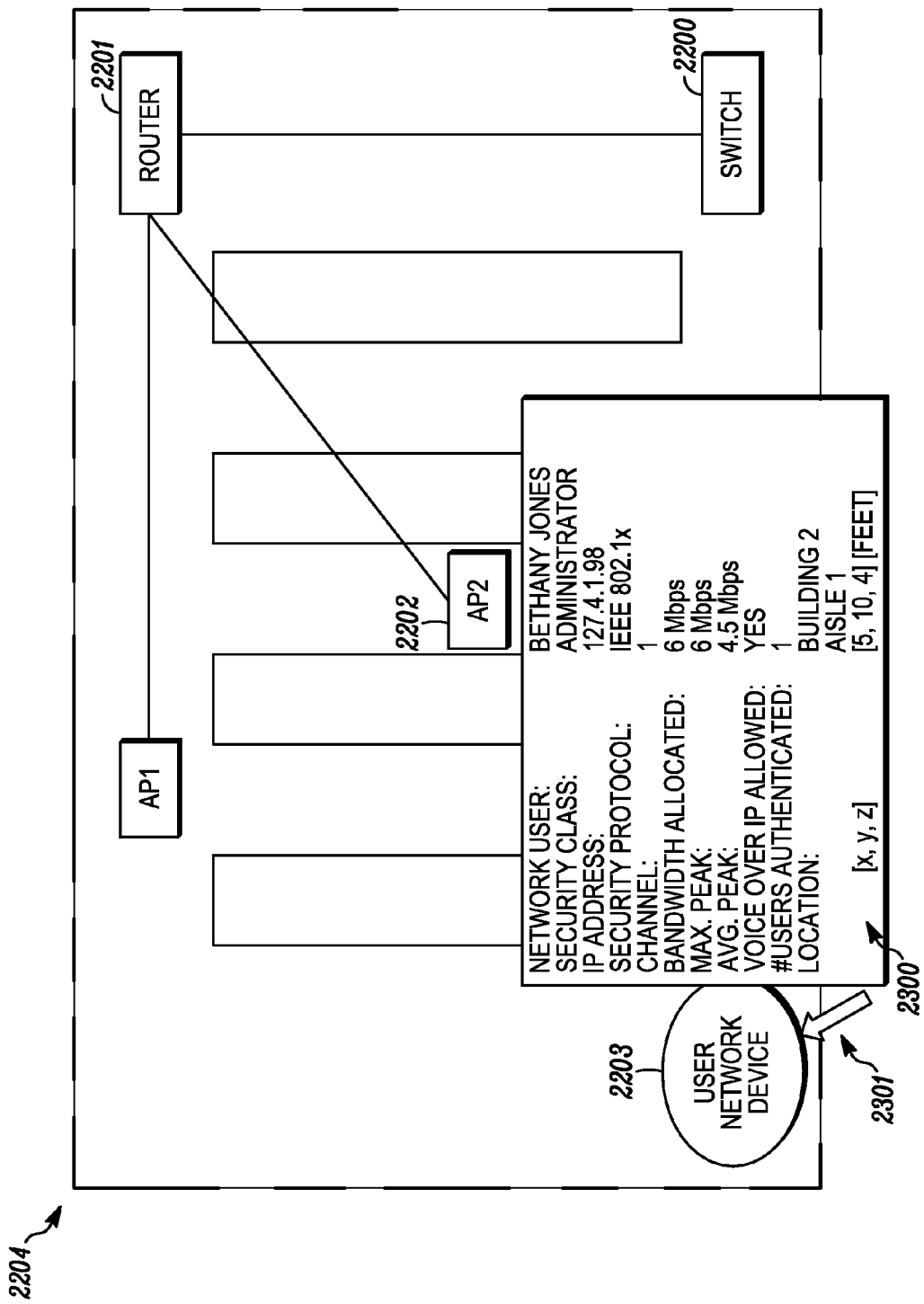
FIG. 23c shows the WLAN of FIG. 22 with a query dialog similar to that shown in FIG. 23a, but which is different from that shown in FIG. 23b.

Referring to FIG. 23c, there is shown the WLAN of FIG. 22, which is representative of a display provided to a user by the invention after providing data requested from the query dialog similar to that shown in FIG. 23a. Based on the information inputted by a user to the invention, the user of the invention is able to gain information from the network. As the user of the present invention passes the mouse cursor or other computer pointing device 2301 over a mobile user network device 2203, the present invention determines the association between the graphical icon of the mobile user network device 2203 selected by the user with the actual physical device located within the warehouse 2204. Once this association has been made, the present invention establishes a communication link with the network user's device using the pre-defined communication method and/or unique device identifier and described above. Once a communication link has been established, the present invention can query the network device for whatever type of information or heuristics the user desires. As shown in FIG. 23, specific performance information is displayed to the user in the form of a tooltip 2300. The tooltip 2300 displays information such as current number of current network users, the security protocol in use, channel settings, transmit power settings, and other performance information.

Figure 24:
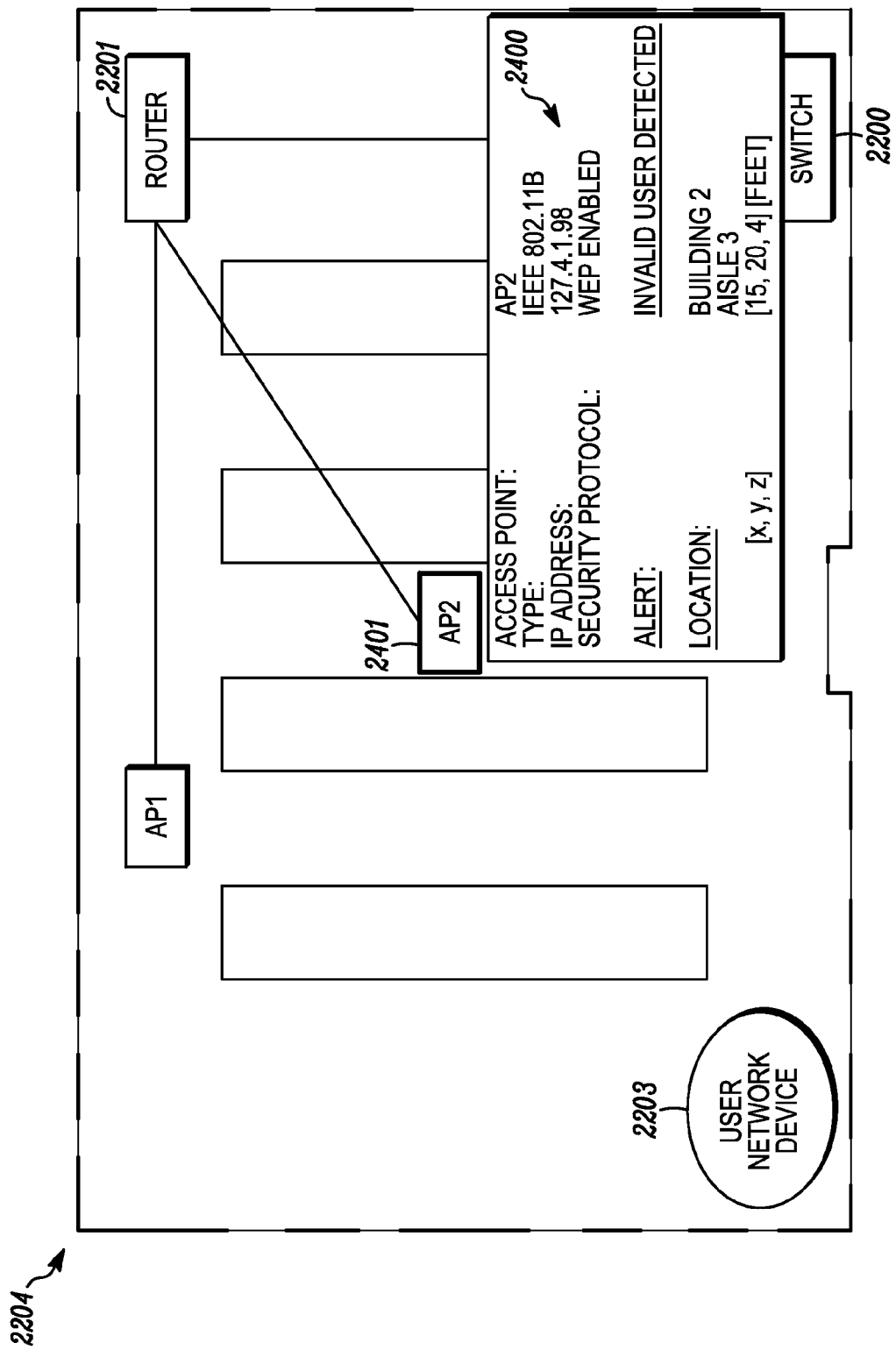
FIG. 24 shows an example of an alert being displayed to a user.

The present invention can also respond to initiated communication from any network device or user. For example, if a network device receives an erroneous user authentication request, the network device may be configured to automatically generate a message to the present invention. In this case, an alert may be displayed to the user of the present invention as shown in FIG. 24, whereby the notifying device 2401 is identified within the site-specific context of the facility in which it resides along with the alert message 2400 it has sent. Other types of alert messages can take the from of a notification of any change in one or more of the following: price, part number, manufacturer, serial number, weight, volume, quantity, item description, bar code, customer contact information, shipping information, dates and times, maintenance history, warranty history, current status, purchase history, position, number of users, each authenticated user's status (such as position, quality of service, bandwidth allocation, service type, security settings, and any other qualitative or quantifiable user parameter), initiated network connections, rogue or erroneous users or devices and their status (such as position and perceived operating characteristics), measurable or quantifiable data values (such as packet error rate, packet throughput, packet latency, bit error rate, signal-to-noise ratio (SNR), carrier-to-noise ratio (CNR), signal strength or received signal strength intensity (RSSI), rms delay spread, distortion, bit error rate (BER), loading, capacity, frame error rate (FER), frame resolution per second, traffic, packet jitter, interference levels, power levels, quality of service (QoS) for one or more users, data throughput, outage statistics, failure rates, as well as sensory data such as temperature, pressure, flow rate, environmental conditions, power consumption and fluctuation, production levels, storage levels, cycle time, stress levels, light intensity, air or fluid quality, radiation levels, or any other quantifiable measurable value), or any other information item that may be represented as a numeric or textual data field and displayed on a computer display of some form.

The present invention enables the monitoring and interaction of both the physical, fixed network infrastructure and the mobile or fixed users whose communication devices are connected to the network. Finally, it should also be clear that although a wireless LAN network is depicted in FIGS. 23 and 24 that any form of communication network satisfies the requirements of the present invention and may be monitored and interacted with in a similar fashion by the present invention. The preferred embodiment of the present invention provides the means to actively monitor network activity by continually and regularly polling network devices through the aforementioned communication links established for each device in order to regularly retrieve one or more data values. Thorough this process, the present invention can collect desired network information of the aforementioned types regularly and routinely for archival or reporting purposes. In this case, it is not necessary that the information displayed to the user as detailed in FIGS. 23 and 24 is real-time data, but may instead represent historical, aggregated or non-real time information reported by or received from the relevant network device or device groups at a specific point in time.

The preferred embodiment of the present invention has the bulk of its control software implemented and executing on a computer server or personal computer, although the bulk of control software could be implemented alternatively on a network controller/network switch, or integrated with such controller or switch, or even embedded in software or firmware in one or more devices, and further may be implemented in part of in bulk on other devices, including base stations, card readers, or repeaters, or handheld portable devices, wherein at one or more of such devices there is the ability to provide a display for a user to visualize data, and to allow a user to enter data using a data entry device (such as keyboard or voice recognition method) and/or a pointing device, such as a mouse. A display of some form, such as a computer monitor, LCD panel, LED display, or some other similar device (or alternatively speech synthesis) provides the means of generating feedback to the user. In addition, a computerized storage mechanism is used in the preferred embodiment to archive information and to aid in adaptive processing and predictive computations for proper control of the network hardware, including end user devices. One skilled in the art could easily see other variant embodiments could exist within the spirit of this invention.

This unprecedented correlation between the physical network layout, physical objects used within the network, the logical network layout, the actual network hardware, the data storage, retrieval, monitoring, editing system, and the display capabilities combined with the network provisioning and position location data provided for the devices used within the network and the hardware used for network applications presents a dramatic improvement over prior art. The present invention provides the valuable capabilities for network administrators to monitor, manage, and maintain communication networks and to retrieve, send, and process location-specific and network-specific communications and control data of all types by providing instant, site-specific correlation between network activity and operating conditions present in the network and the physical location of the events (such as messages, alarms, location of particular products, pallets, or security intrusions), themselves, while simultaneously being able to retrieve, write, and process information pertaining to end-user devices, and to control the end-user's network experience, security capabilities, and information in hardware devices throughout the network.

The present invention allows for scripted, automated performance and security checks across the network. By sequentially polling, on a regular, user-controllable basis, each network device to retrieve performance parameters, bandwidth provisioning, user traffic conditions, user priority levels, security settings, and other pertinent network operating parameters, the present invention enables the creation of archived performance data that is correlated to the site-specific location of each network device. This information may be stored, retrieved, and displayed for reporting purposes. For example, the present invention can display the access point or antenna where a specific user was authenticated throughout a monitored time period, or from what locations a particular high priority user initiated phone calls throughout a monitored time period.

Figure 25:
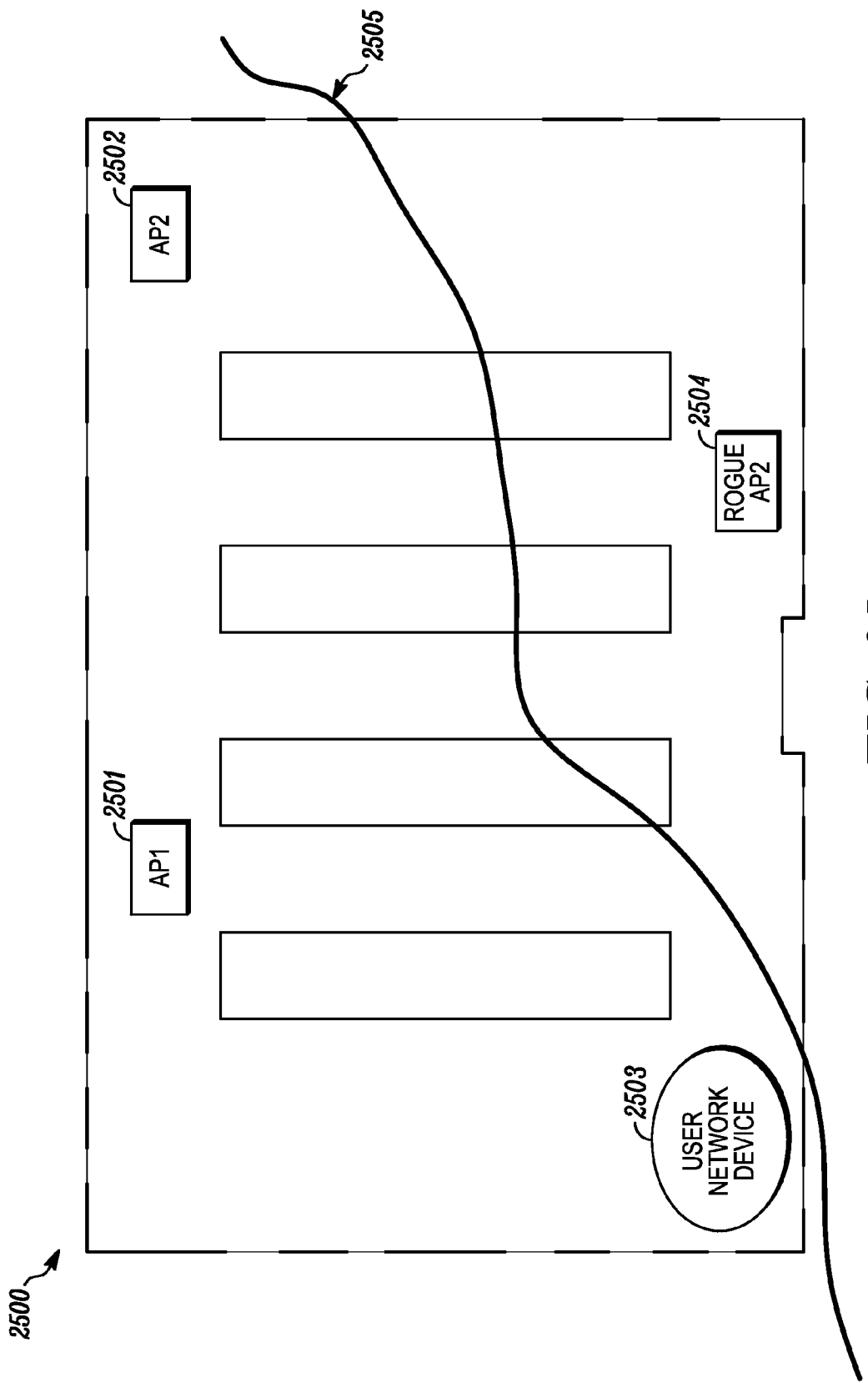
FIG. 25 shows a representation of a warehouse having two wireless LAN access points.

By monitoring the activity of network user devices using the above techniques, the present invention can provide a degree of network security that is not possible with other existing technologies. A common security issue with wireless LANs, for example, is known as the man-in-the-middle problem. Referring to FIG. 25, a warehouse 2500 is depicted wherein two wireless LAN access points 2501, 2502 are positioned. A network user 2503 is roaming the facility. There is also a rogue access point 2504 that is not part of the valid network infrastructure and represents a security threat to the network. The limits of the service area for access points 2501 and 2502 are indicated by the boundary contour 2505. The boundary contour 2505 represents the maximum distance at which the access points 2501 and 2502 can detect communication signals. Note that the rogue access point 2504 is outside of the boundary 2505. This indicates that neither access point 2501 nor access point 2502 can detect the existence of the rogue access point 2504. However, the network user's device 2503 can detect both the rogue access point 2504 and the valid access points 2501 and 2502.

The present invention, when instructed to monitor the activity of the user's network device 2503, would receive an indication in the form of an alert message from the user's network device 2503 that would be processed, stored, and displayed in a manner similar to FIG. 24, notifying the IT manager or network security personnel that an intruder access point or user had been detected. In addition, alarms could be set, pages sent to IT personnel, or alert messages sent, as described in the above patents and patent applications set forth in the cross-reference to related applications section, and are hereby incorporated by reference. If the user's network device 2503 has been instructed by the invention to automatically report any such intrusions by rogue access points or other security problems, the user's device 2503 may automatically send an alert message to the present invention, at which point the alert message is processed, stored, and displayed as described above. Furthermore, using the previously described processing, the invention would take proper corrective action such as decreasing power of the rogue user (if possible), initiating new security procedures for the existing users, shutting down appropriate processes and implementing procedures to avoid a security breach, and to shut down the resource allocation of the rogue user in the network, reporting the rogue user to a clearing house or storage facility to help police proper usage, etc. Without this degree of site-specific monitoring and control, the network administrator would have no method of automatically detecting the existence of the rogue access point 2504.

As mentioned above, once a rogue access point or other network intruder is detected, the present invention can automatically reconfigure network resources to effectively deal with or minimize the threat from the intruder. For example, in the situation presented in FIG. 25, the present invention upon being alerted to the presence of the rogue access point 2504 by the user's network device 2503 could instruct that the user's network device 2503 provide detailed information about the detected rogue access point 2504. This detailed information may include but is not limited to: access point name, IP address, channel settings, technology, power levels, received signal strength levels, or any other measurable value pertaining to the performance or configuration of the rogue network device. With this information, the present invention can automatically send reconfiguration instructions to other network devices, such as the access points 2501 and 2502 shown in FIG. 25, in order to negate or minimize the negative effect of the rogue network device on the performance or security of current network users. For example, the present invention may instruct access points 2501 and 2502 to change their channel setting, transmit power levels, antenna orientation or pattern steering, increase their data encryption levels or user authentication requirements, or any other configurable operating parameter of the network devices. This enables the present invention to effectively automate the first response actions to any detected network intruder or problem.

Another common network security issue that the present invention may more easily resolve compared to prior art is the issue of a rogue network device mimicking a valid network device. For example, a rogue wireless LAN access point may present itself to network user devices as being a valid network access point, thus bypassing potential security alerts that may be otherwise generated. In short, for the situation presented in FIG. 25, if the rogue access point 2504 is configured to appear to be valid network access point, the user network device 2503 may not realize there is a security breach. The present invention provides the means to defend against this form of network attack as well. By regularly monitoring user network devices, the present invention can store an archived record of other network devices that the user network device interacts with. For example, in FIG. 25 if the user network device 2503 has been regularly monitored by the present invention, the present invention may have constructed a historical record that the user network device 2503 regularly and routinely interacts with the network via the access points 2501 and 2502. If the rogue access point 2504 presents itself to the user as a valid network access point but as a different access point than either 2501 or 2502, the present invention would detect that the user network device has detected a new network device and an alert message 2600 similar to that shown in FIG. 26 would be received from the user network device by the present invention, and the message would be processed, stored, and displayed. The network administrator could then intelligently determine if the detected network device 2504 was indeed a valid device or not.

The inverse of the aforementioned security problem occurs when a network intruder attempts to mimic a valid network user in order to infiltrate the network. This is very similar to the situation of a rogue access point as depicted in FIG. 25, but instead takes the form of a rogue user. This situation can also be identified and dealt with by the present invention. This situation, if the present invention is monitoring traffic over the network and correlating user communication with which particular network device or network devices routinely interact with particular users, any change in the use pattern of a network user can be detected and correlated with the site-specific model. For example, referring to FIG. 27, if a rogue user 2700 attempts to connect to the network and interacts with access point 2701, the present invention can refer to the historical registration, user authentication, and/or traffic flow records related to the access point 2701 and determine if the rogue user 27700 has routinely connected to the network using that particular access point. If not, an alert message 2702 can be displayed as shown in FIG. 27.

Figure 26:
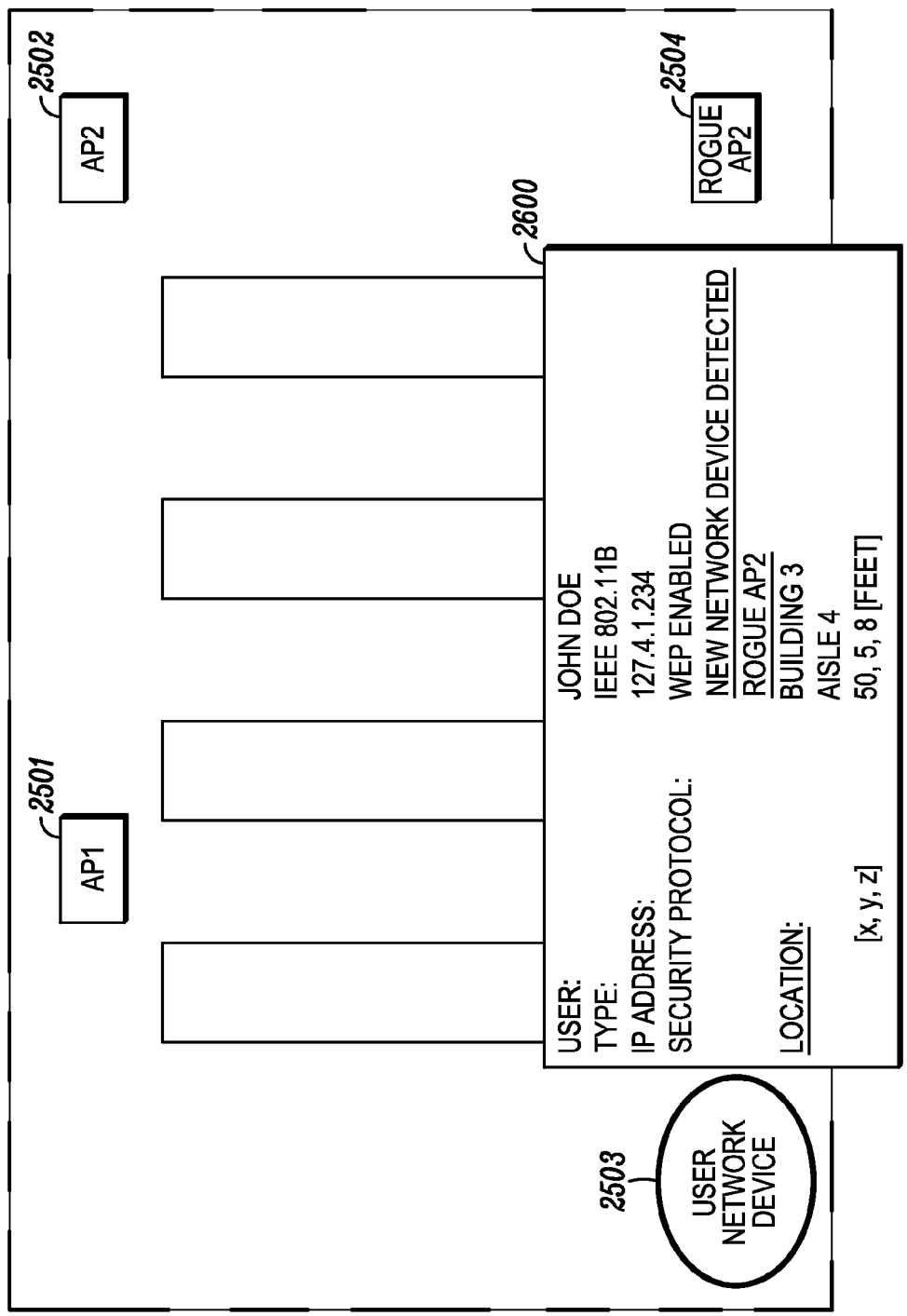
FIG. 26 shows an alert being disnlayed for a warehouse.
Figure 27:
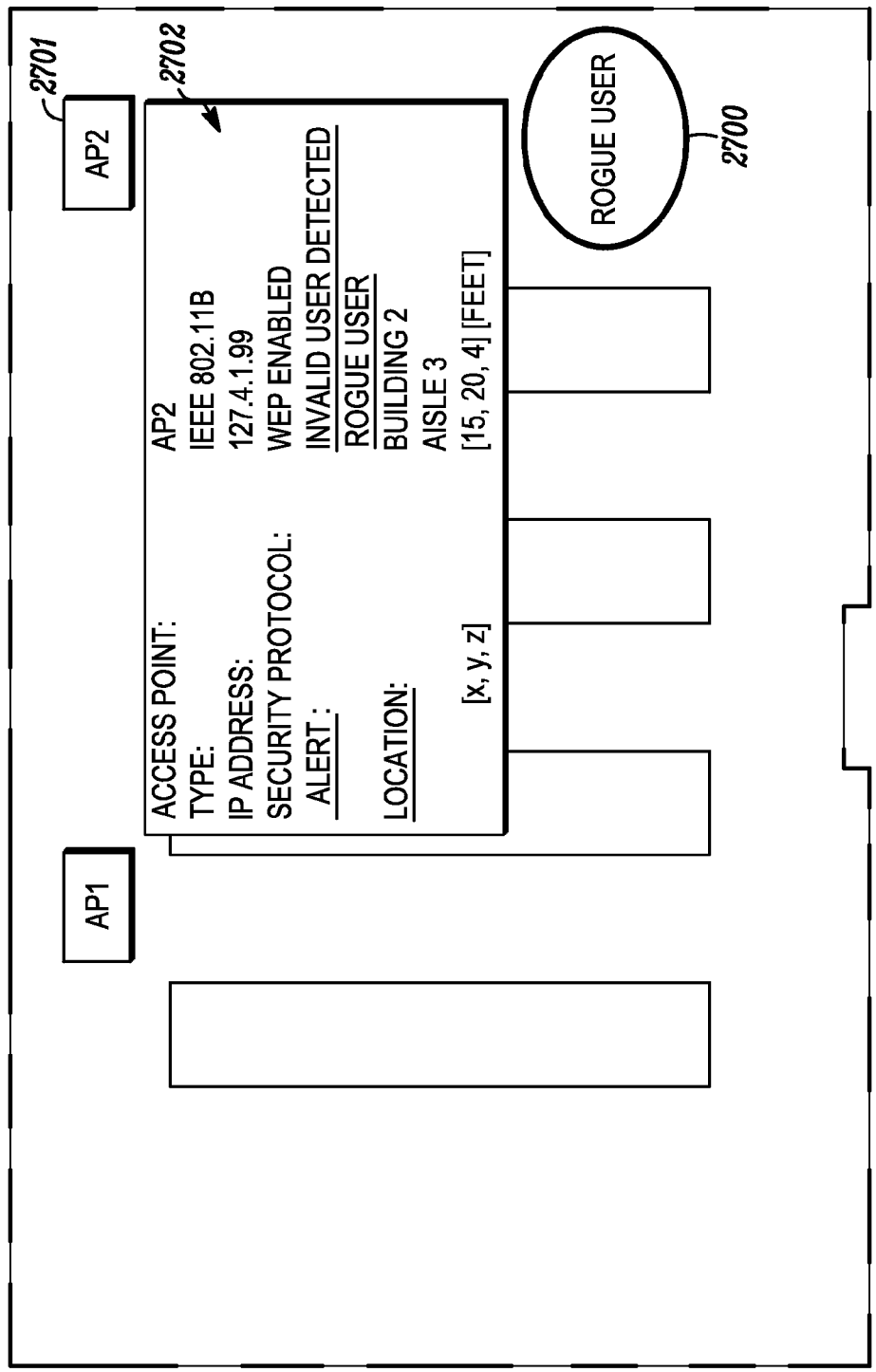
FIG. 27 shows a rogue user alert being displayed for a warehouse.

It should be clear that although the technology and network devices presented in FIG. 25, FIG. 26, and FIG. 27 were related to wireless local area networks, any communication technology or network is also suitable for use with the present invention to achieve these results. In addition, for public WLAN applications, it is clear that certain user applications, such as peer-to-peer traffic types that are hostile to general IP traffic, may be unwanted due to bandwidth hogging or interference generation in a limited bandwidth network at a public location (e.g. within a restaurant that uses only a single T-1 line to serve all of its public WLAN users in a building). The present invention could detect prohibited or undesired IP addresses, application addresses, web site addresses, and so on, from the traffic data passed through the access points or network controller, and could automatically limit bandwidth resources or restrict access to such user data. Statistics of such usage can be stored and displayed using methods described here and known to those skilled in the art.

Figure 28:
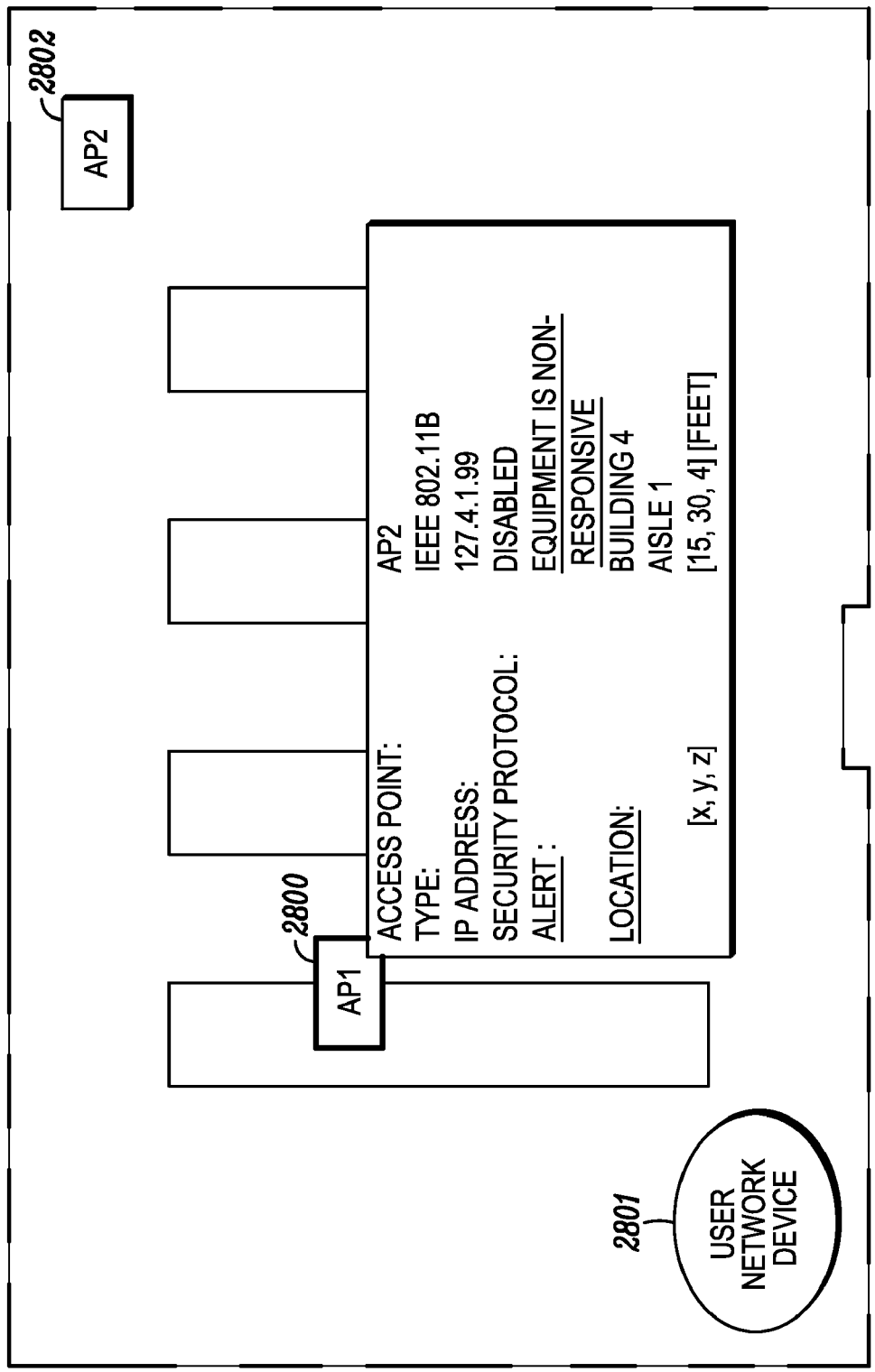
FIG. 28 shows the identification of a malfunctioning device being displayed for a warehouse.

By regularly monitoring network activity and network equipment performance, the present invention can also assist in identification of faulty or disabled equipment, and immediately indicate the exact network device in question. For example, in FIG. 28 the invention has determined that a network device 2800 is malfunctioning. The location of the device is indicated on the model of the facility along with an indication of what the problem may be. This information could be downloaded to and displayed on handheld network devices used by maintenance or security personnel. Once the problem has been resolved, information about the incident along with any notes entered by the maintenance or security personnel can be logged within the historical records for the network device that are maintained by the invention.

It should be clear to one skilled in the art that although FIGS. 23-28 depict tooltips being used to convey information in the present invention, any other form of information display or feedback could also be displayed, such as graphs, charts, images, video, audio, or any other type of aural or visual media could be used. It should also be clear that although particular network devices were identified in FIGS. 23-28, any network hardware device or network client device, whether mobile or fixed, could also be the network device in question.

Figure 29:
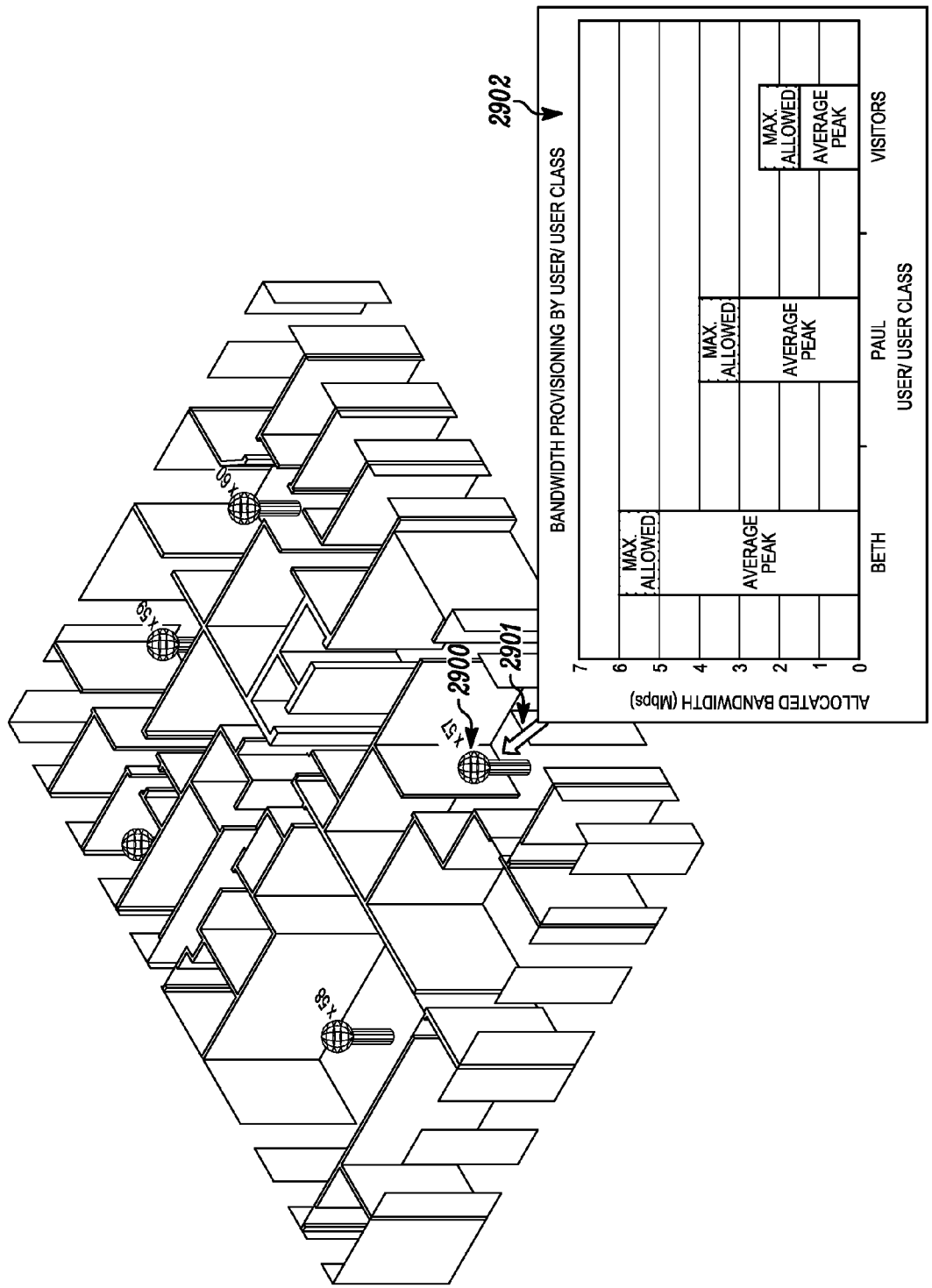
FIG. 29 shows a 3D representation of a single floor of a building in which a communications network is installed.

For example, referring to FIG. 29, there is shown a 3-D representation of a single floor of a particular building in which a wireless data communications network is installed and modeled within the present invention. The user has selected a particular wireless network device 2900 using the mouse cursor 2901 and selected to be shown the current bandwidth provisioning of all currently active clients. The present invention queries the selected network device 2900, retrieves the desired information, and displays it in the form of a graph window 2902. The graph window 2902 shows that there are currently two active users—Beth and Paul— and an active class of user—Visitors—connected through the selected network device, and shows the relative bandwidth usage of each user. In this particular case, the graph 2902 shows both the allocated maximum bandwidth each user has been granted and the average peak bandwidth the user is using. For example, referring to the graph 2902, the user Beth has been allocated 6 Mbps, but her average peak usage is 5 Mbps; the user Paul has been allocated 4 Mbps but his average peak usage is 3 Mbps; and the user class Visitors has been allocated 2.5 Mbps and is currently using his an average peak of 1.5 Mbps. It is clear that average, peak, busy hour, and aggregated data and traffic use, over minutes, hours, days, and months, could also be stored and displayed. Such data could also be used for billing or service plan reporting and audit purposes. The processing included in the invention could also compute and generate minutes of use data, thus enabling the creation and storage and emailing of billing and traffic reports of individual and groups of users, as well as aggregated traffic carried for all users throughout the network over periods of time.

Use of the Invention for Voice over IP Networks

Figure 30:
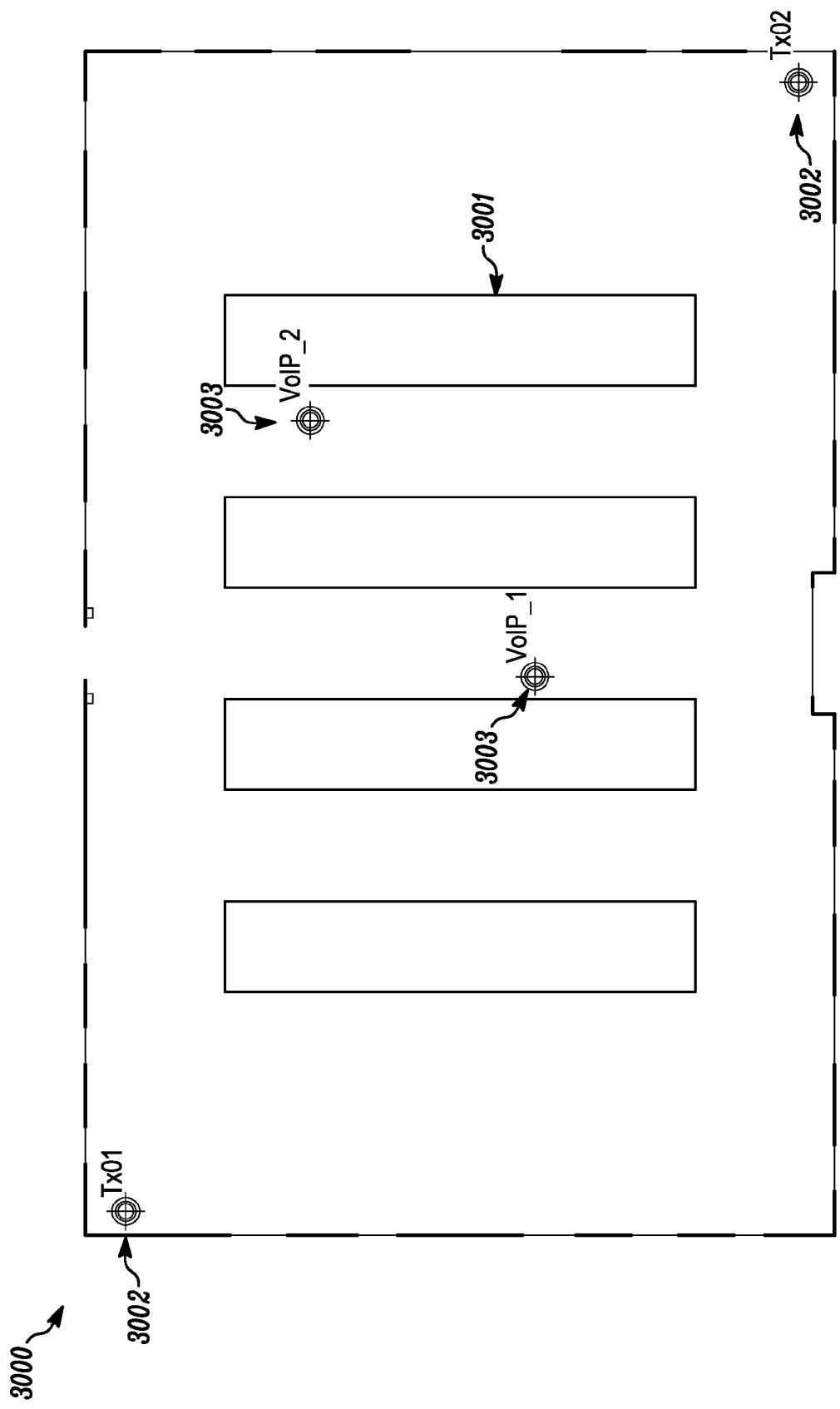
FIG. 30 shows an example representation of a wireless network within a warehouse facility.

Referring to FIG. 30, there is shown a typical wireless network installed within a warehouse facility. Although a warehouse 3000 is used in this example, any physical environment such as a room, building floor, building, campus of buildings, city, or any outdoor environment could be represented within the present invention. A single floor of a warehouse facility is shown for simplicity. Within the warehouse 3000 are multiple shelves 3001, walls, doors, windows, machinery, and other obstructions that may impact network performance. A wireless network is installed within the warehouse whose antennas 3002 are positioned at various places within and around the warehouse. Note that the antennas 3002 could represent any form of omnidirectional, directional, array, or radiating cable antennas, transceivers or base stations with co-located antennas, or some form self-contained transceiver or base station unit with a built-in antenna. In addition, the wireless network antennas 3002 may be omnidirectional, directional, or array antennas attached via a distribution cable of some type, whether coaxial, baseband, or fiber optic cable, to a transceiver physically located elsewhere. However, the wireless network antennas 3002 may take the form of self-contained repeater devices, which receive wireless communication signals and rebroadcast the same, modified, or modulated wireless signal. In addition, the wireless network antennas 3002 may be mobile; for example, the wireless network antennas 3002 may be self-contained transceivers attached to a moving vehicle, conveyor belt, or connected to or embedded within a handheld device. Note that the wireless network antennas 3002 may take the form of self-contained transceivers, where the antenna is co-located with and inseparable from the transceiver itself.

In addition, numerous wireless VoIP devices 3003 are located throughout the facility, and may be fixed in place (e.g., a desk phone, wall phone, pay phone, etc.) or mobile (e.g., a cellular phone, handheld PDA, etc.). The client VoIP devices 3003 share a common technology and communication protocol with the wireless network antennas 3002, enabling a wireless communication link to be established between the wireless network 3002 and the wireless VoIP devices 3003. The form of this communication link will be specific to the type of technology and communication protocol that is shared between the wireless VoIP devices 3003 and the wireless network antennas 3002. For example, a wireless network based on the IEEE 802.11 g protocol will obviously use the IEEE 802.11g protocol as the means by which the wireless network antennas 3002 and the wireless VoIP devices 3003 communicate.

A common technique suggested to regulate traffic flow on a wireless data network is known as bandwidth shaping. Sometimes referred to as bandwidth provisioning or bandwidth control, bandwidth shaping is the process of allocating a specific block of the overall bandwidth of the channel to an individual user. Since the size of the bandwidth block relates directly to the maximum throughput achievable by the user for a given communication protocol, bandwidth shaping provides the means for both guaranteeing each user sufficient bandwidth to carry out their desired communication and being able to maintain the network at an overall performance level by simply disallowing access to users when sufficient bandwidth does not exist for their application. This type of functionality is beneficial to VoIP as each voice conversation carried by the network will effectively use the same amount of bandwidth; that is, there is little variability between the bandwidth needs of different voice conversations.

Bandwidth shaping also inherently provides for setting what are known as user priority levels. That is, certain users can be given higher priority access to network bandwidth than others. This can be used to guarantee that certain users will always be able to send and receive data at certain performance levels. As an example, in a VoIP network, a user dialing for emergency services may always be granted a top priority level. If other users of lower priority rating are communicating across the network, their connections may be terminated or, at best, suffer reduced bandwidth in order to accommodate the higher priority user's bandwidth needs. For example, in a non-VoIP situation, a hospital may have the need to send time critical computer files upon request from one place to another via the network. Such a request may be given the top priority level, in which case all other data network users will see their performance levels reduced during time periods with the high priority files are being transferred. This, again, insures that the high priority transactions are completed successfully and in a timely manner.

The present invention maintains a site-specific model of both the wireless network and the physical environment in which it is installed. FIG. 30, for example, provides a screen shot from the present invention. In addition, the present invention provides powerful functionality for designing and deploying the wireless network using criteria such as equipment cost, interference levels, coverage region, network capacity and loading, and user priority levels. A critical consideration when dealing with bandwidth shaping is the ability of the mobile user to roam. For example, on a wireless LAN if a user with highest priority level roams from one part of a facility to another while communicating over the WLAN, the communication may be picked up and handled by multiple access points, one at a time. That is, as the high priority user crosses a service boundary from one access point to another, his or her communicational link is handed off between the two access points in question. This is problematic if such a handoff results in other users currently being managed by the second access point must be blocked from the network in order to make bandwidth availability for the higher priority user. In some cases this is unavoidable; however, being able to minimize this sort of forced blocking effect is highly desirable. There is also potentially a problem with being able to accommodate a high priority user roaming into an already crowded service area. If the bandwidth shaping and provisioning does not occur until after the high priority user is already within the service area and in the middle of a handoff, there is a danger that the high priority user may suffer a lost connection or at least a drop in performance until the bandwidth shaping can be updated. The present invention provides the facility for managing bandwidth shaping issues by providing a site-specific context in which to make such decisions.

Figure 31:
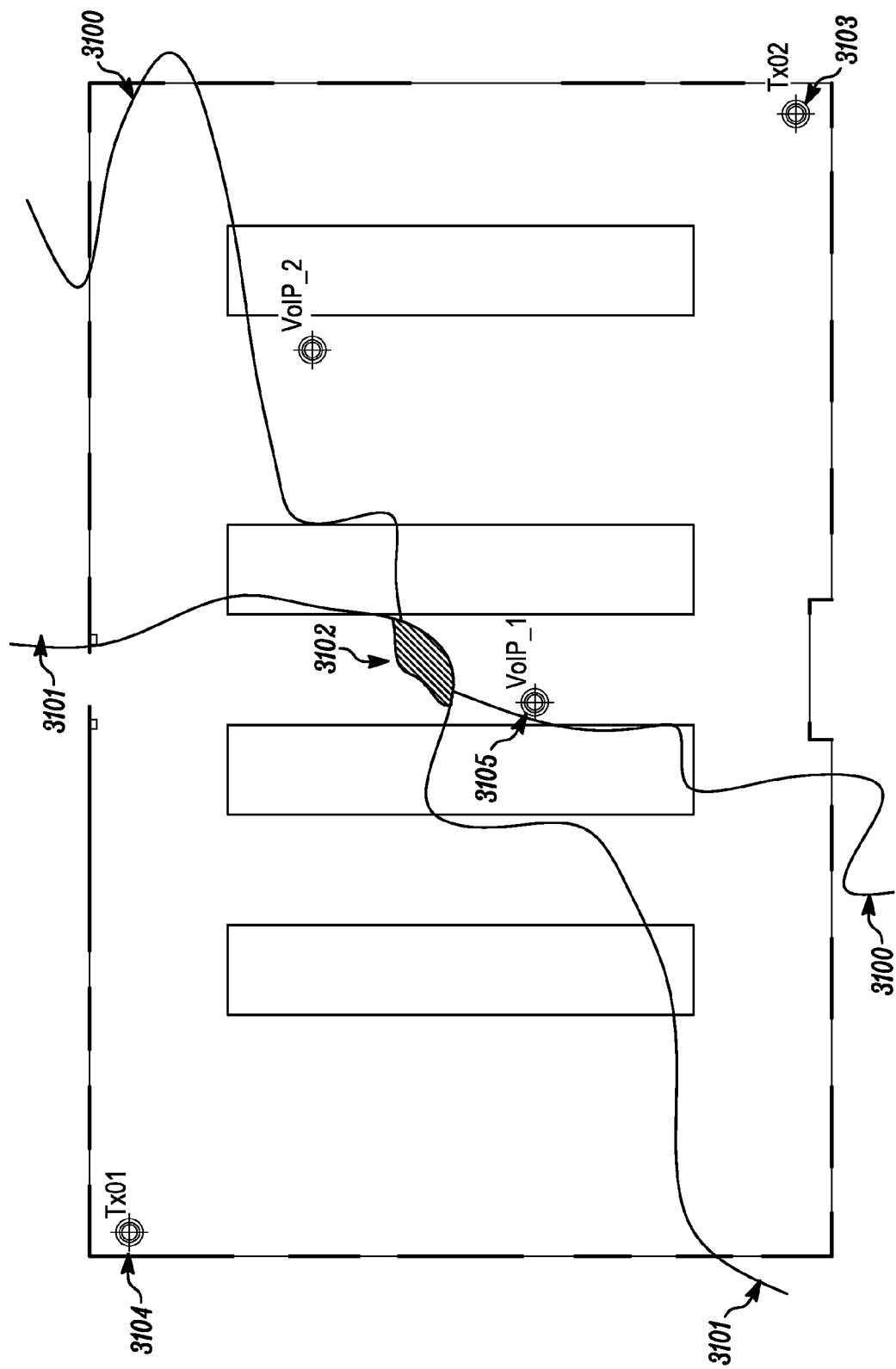
FIG. 31 shows the network of FIG. 30 together with coverage contours.

FIG. 31 provides the same network as shown in FIG. 30 but with a predicted coverage contours 3100, 3101 shown for each of the two antennas 3002. Referring to FIG. 31, there are shown as two wireless network transceivers 3103, 3104. The service areas of each of the transceivers 3103, 3104 have been predicted by the invention and are displayed as fluctuating contours in FIG. 31 as well. The service area of a given wireless network transceiver, for the purposes of FIG. 31, is the boundary at which a mobile wireless device can successfully connect to the wireless network transceiver. Outside of a given wireless network transceiver service area, a mobile wireless device cannot successfully connect to the transceiver. The service areas of the two wireless network transceivers 3100, 3104 intersect and overlap in one area 3102. Within the overlapping area 3102, a mobile wireless device could connect to either of the wireless network transceivers 3103, 3104 in FIG. 31.

With the information in FIG. 31, the present invention can more efficiently manage the bandwidth shaping process of the wireless network shown in FIG. 31. With the present invention monitoring and controlling the configurational of the wireless network resources in real-time, the invention can regulate when lower priority users must be blocked from the network to make room for higher priority users. This is due to the ability of the present invention to have site-specific knowledge of the location, area, and size of the overlapping service areas for all of the wireless network transceivers in the environment in question. By using this information, the invention can more efficiently determine when a mobile client should shift from one wireless transceiver to another in terms of which transceiver is managing the communication with the mobile client, and can also more efficiently plan bandwidth shaping on the neighboring wireless transceivers. For instance, if a top priority mobile client is roaming a facility and approaching the known boundary of the service limit for its current wireless transceiver, the present invention can detect this by correlating the relative location of the mobile client with the various service areas of the surrounding wireless transceivers. If the top priority mobile client is on the verge of venturing from one service area to another, the present invention can take steps to insure that the proper bandwidth is available for the mobile client before he or she actually ventures into the area. This ensures a more reliable connection for the mobile client, as the proper bandwidth provisioning is already established for the client when he or she arrives, rather than having to instantly free up bandwidth after the transition has already occurred.

For example, referring to FIG. 31, consider the mobile VoIP client named "VoIP_1" 3105. If VoIP_1 is a high priority user, his or her phone conversations take priority over other lower priority users on the network. If VoIP_1 initiates phone conversation while inside the service area 3100 of wireless transceiver 3103, wireless transceiver 3103 must allocate sufficient bandwidth to meet VoIP_1's needs. If VoIP_1 then roams into the small intersection area 3102 between the service areas of wireless transceivers 3103 and 3104, the present invention can detect, using its ability to monitor activity on the wireless network, which now both wireless transceivers 303 and 304 can communicate with VoIP_1. At this point, the conversation initiated by VoIP_1 is still being handled by wireless transceiver 3103. However, the present invention, thorough its powerful prediction engine, is aware of the size and basic shape of the intersecting service area 3102 as shown in FIG. 31. The invention can then determine that VoIP_1 may be rapidly approaching the limit of the service area for wireless transceiver 3103 and must very soon handoff to wireless transceiver 3104. In preparation for that forthcoming handoff, the invention may optionally disallow new traffic on wireless transceiver 3104 in order to insure VoIP_1 has sufficient bandwidth, or may need to take steps in advance to block currently communicating users in order to free up bandwidth in anticipation of VoIP_1's impending handoff. Without this functionality inherent in the present invention, the wireless network cannot take pre-emptive steps to avert potential loss of service to VoIP_1.

Consider a second scenario, identical to the above, in which wireless transceiver 3104 can not accommodate VoIP_1's minimal bandwidth needs. For example, if wireless transceiver 3104 is already a maximum bandwidth allocation accommodating other users of equal priority level to VoIP_1. Without the site-specific knowledge and network control inherent in the present invention, VoIP_1 is doomed to drop his or her phone call as soon as they exit the service area for wireless transceiver 3103 and enter the service area for wireless transceiver 3104. However, the present invention will have prior knowledge of this impending (and unavoidable) event, and has the ability to notify VoIP_1 of this event. For example, the present invention could send a message to VoIP_1 notifying him or her that they will be unable to maintain the connection if they exit their current area. This notification may take the form of a textual message, beep or tone sent to their wireless device.

The actual situation that occurs in most real-world wireless networks is more complex than that presented in FIG. 31. Generally, there will be significant service overlaps between three, four, five, or more wireless transceivers, and there will also be multiple users with high priority levels roaming the facility. However, as the situation grows more complex, the ability of the invention to combine site-specific information with bandwidth shaping algorithms can improve the overall network performance. For example, consider the situation of two highest priority users roaming towards the same wireless transceiver service area from opposite directions. Without the site-specific knowledge of the wireless network topology and the intersecting service areas utilized by the present invention, the wireless network can take no action to prepare for this event.

The ability to correlate the site-specific network topology and service areas with the current loading of each wireless transceiver and the relative position of high priority users is a novel concept in the area of VoIP, bandwidth shaping, and wireless network management. The addition of precise user position location, through global positioning system (GPS) data or through some other position location algorithm, complements the present invention very well. Although the present invention has been designed without the need for precise user positioning as a requirement, one skilled in the art can easily see how a position location algorithm or technique could be incorporated into the present invention.

Application of the Invention for RF Tags

Figure 32:
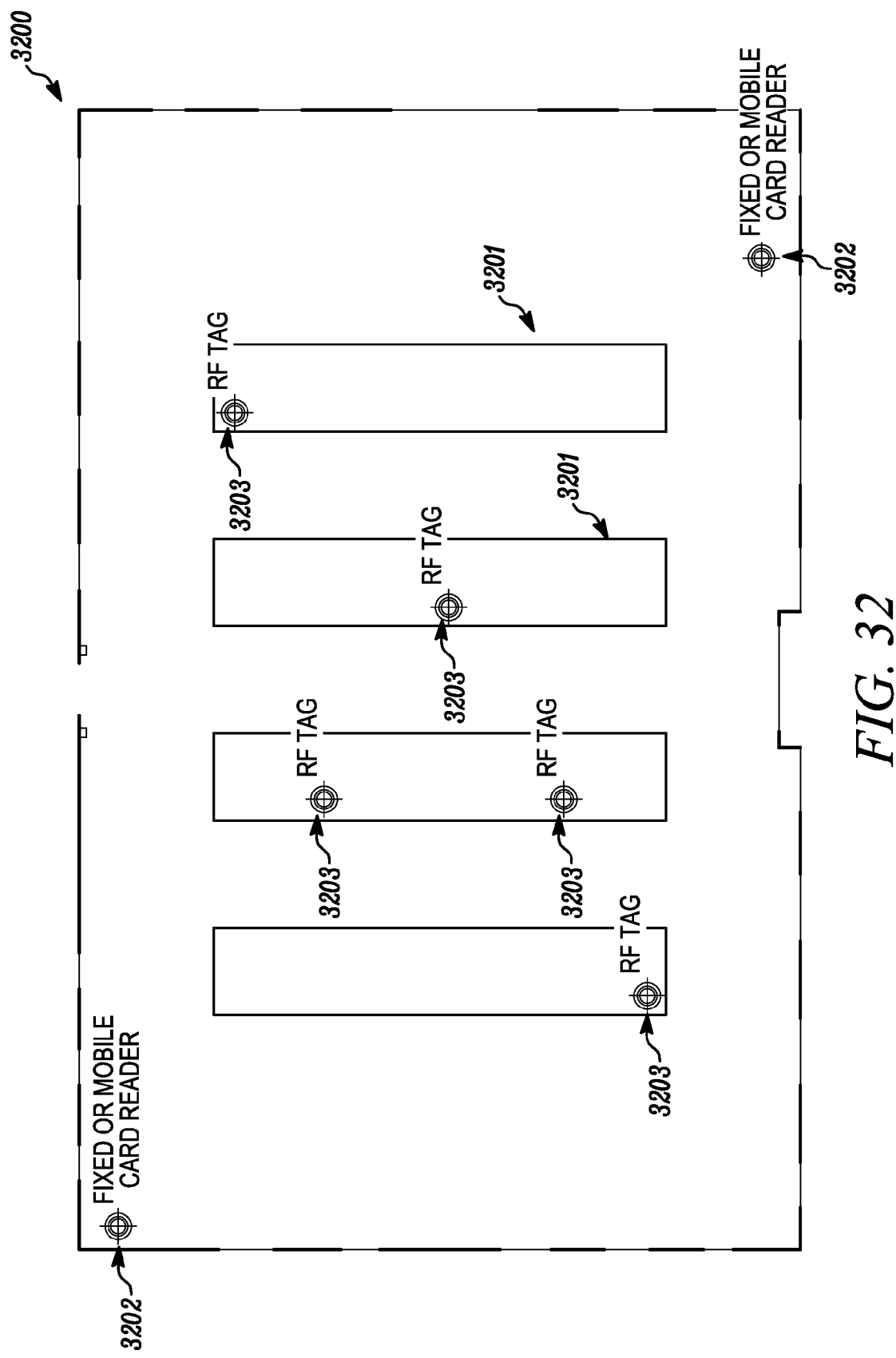
FIG. 32 shows a representation of a wireless network where RE Tags are included.

Referring to FIG. 32, there is shown a typical wireless network installed within a warehouse facility. Although a warehouse, 3200 is used in this example, any physical environment such as a room, building floor, building, campus of buildings, city, or any outdoor environ could be represented within the present invention. A single floor of a warehouse facility is shown for simplicity. Within the warehouse 3200 are multiple shelves 320*i* on which a variety of stock items may be placed. A wireless network is installed within the warehouse whose antennas 3202 are positioned at various places within and around the warehouse. Note that the antennas 3202 could represent any form of omnidirectional, directional, array, or radiating cable antennas, transceivers or base stations with co-located antennas, or some form of self-contained transceiver or base station unit with a built-in antenna. In addition, the wireless network antennas 3202 may be omnidirectional, directional, or array antennas attached via a distribution cable of some type, whether coaxial, baseband, or fiber optic cable, to a transceiver physically located elsewhere. However, the wireless network antennas 3202 may take the form of self-contained repeater devices, which receive wireless communication signals and rebroadcast the same, modified, or modulated wireless signal. In addition, the wireless network antennas 3202 may be mobile; for example, the wireless network antennas 3202 maybe self-contained transceivers attached to a moving vehicle, conveyor belt, or even embedded within a handheld device. Note that the wireless network antennas 3202 may take the form of self-contained transceivers, where the antenna is co-located with and inseparable from the transceiver itself.

In addition, numerous wireless hardware devices 3203 are positioned throughout the facility, and may be fixed in place (e.g., attached to a shelf, wall, immobile equipment, or other non-moving structure) or mobile (e.g., attached to a stock item, palette, moving vehicle, moving part of a machine or assembly line such as a conveyor belt, incorporated into a handheld device being used by stock, maintenance, or security personnel, incorporated into an identification badge worn by employees, or any other type of mobile or non-tethered platform). The wireless hardware devices 3203 may take the form of either passive or active radio frequency tags (RF tags), ultra-wideband (UWB) transceivers, Bluetooth transceivers, wireless local area network (WLAN) devices, cellular or personal communication system (PCS) transceivers, or other similar wireless networking technology. In the case of RF tags, a passive RF tag is differentiated from an active RF tag as follows. A passive RF tag does not actively originate and transmit wireless signals, whereas an active RF tag may actively originate and transmit signals.

The wireless hardware devices 3203 share a common technology and communication protocol with the wireless network 3202, enabling a wireless communication link to be established between the wireless network 3202 and the wireless devices 3203. The form of this communication link will be specific to the type of technology and communication protocol that is shared between the wireless hardware devices 3203 and the wireless network 3202. For example, a wireless network consisting of antennas 3202 and RF tags 3203 will utilize a communication protocol suitable for transmitting and receiving data specific to RF tags.

The wireless hardware devices 3203 contain—or have access to—additional information of use to an individual. As mentioned previously, this information may include but is not limited to: price, part number, serial number, manufacturer, weight, volume, quantity, item description, bar code, customer contact information, shipping information, dates and times, maintenance history, warranty history, purchase history, shipment history, current status, or any other informational field. This information may be contained within the wireless hardware device 3203 itself in some form of electronic media. Likewise, the wireless hardware device 3203 may be connected to an external information source such as a computer database in which the desired information is contained. The information source in question may be an active or passive monitoring device, such as a thermometer, stress gauge, flow meter, light sensor, scale, RF signal strength meter, throughput measurement device, or other quantitative or qualitative measuring device. In the latter case, the wireless hardware device 3203 may poll the information source for updated measurement readings, or the information source may be continually sending measurement readings to the wireless hardware device 3203.

The wireless hardware devices 3203 may also be attached to some form of computerized graphical display, such as a computer monitor, liquid crystal display (LCD), light emitting diode (LED) display, or other display device. If a display device is connected to the wireless hardware device 3203, the display device may be used to convey informative data visually to an onlooker. The type and form of the displayed data will be limited by the information accessible to and known to the wireless hardware device 3203 and the capabilities of the display device itself. However, commonly displayed information may include cost, manufacturer name, item name, part number, serial number, a bar code, status, or a raster or vector graphical image. Other types of displayed information are certainly possible, and one skilled in the art could see how other variant information types could be displayed within the context of this invention.

Figure 33:
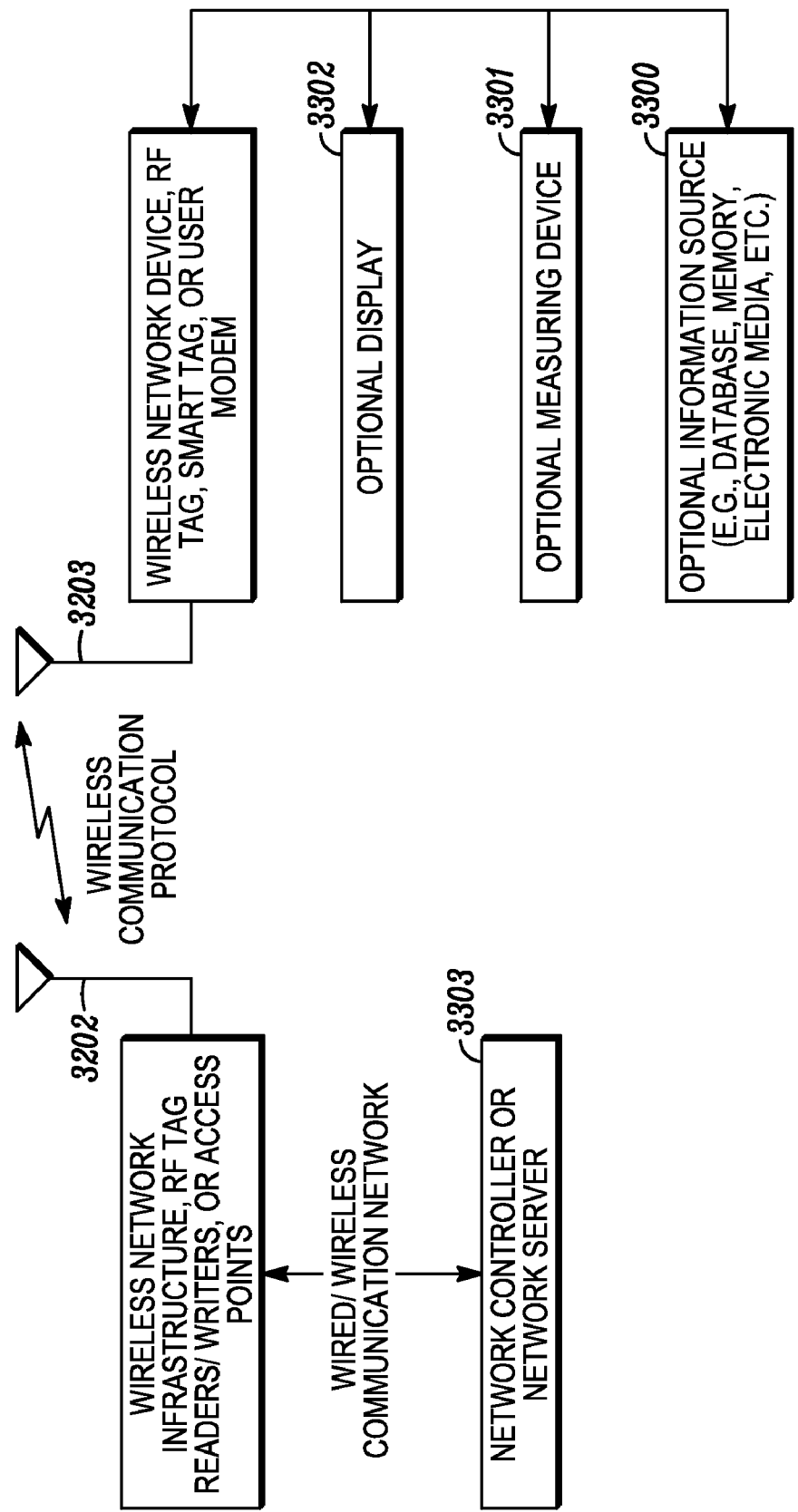
FIG. 33 shows a graphical overview of the interconnection between a variety of networks and components.

FIG. 33 provides a graphical overview of the interconnection between the various devices described thus far. In FIG. 33, an example embodiment of the present invention is executing on some computer platform 3303 that is connected in some fashion to the wireless network. The present invention has knowledge of the wireless network 3202 infrastructure, in terms of equipment types, placements, and configurations, and also has knowledge of the wireless network devices 3203 in terms of the type, placement, configuration, capability, and/or functionality of each network device. The invention, working through the wireless network antennas 3202, can establish a communication link with the wireless network devices 3203. This communication link may be unidirectional or bidirectional, one-to-one or broadcast, and enables information flow to or between the wireless network 3202 and the network devices 3203. The network devices 320 may be connected to one or more other devices. An external information source 3300, such as a computer database, may be accessible by the network device 3203. Some form of external quantitative measuring device 3301 capable of reporting some measurable value may be accessible by the network device 3203. A computerized display 3300 may be connected to the network device 3203. The information flow between the network device 3203 and the external information source 3300, the quantitative measuring device 3301, and/or the computerized display 3302 may be unidirectional or bidirectional. In the case of the computerized display 3302, the bidirectional information flow can occur in the situation where the computerized display 3302 takes the form of some type of touch screen panel accessible by an onlooker. In this latter situation, the actions of the onlooker in interacting with the touch screen panel display 3302 may result in some action taken or required by the network device 3302. For example, a user at a touch screen panel may request, using buttons or selection items on the display, an inventory count on a specific item. The display would forward the request to the wireless device 3203 which would either check the local information source 3300 or send a query through the wireless network 3202 and await a response.

The present invention controls and manages the information flow within the network and the overall network performance. The communication link between the wireless network 3202 and the network devices 3203 provides the means for the invention to convey information between the wireless network 3202 and network devices 3203. This information may take the form of instructions, commands, and responses. For example, the invention may convey new information representing a price change to a specific network device 3203 such as an RF tag. The network device 3203 would receive the information via the communication protocol shared with wireless network 3202 and, depending on the characteristics of the communication protocol, may send an acknowledgment back to the wireless network 3202. If the network device 3203 is connected with a computerized display 3302, the display may be updated to reflect the new price. As another example, the invention may send a query to one or more network devices 3203 requesting an updated quantity count or an updated measurement reading. In this case, each network device 3203 that receives the query replies back to the invention via the wireless network 3202 with the desired information. Alternatively, the network devices 3203 may initiate the communication with the wireless network 3202. If a network device 3203 is programmed to generate an alarm or some form of update message if a particular event occurs, the network device 3203 may send a message via the communication protocol to the wireless network 3202, which in turn takes some corresponding action. For example, if the network device 3203 contains some form of automatic indicator for the quantity of items currently located on a shelf, if the quantity of items drops below a certain level, the network device 3203 sends a message to the invention via the wireless network 3202 indicating as such. The invention records the event and may relay the message to some other information system, such as a computer database or inventory tracking system, and possibly notifies appropriate personnel in some fashion.

The present invention provides the means of conveying site-specific information to onlookers and network devices 3203. Since the present invention provides a site-specific representation of the environment and also provides the means of communicating with network devices within the environment, the present invention can associate each network device with a specific position within the environment. That is, the present invention contains an association between the physical network hardware device and a known position. Since the present invention maintains a computerized representation of the physical environment, the invention can display equipment location information on a computer display device. The diagram shown in FIG. 32 is representative of this capability. In addition, the present invention may also represent the positions of the network devices 3203 in addition to the wireless network antennas 3202. That is, the present invention can treat the wireless network devices 3203 of FIG. 32 in precisely the same fashion as the wireless network antennas 3202 and other infrastructure. The wireless network devices 3203 become simply an extension of the wireless network itself, and may be remotely accessed, controlled, and configured the same as any other network hardware device. Thus, any wireless network device 3203 can be diagnosed for problems, reconfigured or recalibrated, and potentially even reoriented remotely by the invention in order to improve overall network performance.

Figure 34:
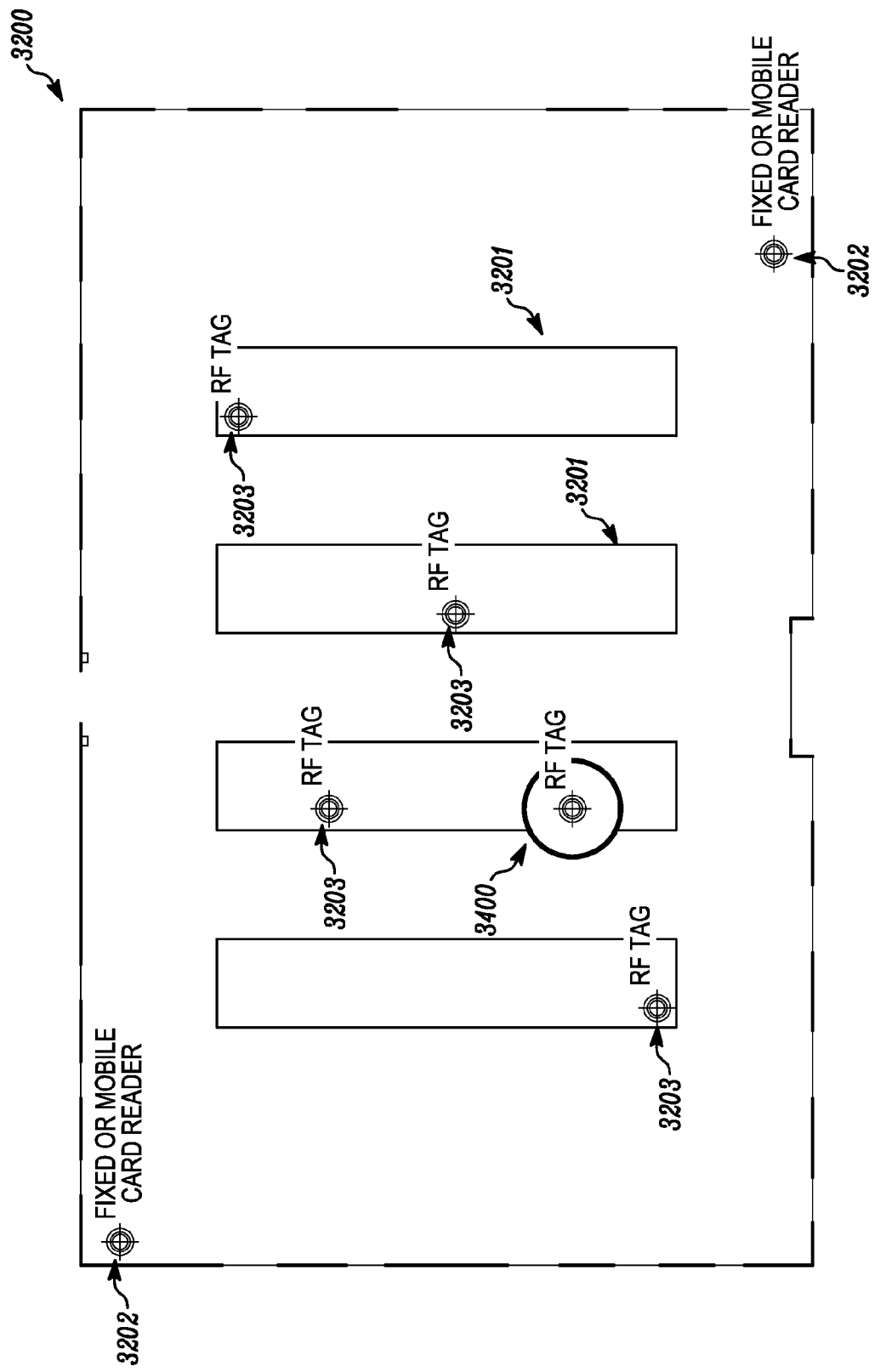
FIG. 34 shows a representation of a network in a warehouse where a highlighting feature is provided.

The knowledge of the location of each wireless network device 3203 enables additional capabilities to the present invention. With knowledge of wireless network device 3203 location and knowledge of some form of unique identifier for the network device, such as an IP address, serial number, or other identifying mark or code, the present invention can highlight that location of a computer display. Referring to FIG. 34, there is shown the warehouse of FIG. 32. Wireless network devices 3203 are distributed throughout the warehouse. If a maintenance person or other authorized individual needs to locate a specific network device 3203, the person can enter the unique identifier for the wireless network device 3203 into the invention, and the invention will display the location of said network device 3203 on the screen in some fashion. In FIG. 34, this displayed location takes the form of a highlighted or flashing circle 3400. Such a display enables the maintenance person to immediately locate the network device in question. Alternately, if a network device 3203 requires attention or has detected an event that generates a notification of some type that is sent to the invention, the present invention can display the location of the network device 3203 as shown in FIG. 34 along with specific information relevant to the network device 3203 or event. In addition to simply displaying the location of the device, additional information may be displayed as depicted in FIGS. 23*b*, 23*c*, 24, 26, 27, and 29.

In addition, the combination of site-specific information with the ability to communicate events and information flow to and from wireless network infrastructure and network devices provides an unprecedented ability to convey immediate site-specific information to onlookers and end users. Referring to FIG. 33, if the network devices 3203 in question are mobile personal computers (PCs), laptops, or handheld computing devices, the present invention can instantly send site-specific information to the network device 3203 via the wireless network 3202 that can be viewed on the mobile computing platform display 3302. For example, if a fire alarm is pulled within the building, the present invention can, if it has knowledge of the alarm event, send a fire exit map image via the wireless network 3202 to each network device 3203. The network device 3203 can then display the fire exit map image to onlookers or end users. Further, because the present invention has knowledge of the location of each of the wireless network antennas 3202, it can designate that a different fire exit image be broadcast from each antenna 3202. That is, each wireless network antenna 3202 can send an image of the closest fire exit to those network devices 3203 that it is currently servicing. As the end user or individual with access to the mobile network device 3203 moves throughout the facility and passes from one antenna service area to another, a new fire exit image will be sent to the network device 3203 and the display will be updated.

Figure 35:
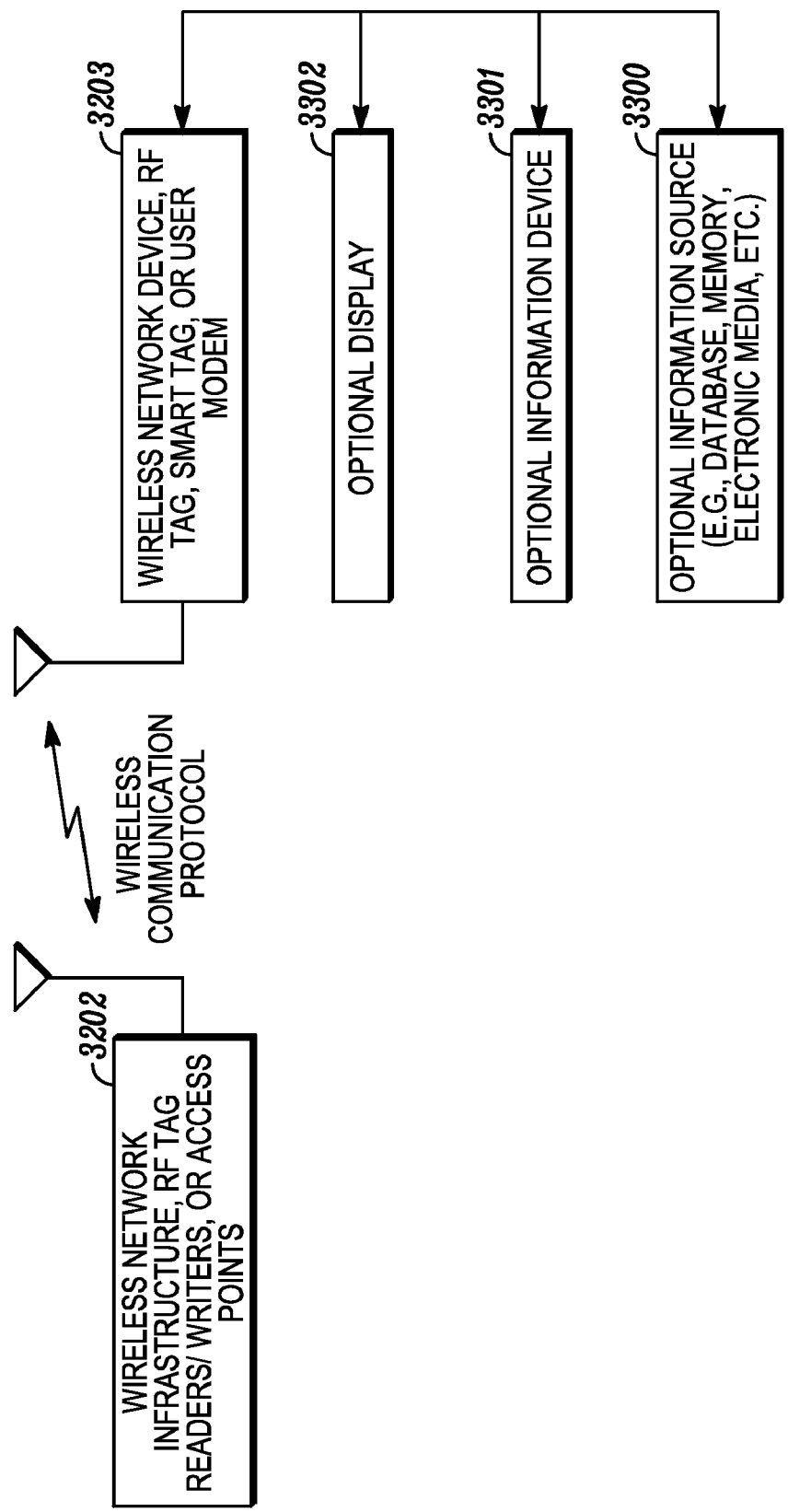
FIG. 35 shows a schematic of wireless network infrastructure equipment with features of the invention embedded therein.

Note that in an alternate instantiation, the invention may be incorporated with or even embedded directly within wireless network equipment, rather than executing on a separate computing platform. FIG. 35 overviews the logical representation of this embodiment of the present invention. Referring to FIG. 35, wireless network infrastructure equipment 3202 has the invention embedded within and executing upon it. If, for example, the wireless network equipment 3202 was a wireless LAN access point, the access point hardware would have software running inside of it implementing the present invention. In this case, the information flow as shown in FIG. 33 remains virtually unchanged with the exception that the wireless network equipment 3202 no longer needs to communicate with an external computing platform. Instead, the invention is integrated directly into the hardware 3303. This enables, for example, each wireless hardware device 3202 to contain its own site-specific information, maintenance history, and other pertinent information. This is a very different scenario from that of FIG. 33, in which the site-specific information and other pertinent information was maintained centrally by the invention on a separate computing platform 3303 that can communicate with and exchange information with RF tags and other network devices. The embodiment of the invention as shown in FIG. 35 provides a distributed information model wherein each piece of network equipment maintains its own site-specific information, maintenance history, performance history, and other relevant information.

This embodiment of the present invention is particularly useful in the situation described above if an emergency is occurring within the building. If an emergency is detected in the building, given the instantiation of the present invention shown in FIG. 35 each piece of wireless network equipment 3202 can independently furnish a fire exit map or other instructions to wireless network devices 3203.

Figure 36:
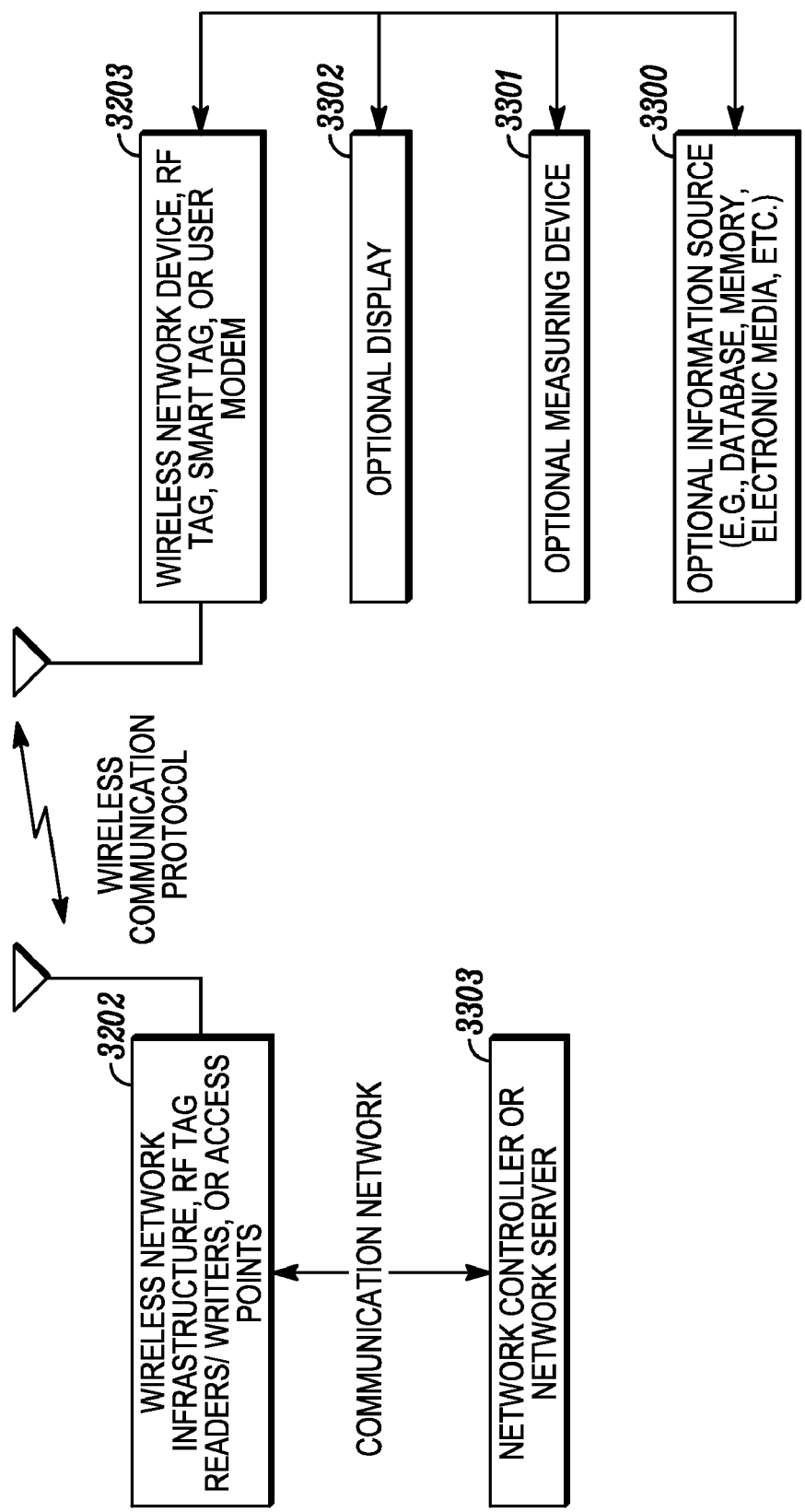
FIG. 36 shows a schematic which is a combination of the embodiments shown in FIGS. 33 and 35.

Finally, FIG. 36 presents a third type of embodiment of the present invention. FIG. 36 represents a combination of the embodiments presented in FIGS. 33 and 35. In FIG. 36, each piece of wireless network hardware equipment 3202 contains its own version of the invention, a site-specific information and management system, while a separate computer platform 3303 that can connect with each separate piece of wireless network equipment 3202 also has an instantiation of the invention.

While the invention has been described in terms of its preferred embodiments, those skilled in the art will recognize that the invention can be practiced with considerable modification within the spirit and scope of the appended claims.

Having thus described our invention, what we claim as new and desire to secure by Letters Patent is as follows:

1. A wireless communication system with security, comprising:
   a display for displaying a site-specific computerized representation of a physical environment in which a communications system is deployed;
   a plurality of wireless communication components positioned at a plurality of different locations within said physical environment, said display identifying at least some of the wireless communication components and their locations in said site-specific computerized representation of said physical environment, at least one of said plurality of wireless communication components being an access point and at least one of said plurality of wireless communication components being a network device; and
   an indicator for identifying the presence or a physical location within said physical environment of a possible intruder or intruder devices, said indicator is presented in said site-specific computerized representation of said physical environment on said display when an erroneous authentication request or other undesired transmission is received by said network device or said access point.

2. The wireless communication system with security of claim 1 wherein said network device is a router.

3. The wireless communication system with security of claim 1 wherein said network device is mobile.

4. A security method for a wireless communication system, comprising the steps of:
   displaying, on a display, a site-specific computerized representation of a physical environment in which a communications system is deployed;
   positioning a plurality of wireless communication components at a plurality of different locations within said physical environment, said display identifying at least some of the wireless communication components and their locations in said site-specific computerized representation of said physical environment, at least one of said plurality of wireless communication components being an access point and at least one of said plurality of wireless communication components being a network device; and
   identifying the presence or a physical location within said physical environment of a possible intruder or intruder devices by presenting an indicator in said site-specific computerized representation of said physical environment on said display when an erroneous authentication request or other undesired transmission is received by said network device or said access point.

5. The security method of claim 4 wherein said network device is mobile, and further comprising the step of representing movement of said network device that is mobile on said display.

6. A wireless communication system with security, comprising:
   a display for displaying a site-specific computerized representation of a physical environment in which a communications system is deployed;
   a plurality of wireless communication components positioned at a plurality of different locations within said physical environment, said display identifying at least some of the wireless communication components and their locations in said site-specific computerized representation of said physical environment, at least one of said plurality of wireless communication components being a network device;

a storage device for archiving records of other network devices which interact with said network device; and an indicator for identifying the presence or a physical location within said physical environment of a possible intruder or intruder devices, said indicator is presented in said site-specific computerized representation of said physical environment on said display when another network device attempts to interact with said network device which has not previously interacted with said network device as determined from records archived on said storage device.

7. A security method for a wireless communication system, comprising the steps of:

displaying, on a display, a site-specific computerized representation of a physical environment in which a communications system is deployed;

positioning a plurality of wireless communication components at a plurality of different locations within said physical environment, said display identifying at least some of the wireless communication components and their presence or location in said site-specific computerized representation of said physical environment, at least one of said plurality of wireless communication components being a network device;

archiving records of other network devices which interact with said network device in a storage device; and identifying the presence or a physical location within said physical environment of a possible intruder or intruder devices by presenting an indicator in said site-specific computerized representation of said physical environment on said display when another network device attempts to interact with said network device which has not previously interacted with said network device as determined from records archived on said storage device.

8. A site specific inventory system, comprising:

a display for displaying a site-specific computerized representation of a physical environment in which a communications system is deployed;

a plurality of wireless communication components positioned at a plurality of different locations within said physical environment, said display identifying at least some of the wireless communication components and their locations in said site-specific computerized representation of said physical environment, at least one of said plurality of wireless communication components being a network device;

a plurality of RF tags distributed within said physical environment, each of said RF tags being associated with one or more items in said physical environment and the number of said plurality of RF tags being variable, at least one of said wireless communication components communicating via wireless communication with said RF tags; and a data processor associated with said display, said data processor being in communication with said plurality of wireless communication components, said display providing a position and location of one or more of said RF tags in said site-specific computerized representation of said physical environment based on said wireless communication between said at least one of said wireless communication components and said one or more of said RF tags, the number of RF tags displayed in said site-specific computerized representation being variable and corresponding to the number of RF tags in said physical environment, said data processor retrieving or storing or processing information from said one or more of said RF tags based on said wireless communication between said at least one of said wireless communication components and said one or more of said RF tags.

9. A site specific inventory system as recited in claim 8 further comprising a connection between said data processor and an internet or intranet, said information retrieved, stored or processed at said data processor being accessible by said internet or intranet through said connection.

10. A she specific inventory system as recited in claim 8 wherein each of said RF tags is associated with a single item and contains information describing said single item.

11. A site specific inventory method, comprising the steps of:

displaying, on a display, a site-specific computerized representation of a physical environment in which a communications system is deployed;

positioning a plurality of wireless communication components at a plurality of different locations within said physical environment, said display identifying at least some of the wireless communication components and their locations in said site-specific computerized representation of said physical environment, at least one of said plurality of wireless communication components being a network device;

distributing a plurality of RE tags within said physical environment, each of said RF tags being associated with one or more items in said physical environment and the number of said plurality of RF tags being variable, at least one of said wireless communication components communicating via wireless communication with said RE tags; and using a data processor associated with said display, said data processor being in communication with said plurality of wireless communication components, said display providing a position and location of one or more of said RE tags in said site-specific computerized representation of said physical environment based on said wireless communication between said at least one of said wireless communication components and said one or more of said RE tags, the number of RE tags displayed in said site-specific computerized representation being variable and corresponding to the number of RF tags in said physical environment, said data processor retrieving or storing or processing information from said one or more of said RE tags based on said wireless communication between said at least one of said wireless communication components and said one or more of said RE tags.

12. A site specific inventory method recited in claim 11 further comprising the step of connecting said data processor to an internet or intranet, said information retrieved, stored or processed at said data processor being accessible by said internet or intranet through said connection.

13. A site specific inventory method as recited in claim 11 wherein each of said RF tags is associated with a single item and contains information describing said single item.

14. A wireless communication system, comprising:

a display for displaying a site-specific computerized representation of a physical environment in which a communications system is deployed;

a plurality of wireless communication components positioned at a plurality of different locations within said physical environment, said display identifying as graphical icons at least some of the wireless communication components and their locations or presence in said site-specific computerized representation of said physical environment; and a data processor associated with said display which retrieves or stores or processes information that describes each of said plurality of wireless communication components and which identifies a pre-defined communication method for at least some of said plurality of wireless communication components, said display selectively presenting graphical or textual information or a combination of graphical and textual information from said data processor pertaining to one or more of said plurality of wireless communication components when one or more graphical icons associated with said one or more of said plurality of wireless communication components are selectively identified on said display.

15. The wireless communication system of claim 14 wherein said data processor recognizes when wireless communication components are added or subtracted from said physical environment, and said display reflects additions or subtractions of wireless communication components by additions or subtractions of said graphical icons.

16. The wireless communication system of claim 14 wherein at least one of said plurality of wireless communication components is mobile, and is provisioned with a particular bandwidth using said data processor.

17. A wireless communication method, comprising the steps of:

displaying, on a display, a site-specific computerized representation of a physical environment in which a communications system is deployed;

positioning a plurality of wireless communication components at a plurality of different locations within said physical environment, said display identifying as graphical icons at least some of the wireless communication components and their locations or presence in said site-specific computerized representation of said physical environment;

using a data processor associated with said display to retrieve or store or process information that describes each of said plurality of wireless communication components and to identify a pre-defined communication method for at least some of said plurality of wireless communication components; and selectively presenting graphical or textual information or a combination of graphical and textual information from said data processor pertaining to one or more of said plurality of wireless communication components when one or more graphical icons associated with said one or more of said plurality of wireless communication components are selectively identified on said display.

18. The wireless communication method of claim 17, further comprising the step of communicating with one or more of said plurality of wireless communication components.

19. The wireless communication method of claim 18 wherein said step of communication is performed by voice over internet protocol.

20. The wireless communication method of claim 17, wherein at least one of said plurality of wireless communication components is mobile, and further comprising the step of graphically representing movement of said at least one wireless communication component that is mobile on said display.

21. The wireless communication method of claim 17, further comprising the step of provisioning bandwidth for one or more of said wireless communications components within said physical environment using said data processor.

\* \* \* \* \*